(12) United States Patent
Zhang

(10) Patent No.: US 9,449,080 B1
(45) Date of Patent: Sep. 20, 2016

(54) SYSTEM, METHODS, AND USER INTERFACE FOR INFORMATION SEARCHING, TAGGING, ORGANIZATION, AND DISPLAY

(71) Applicant: Guangsheng Zhang, Palo Alto, CA (US)

(72) Inventor: Guangsheng Zhang, Palo Alto, CA (US)

( * ) Notice: Subject to any disclaimer, the term of this patent is extended or adjusted under 35 U.S.C. 154(b) by 348 days.

(21) Appl. No.: 13/951,487

(22) Filed: Jul. 26, 2013

Related U.S. Application Data

(63) Continuation-in-part of application No. 13/241,534, filed on Sep. 23, 2011, now Pat. No. 8,498,983, and a continuation-in-part of application No. 12/782,545, filed on May 18, 2010, now Pat. No. 8,843,476, said application No. 13/241,534 is a continuation-in-part of application No. 12/972,462, filed on Dec. 18, 2010, now Pat. No. 8,407,217.

(60) Provisional application No. 61/682,205, filed on Aug. 11, 2012, provisional application No. 61/680,715, filed on Aug. 8, 2012, provisional application No. 61/857,218, filed on Jul. 22, 2013, provisional application No. 61/805,141, filed on Mar. 25, 2013, provisional application No. 61/809,893, filed on Apr. 9, 2013, provisional application No. 61/749,302, filed on Jan. 5, 2013, provisional application No. 61/754,652, filed on Jan. 21, 2013.

(51) Int. Cl.
*G06F 17/27* (2006.01)
*G06F 17/30* (2006.01)

(52) U.S. Cl.
CPC ......... *G06F 17/30657* (2013.01); *G06F 17/27* (2013.01)

(58) Field of Classification Search
CPC ..................................................... G06F 17/27
USPC ............................................................ 715/256
See application file for complete search history.

(56) References Cited

U.S. PATENT DOCUMENTS

| | | | |
|---|---|---|---|
| 7,536,413 B1 * | 5/2009 | Mohan et al. | |
| 8,166,045 B1 * | 4/2012 | Mazumdar et al. | 707/748 |
| 8,601,397 B2 * | 12/2013 | Marcy et al. | 715/853 |
| 2001/0018698 A1 * | 8/2001 | Uchino | G06F 17/3061 715/277 |
| 2002/0138528 A1 * | 9/2002 | Gong | G06F 17/27 715/254 |
| 2008/0010249 A1 * | 1/2008 | Curtis et al. | 707/3 |
| 2011/0202886 A1 * | 8/2011 | Deolalikar | G06F 17/30707 715/853 |
| 2013/0054595 A1 * | 2/2013 | Isaev | G06F 17/3012 707/736 |

* cited by examiner

*Primary Examiner* — Kavita Padmanabhan
*Assistant Examiner* — Tionna Burke

(57) ABSTRACT

A system, methods, and user interface for automatically extracting important terms from a document content as terms representing the important information in the content, and using the extracted term or terms to label the document, either as a tag or a summary or category, or for renaming the document. Methods for determining the terms as important include content analysis methods based on grammatical, semantic, contextual, positional, frequency, and other attributes associated with the terms. Documents can include any type of document containing text, including personal or company documents, Web pages, emails, reviews and comments, etc. In some embodiments, a document can also be a collection of documents.

20 Claims, 58 Drawing Sheets

| From | Subject | Topics | Date | Size |
|---|---|---|---|---|
| John | Re: Weekend Exercise | Hiking, Next Sunday, | 3/1/2009 | 8 KB |
| Mary | Weekend Exercise | Lakeside, park | 2/27/2009 | 2 KB |
| Mary | bascketball | Lakers | 2/20/2009 | 6 KB |
| Michael | Re: Class schedule | Afternoon labs | 2/3/2009 | 5 KB |
| Susan | Class schedule | physics, English | 2/3/2009 | 4 KB |
| Jason | Re: Healthy food info | Healthy food, club activity | 1/21/2009 | 4 KB |
| Jim | Re: Healthy food info | Healthy food, club activity | 1/21/2009 | 3 KB |
| Jessica | Healthy food info | Healthy food, new studies | 1/20/2009 | 3 KB |

Trending Now

1310  ………
       5. ……

6. Matt Lauer ABC

1320

Nearly left Today show last year
was ready to jump to ABC
on the brink of defecting to rival network ABC
……

1810 — Doc 1

Drug names (contained in the document):

1820 —
Aleve
Alternagel
Dramamine
Excedrin
Tylenol
..

1830 — Company names (contained in the document):

1840 —
Merck
Smith Klein
Bayer
..

Doc 2
Doc 3
...
...

Figure 19A

| Name | class/category |
|---|---|
| Doc 1 | marketing |
| Doc 2 | finance |
| Doc 3 | engineering |
| ...... | |

1920 → (table)
1950 → Doc 1 row
1960 → Doc 2 row

Figure 19B

Category: Marketing

Documents:
        Doc 10
        Doc 20
        Doc 30

Category: Finance

Documents:
        Doc 15
        Doc 25
        Doc 35
......

Figure 20A

| | Name | overall sentiment |
|---|---|---|
| 2020 | Doc 1 | positive |
| 2050 | Doc 2 | negative |
| 2060 | Doc 3 | neutral |
| | ...... | |

Figure 20B

Sentiment: Positive

Documents:
        Doc 10
        Doc 20
        Doc 30

Sentiment : negative

Documents:
        Doc 15
        Doc 25
        Doc 35

| Specify requirements as search parameters: |

| Qualification: | Requirement: | Importance: |
|---|---|---|
| Skill A | 3 years | 0.7 |
| Skill B | 4 years | 0.85 |
| ... | ... | ... |

Concept name: Computer

| Associated Terms | Association Strength |
|---|---|
| CPU | 0.99 |
| motherboard | 0.90 |
| memory | 0.95 |
| hard disk | 0.80 |
| operating system | 0.98 |
| speed | 0.60 |
| multi-media | 0.50 |
| case | 0.2 |
| software | 0.7 |
| color | 0.2 |
| UNIX | 0.5 |
| Microsoft | 0.8 |
| …… | …… |

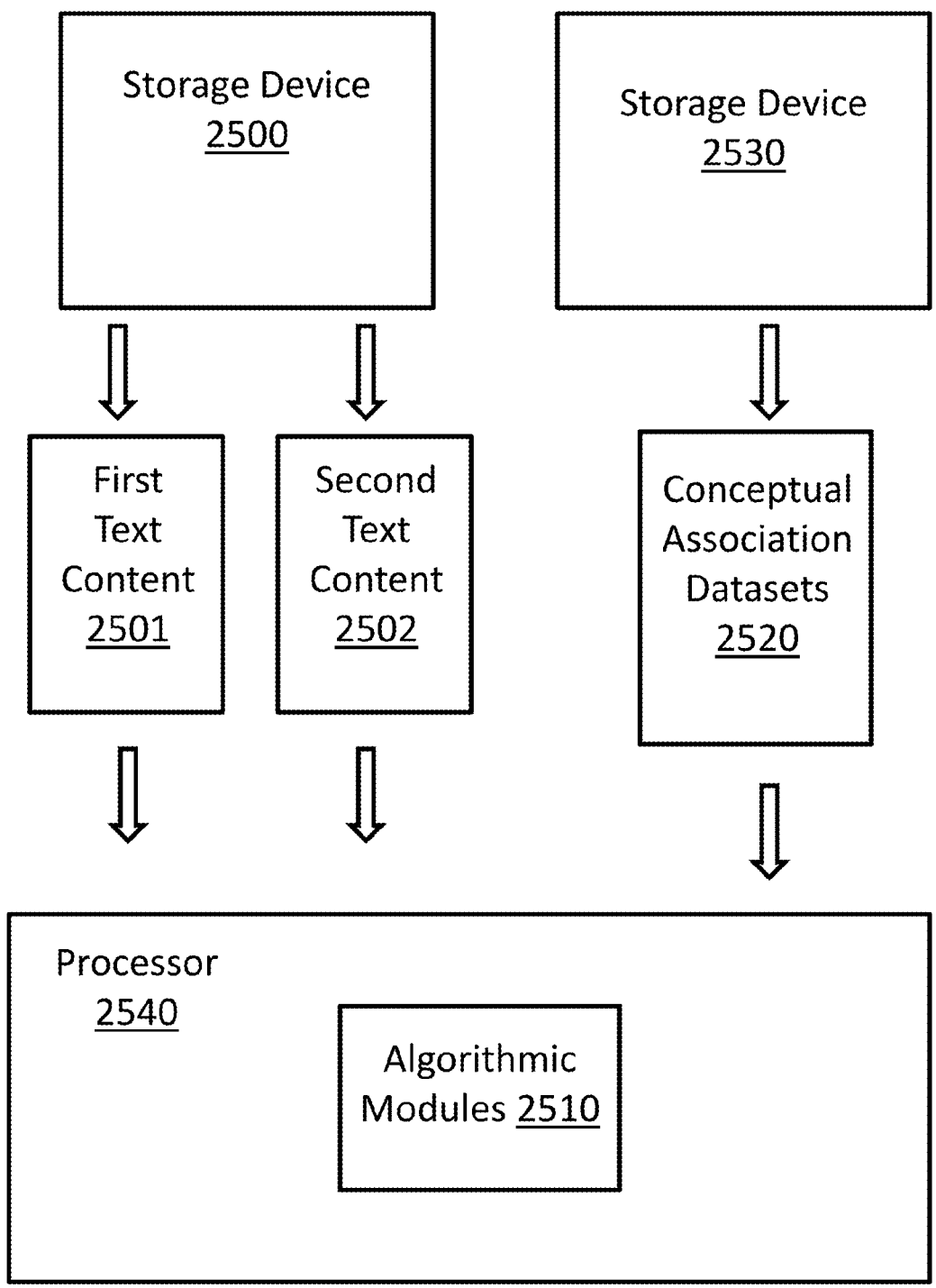

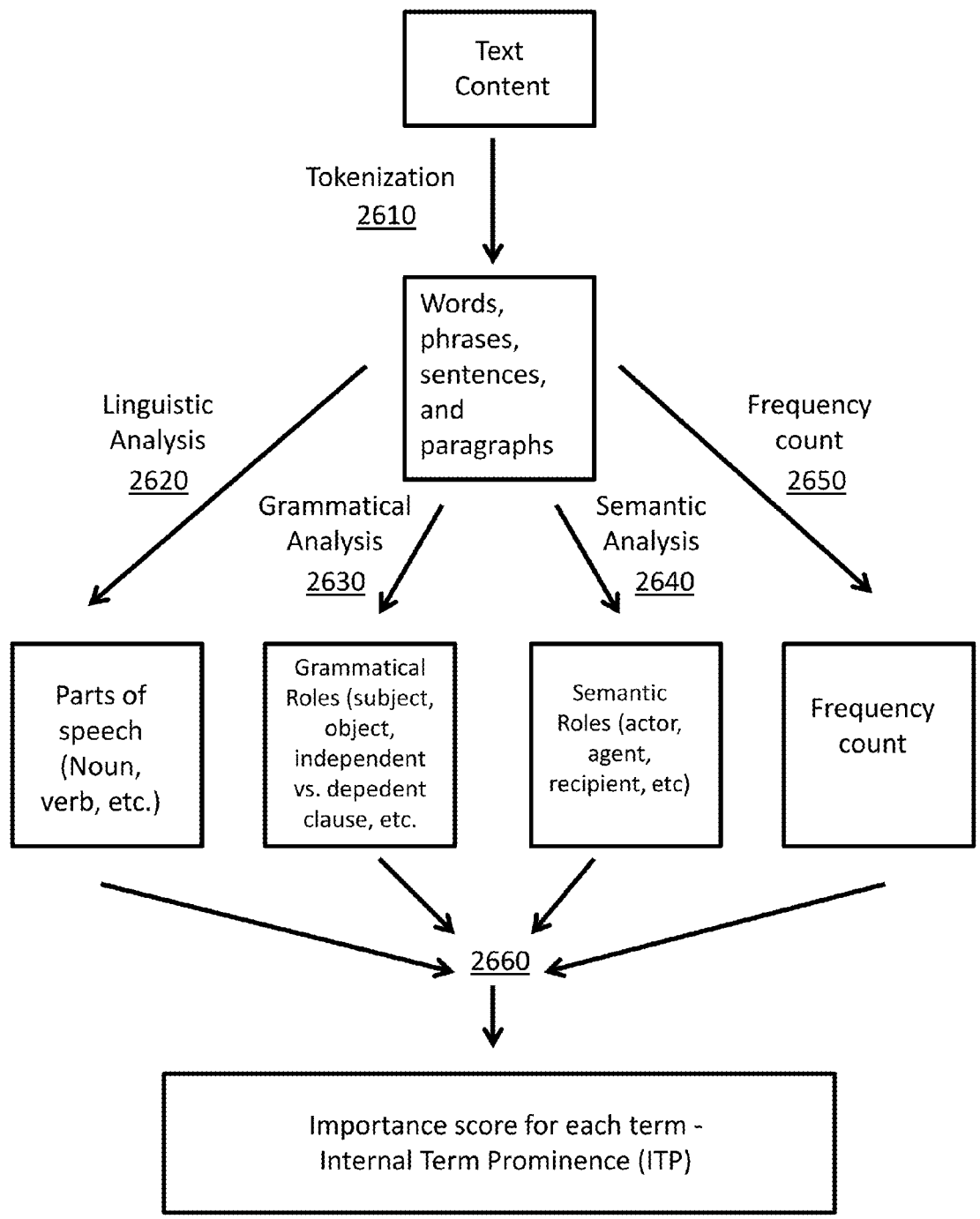

Figure 28

| Terms | Parts of Speech | Grammatical Roles | Semantic Roles | Frequency Count |
|---|---|---|---|---|
| Computer | 0.002 | 0.0003 | 0.05 | 0.0004 |
| CPU | 0.001 | 0.0004 | 0.002 | 0.0002 |
| Memory | 0.004 | 0.0006 | 0.054 | 0.0003 |
| Hard disk | 0.006 | 0.0003 | 0.056 | 0.0004 |
| Software | 0.002 | 0.0003 | 0.058 | 0.0006 |
| …… | | | | |

3200  3202

Terms and Associated External Prominence Values for Different Grammatical Types

| Terms | Type 1 | Type 2 | Type 3 | Type 4 | Type 5 | Type 6 | Type 7 | Type 8 | Para-graph | Docu-ment |
|---|---|---|---|---|---|---|---|---|---|---|
| Computer | 0.002 | 0.0003 | 0.05 | 0.0004 | 0.03 | 0.09 | 0.001 | 0.03 | 0.21 | 0.05 |
| CUP | 0.001 | 0.0004 | 0.002 | 0.0002 | 0.03 | 0.099 | 0.001 | 0.03 | 0.14 | 0.009 |
| Memory | 0.004 | 0.0006 | 0.054 | 0.0003 | 0.03 | 0.093 | 0.001 | 0.03 | 0.05 | 0.0045 |
| Hard disk | 0.006 | 0.0003 | 0.056 | 0.0004 | 0.03 | 0.095 | 0.001 | 0.03 | 0.07 | 0.222 |
| Software | 0.002 | 0.0003 | 0.058 | 0.0006 | 0.03 | 0.096 | 0.001 | 0.03 | 0.08 | 0.021 |
| ...... | | | | | | | | | | |

Figure 49

| From | Subject | Keywords | Date | Size |
|---|---|---|---|---|
| John | Re: Weekend Exercise | Hiking, Next Sunday, | 3/1/2009 | 8 KB |
| Mary | Weekend Exercise | Lakeside, park | 2/27/2009 | 2 KB |
| Mary | bascketball | Lakers | 2/20/2009 | 6 KB |
| Michael | Re: Class schedule | Afternoon labs | 2/3/2009 | 5 KB |
| Susan | Class schedule | physics, English | 2/3/2009 | 4 KB |
| Jason | Re: Healthy food info | Healthy food, club activity | 1/21/2009 | 4 KB |
| Jim | Re: Healthy food info | Healthy food, club activity | 1/21/2009 | 3 KB |
| Jessica | Healthy food info | Healthy food, new studies | 1/20/2009 | 3 KB |

Figure 55

SYSTEM, METHODS, AND USER INTERFACE FOR INFORMATION SEARCHING, TAGGING, ORGANIZATION, AND DISPLAY

CROSS REFERENCES TO RELATED APPLICATIONS

The present application is a Continuation-In-Part application of and claims priority to U.S. patent application Ser. No. 13/241,534 which is now U.S. Pat. No. 8,498,983, entitled "Assisting Search with Semantic Context and Automated Search Options", and U.S. patent application Ser. No. 12/782,545 entitled "System and Methods for Automated Document Topic Discovery, Browsable Search and Document Categorization", filed on May 18, 2010. U.S. Pat. No. 8,498,983 is a continuation-in-part application of and claims priority to U.S. patent application Ser. No. 12/972,462 filed on Dec. 18, 2010, which is now U.S. Pat. No. 8,407,217, entitled "Automated Topic Discovery in Documents", issued on Mar. 26, 2013. The present application also claims priority to U.S. Patent Provisional Application 61/857,218 entitled "System, Methods, and User Interface for Information Searching, Tagging, Organization, and Display" filed on Jul. 22, 2013, U.S. Provisional Patent Application 61/809,893 entitled "System, Methods, and User Interface for Automatically Presenting Information Based on Relevance" filed on Apr. 9, 2013, U.S. Provisional Patent Application 61/805,141 entitled "System, Methods, and User Interface for Presenting Information Based on Document Contents" filed on Mar. 25, 2013, U.S. Provisional Patent Application 61/682,205 entitled "System and Methods for Determining Term Importance and Relevance between Text Contents Using Conceptual Association Datasets" filed on Aug. 11, 2012, U.S. Provisional Patent Application 61/680,715 entitled "System, Methods And User Interface For Facilitating Searching Of Electronic Objects" filed on Aug. 8, 2012, U.S. Provisional Patent Application 61/749,302 entitled "System, Methods, and Data Structure for Quantitative Assessment of Contextualized Symbolic Associations" filed on Jan. 5, 2013, and U.S. Provisional Patent Application 61/754,652 entitled "System, Methods, and User Interface for Presenting Information Associated with an Object" file on Jan. 21, 2013, the disclosures of which are incorporated herein by reference.

BACKGROUND OF THE INVENTION

Conventional methods of finding needed information have been mainly through search engines for unstructured data, and database queries for structured data. A problem with these conventional methods is that the user needs to know how to formulate a good query. Common search engines require the user to come up with pertinent keywords, and the engine can often return a long list of results that the user needs to sift through.

However, there are often times when the user may not know what exact keywords to use to search for the information they are looking for, or does not know or does not remember what exact keywords are contained in documents that the user wants to search for. In such cases, finding the needed information can be difficult and time-consuming.

SUMMARY OF THE INVENTION

The present invention provides various alternative methods to conventional search.

In a general aspect, documents, or text contents in general, are analyzed and important terms that can represent the topics or concepts or other information conveyed in the documents are identified, based on various attributes associated with the terms including grammatical, semantic, positional, and frequency attributes.

Then the most important terms in a document are selected and extracted for various uses in document management and information search.

One application for the important terms extracted from the document content is automatically tagging documents in a way that they can be easily found without performing a conventional search.

A related application of automatic tagging is automatic summary and descriptive file name generation, including email tagging and subject line generation.

In another general aspect, system, methods, and user interface for automatic search or assisted search with suggestions are provided.

The methods first identify and extract the important terms from the document content, and provide a convenient user interface for utilizing such terms in searching information related to the document that is currently being viewed, often without requiring the user to enter any keyword in the conventional query box.

In a specific aspect, methods and user interface for searching related information or similar content based on the content of an unopened document are provided. The methods also identify and extract the important terms from the document content, and provide a convenient user interface for utilizing such terms in searching information related to the document that is currently in an unopened state, without requiring the user to enter any keyword in the conventional query box.

In another aspect, system, methods, and user interface for combining browsing with searching are provided. The methods first organize various documents or other types of electronic objects residing on a computing or communication device into groups or categories, and sub-groups and sub-categories based on the important terms contained in the documents, or metadata associated with the documents or objects. The user interface allows the user to easily find the needed objects by browsing through the categories or term lists, without requiring the user to enter any keywords in a query box.

Other methods for determining the importance measure of a term in a specific topic domain, such as financial market domain, job search domain, etc., are also disclosed and cited from incorporated references.

Other methods and user interface for displaying information extracted from document contents are also disclosed. The methods include generating a summary for a document collection, and enabling search or browsing to the specific documents or contents. The methods also include identifying the relationships between terms in a document in terms of topic-comment, or object-properties relationships, and displaying such information in a hierarchical format.

Other methods for determining the importance measure of a term in a document based on grammatical and semantic context are also disclosed. Examples in the job/resume search domain are provided, and methods and user interface for more effectively searching and displaying information are also disclosed.

The examples are mainly based on text objects such as documents or Web pages or emails, however, it should be understood that the principles and methods can also apply to other types of data.

BRIEF DESCRIPTION OF FIGURES

The following drawings, which are incorporated in and form a part of the specification, illustrate embodiments of the present invention and, together with the description, serve to explain the principles of the invention.

FIG. 2 is an illustration of another embodiment showing automatic tagging for emails as a special type of documents.

FIG. 13 is another example of displaying comments under a topic.

FIG. 18 illustrates an example of displaying terms extracted from the content based on predefined semantic attributes.

FIG. 19A is an exemplar case of displaying class or category information attached to a document.

FIG. 19B shows an example of displaying document objects by sorting or grouping by classes or categories.

FIG. 20A is an example of labeling document objects with sentiment type in a file management tool's user interface.

FIG. 20B is an example of displaying document objects by sorting or grouping based on sentiment types.

FIG. 21 is an exemplar user interface for specifying an importance value for a search parameter in the present invention.

In the following, FIGS. 24 to 31 are recitations from U.S. Provisional Patent Application 61/682,205.

FIG. 24 is an illustration of a conceptual association dataset for the concept of "Computer" as is disclosed in the referenced disclosure.

FIG. 25 is a system diagram illustrating the components of the system that can be used to determine the relevance between two or more documents in accordance with the present invention.

FIG. 26a is a flow diagram illustrating the steps of analyzing the text content.

FIG. 26b is a continuation of FIG. 26a.

FIG. 27 is a flow diagram illustrating the process of obtaining ETP values for terms from a plurality of external contents FIG. 28 is an example ETP dataset with hypothetical terms and their corresponding ETP score values.

FIG. 29 is an exemplar illustration of the steps for determining the relevance between the first and second text content FIG. 30 is an example of topic terms used as summary information for a list of files.

FIG. 31 illustrates an example of categorizing document contents using terms with different values on different levels of the node tree.

In the following.

FIG. 32 is an example of a conventional search user interface with a query box plus a search button.

FIG. 33 is an exemplar diagram of a system for locating or finding electronic objects.

FIG. 34 is an exemplar illustration of the user interface object for locating or finding electronic objects in accordance with the present invention.

FIG. 35 is an exemplar illustration of the search results after activating the user interface object for locating or finding electronic objects in accordance with the present invention.

FIG. 36 is an exemplar illustration of the search results containing categories and sub-categories of the search results after activating the user interface object for locating or finding electronic objects in accordance with the present invention.

FIG. 37 is an exemplar illustration of an optional query box displayed after activating the user interface object for locating or finding electronic objects in accordance with the present invention.

FIG. 38 is an exemplar illustration of an optional embodiment of the present invention where a blank query box is present with the user interface object for locating or finding electronic objects in accordance with the present invention.

FIG. 39 is an exemplar illustration of an optional embodiment of the present invention where a query box is displayed after activating the user interface object for locating or finding electronic objects in accordance with the present invention.

FIG. 40 is an exemplar illustration of an optional embodiment of the present invention where a category names can be dragged to the optional query box as queries after activating the user interface object for locating or finding electronic objects in accordance with the present invention.

In the following.

FIG. 41 is an exemplar flowchart for compiling semantically related context terms for a searchable term in a database.

FIG. 42 is a detailed flow diagram showing the steps of providing a more accurate and faster search by providing context terms in response to a user query.

FIG. 43 is an exemplar user interface presenting context terms in real-time response to a user query.

FIG. 44 is an exemplar user interface presenting context terms in real-time response to a user query and for receiving user rating of the context terms.

FIG. 45 is an exemplar user interface providing the user with file types as document property and other context terms as the potentially relevant context information.

In the following, FIGS. 46 to 56 are recitations from U.S. Pat. No. 8,843,476.

FIG. 46 is an exemplified system diagram for discovering topics in a document collection in accordance with the present invention.

FIG. 47 is an exemplified flow diagram for automatically and quantitatively identifying topics contained in a collection of documents.

FIG. 48 is another exemplified flow diagram for automatically and quantitatively identifying topics contained in a collection of documents.

FIG. 49 shows a data table comprising terms and their associated external prominence values based on their roles in the grammatical and informational structure of various linguistic units.

FIG. 50 shows an exemplified user interface for facilitating information search and retrieval using a list of topics.

FIG. 51 shows an exemplified user interface for searching documents using topics and subtopics within a topic.

FIG. 52 is an exemplified system block diagram for quantitatively assessing information in natural language content.

FIG. 53 is an exemplified user interface for displaying a list of topic terms for a group of documents in a document folder.

FIG. 54 is an exemplified user interface showing the use of topic lists to highlight the content of individual documents.

FIG. 55 is an exemplified user interface showing the use of topic lists to highlight the content of individual emails.

FIG. 56 shows an exemplified user interface for interactively configuring a category structure using a topic list.

DETAILED DESCRIPTION OF THE INVENTION

Figure 1:
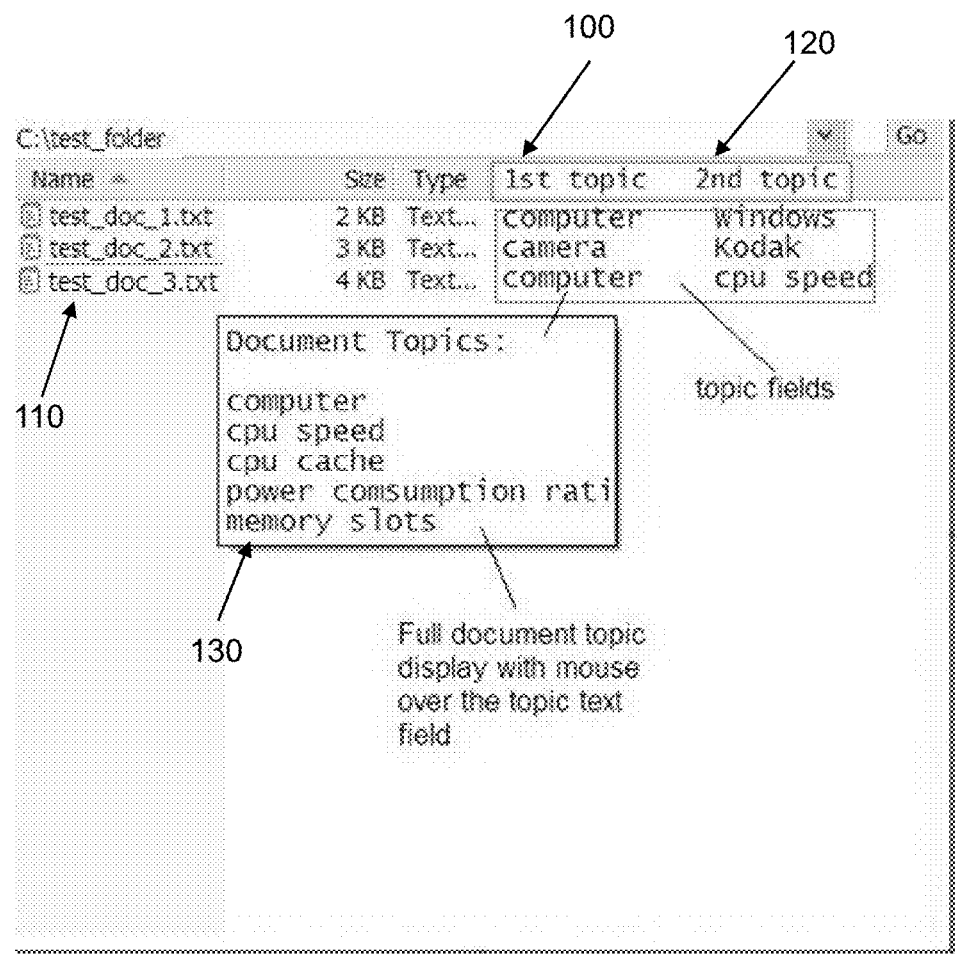
FIG. 1 illustrates one embodiment of the present invention where tags or summaries are displayed using terms extracted from documents.

The present invention provides systems, methods, and user interface for facilitating the process of finding needed information by changing the conventional way of searching, organizing, and utilizing information contained in various types of documents, by automatically analyzing the content of the documents, extracting terms or sentences or paragraphs that are the most representative of the information carried in the document content, and providing automatic suggestions for search queries and document tagging with labels or summaries based on the information in the document content.

In the present disclosure, the definition of documents can include commonly perceived electronic file objects such as personal or company documents of various formats, and other types of documents including web pages, emails, blogs, articles, social network comments, product/service reviews, as well as non-text file objects such as audio/image/video files, etc.

Conventional search methods and related user interface require users to enter keywords as query text in a query box, before any search can be performed. This is both intuitive and logical as a search engine will not know what to search without an explicitly entered query. However, there are also times when the user may not know what exact keywords to use to search for the information they are looking for, or does not know or does not remember what exact keywords are contained in documents that they want to search for. In such cases, finding the needed information can be difficult and time-consuming.

In U.S. Pat. No. 8,498,983, entitled "Assisting Search with Semantic Context and Automated Search Options" by the present inventor, system, methods, and user interface of a context-based search are disclosed to enable users to quickly find the information they are looking for by providing instant context information, with much reduced efforts on the user's side as compared to the conventional search methods. The disclosures in this patent are herein incorporated by reference.

In this referenced disclosure, context information is instantly provided as each character is entered in the query box, thus the user can immediately narrow down the scope of the search to quickly find the needed information, without the need to sift through a long list of search results. In the present invention, new embodiments are disclosed to provide context information about searchable objects even before the user starts to enter any character in the query box; and in some other embodiments, searching for information related to what the user is viewing can be automatically performed based on the topics of the content being displayed.

In U.S. Provisional Patent Application 61/680,715 entitled "System, Methods and User Interface for Facilitating Searching Of Electronic Objects", filed on Aug. 8, 2012, methods are disclosed to enable users to start searching various objects including documents in a browsing fashion, by combining the process of browsing with the process of search. The disclosures in this application are herein incorporated by reference.

In this referenced disclosure, a user interface object is provided, such as a button embodied either as a software object, or as a hardware object, and when the user acts on the object, pre-organized information about the available objects stored in the system are presented to the user in a form in which the user can easily browse through the organized information structure to find the needed object.

In U.S. Pat. No. 8,407,217, entitled "Automated Topic Discovery in Documents", methods are disclosed for discovering topics or concepts conveyed in the content of a document, as well as a document collection, based on the grammatical and distributional attributes associated with the terms, and terms or sentences or paragraphs representing the main topics or concepts conveyed in the document are identified and extracted. One application of using the discovered topic terms is in providing more accurate search results based on topics, and another application is in using the representative terms to label document objects with tags or summaries or categories, without requiring the user either to open the document or to perform a search in order to find what the document is about.

In U.S. Provisional Patent Application 61/682,205 entitled "System and Methods for Determining Term Importance and Relevance between Text Contents Using Conceptual Association Datasets", filed on Aug. 11, 2012, more methods are disclosed for determining the degree of importance of a term in a text content in terms of representing the topics or concept conveyed in the text content, based on the grammatical and semantic and distributional attributes associated with the terms. The methods disclosed in this application are herein incorporated by reference.

In U.S. Provisional Patent Application 61/749,302 entitled "System, Methods, and Data Structure for Quantitative Assessment of Contextualized Symbolic Associations" filed on Jan. 5, 2013, methods for using more contextual attributes are disclosed. The methods further include assigning a weighting co-efficient to a term based on its position in the text content, or its position relative to a specific term, or the distance of the term from a specific term, or the presence or absence of a specific term in the context, in addition to using the grammatical or semantic contextual information. These methods can also be used for determining the term importance score of the terms in the text content, and the selection of terms for displaying the related information can also be based on the importance scores calculated using these methods. The methods disclosed in this application are herein incorporated by reference.

In the present invention, more embodiments are disclosed for the features of using automatic document tagging or summary as an effective alternative to conventional search, and for enabling more effective searching methods, including automatic search based on the topics of the documents of interest, and searching in a browsing fashion without requiring the user to enter any text in the search box, or without using a query box at all.

In the following description, a document, or a text content in general, can either be in an opened state, in which its content is in a viewable state, or in a closed state, in which the document is represented as a file object on a computing device, with an icon or name associated with the file object, whenever applicable.

Furthermore, a document can include regular documents, emails, images, videos, audio, and other file objects with textual contents or metadata, and the term "document" and "text content" can be interchangeably used. Furthermore, the word "term" and "terms" may also be interchangeably used when referring to either a single instance or multiple instances of words or phrases.

Using Terms Extracted from Document Content to Label the Document Object

In U.S. Pat. No. 8,407,217, a term identified as a topic term of a document is extracted and displayed in a way that can function as a tag or summary of the document. Different methods are disclosed for determining the likelihood of a term being representative of the topics or concepts or other information conveyed in the document. In the present disclosure, more methods are disclosed for identifying and selecting the most important or representative terms in a document.

Conventional methods of previewing information from a text content are limited to extracting the first few words or the first word sequence consisting of a few words from the beginning of the text content, such as some preview features of certain email applications in the market, or limited to extracting the title of a document if available. The present invention overcomes such limitations by using more advanced analytical methods such as grammatical and semantic and contextual analysis in identifying the representative terms under various contexts, and can more reliably identify and extract the most informative part of the text content.

As described in the reference disclosures, grammatical attributes, such as whether a term is in the subject or predicate position of a sentence, or is a head or modifier in a multi-word phrase, etc., can be used to determine the importance of a term in the text content. Other grammatical attributes also include the parts of speech of the terms in a particular context, etc. Furthermore, semantic attributes, such as whether a term is the name of a physical or abstract object, a person, or an attribute or property of an object or person; or whether it is in a semantic role of an actor/agent, recipient, or instruments, etc.; or whether a term carries a positive or negative opinion, or whether a term is associated with a positive or negative comment, etc., can all be used for determining the importance of the term in the text content, such as by assigning a weight value to the term based on one or more of the attributes.

In some embodiments, for the purpose of more effectively tagging the document, as well as for searching information related to the document contents, special terms can be assigned with larger importance values, and be selected and extracted based on their grammatical or semantic attributes. For example, for tagging a document or an email, terms such as the name of a task, a due date, a calendar event, or a question, an event or action name, or a name of an entity of special interest, etc., can be assigned larger importance or weight values as needed.

Furthermore, certain terms related to a specific topic domain can also be treated as more important than other terms, or be assigned larger importance score values. For example, in the financial market domain, certain terms convey information about events or actions such as merger & acquisition, management change of certain companies, earnings exceeding or below expectations, positive or negative predication on company stock performance, or that of overall market, major/influential purchase/selling of certain company stocks, IPO and related events, sentiments, announcements, etc. When the topic domain can be identified, the system of the present invention can adjust the criteria for determining the importance of terms in the text content, and identify and extract the most relevant or informative terms, and display such terms as document tags or summaries, or as suggestions for searching related information, which will be described in more detail in a later part of the present disclosure.

In another example, when the documents to be tagged are job descriptions or resumes, terms that represent names of skills, positions, etc., can be assigned larger importance value than other terms when needed.

In some embodiments, other attributes associated with a term can also be used in determining the importance of the term. For example, the distributional attributes, such as the position of a term in the document, or in a sentence or a paragraph, or the position of the sentence or paragraph containing the term in the document, and the frequency of occurrence of the term, etc., can be used in determining the importance of the term.

Furthermore, as is described in more detail in the referenced disclosures, the importance of a term can further be determined based on the importance or prominence measure of the term in the current document and the importance or prominence measure of the same term in other documents.

In some embodiments, a weighting co-efficient can be assigned to a term based on one or more of the attributes described above, and a numeric value can be obtained as a quantitative measure of the importance of the term in a document as a term importance score. The score can be obtained by adding or multiplying various weighting co-efficient values assigned to the term; and terms can be selected based on their scores. In some embodiments, a threshold can be predefined and terms with an importance score above the threshold can be selected to represent the topics or concepts conveyed in the document. In some embodiments, only the top or the most important terms are selected, without specifically using a threshold.

In some embodiments, only a portion of the document content is used when identifying terms that represent the topics or concepts conveyed in the document, especially with long documents.

In some embodiments, terms in the metadata of the document, when available, are also included for analysis when identifying terms that represent the topics or concepts of the document. For example, if the document is an HTML file that contains terms in metadata tags such as the title, description, keywords, etc., such terms and related information can also be used in determining the importance of a term or the likelihood of a term in representing the topic of the document, along with other terms and other analysis methods.

In some embodiments, the extracted terms are automatically attached to the document object, and displayed in connection with the document as a tag or summary.

In some other embodiments, one or more terms are extracted, and are then presented to the user as candidates or suggestions for tags or summaries, and the user can manually select one or more of such terms to be attached to the document, or to be displayed as a tag or summary of the document, or to be used to rename the document when it helps to make the document name more descriptive.

In some other embodiments, users can edit the terms presented as suggestions for tagging the document, and make appropriate changes as needed.

In some embodiments, multiple documents can be processed in a batch mode, and the tags can be displayed for each document when the document objects or their icons are displayed in a list or a group view format, such as commonly seen in various file management tools on various computer operating systems or cloud-based or Web-based file management environments.

In some embodiments, the processing or analysis of the text content can be done locally on the computing device where the document resides or is displayed, or remotely by transmitting at least a portion of the content to a text or linguistic processor or processing module, and the results can be transmitted back to the local device and be displayed in a user interface.

Renaming the Document Object Using Terms Extracted from Document Content

Often, for a user, documents or other files from other sources, such as shared, emailed, or downloaded from Internet, can have default file names based on various naming conventions and practices. Many of the file names in such cases may not be descriptive about their content or topics in a way the user expects or want them to be. In such cases, finding a particular document of this type later can be difficult as the file names may not indicate or suggest what the document content is about. In such cases, the feature of automatic tagging and renaming using topic terms extracted from the content can provide a solution for more effectively finding the needed documents than conventional methods.

In some embodiments, the system of the present invention can first detect the current name of a document, and compare with the most important terms extracted from the content, and if the existing file name does not match any of the terms, the system can make a suggestion to the user to rename the file by adding one of the terms extracted to the current file name, or replacing the current file name with one or more terms extracted.

A similar case is with emails. Often, the text in the conventional "Subject" line of an incoming email does not match the topics of the real content, especially when the email is part of a thread where the topics have shifted from the original subject. In such cases, finding a particular email among many emails having the same subject line can be difficult. However, with the automatic tagging feature of the present invention, important terms representing topics of the content can be identified and extracted; new headings can be provided in the user interface, displaying one or more of the terms that represent the topics of the email content. Similarly, the system can also make suggestions to the user to change the subject line with one or more of the topic terms when composing or replying to an email.

For example, in some embodiments of the present invention, when a user is composing an email or replying to an email, the system can check if the text of the current Subject line contains one or more topic words; and if not, or if the current subject line is blank as the originator of the mail has not entered any text for the subject line, the system can display a message suggesting to modify the current subject field with one or more of the extracted terms from the content of the email, without requiring the user spending time or effort in manually doing so.

In addition to conventional document objects or emails, the same function can also be applied to any other types of objects that contain text.

FIG. 1 illustrates an exemplar case of displaying tags or summaries using terms extracted from documents, and for multiple document objects in a list view format, in which the documents are in a closed state and displayed as a file object icon or name, but the topics of the documents can easily be found without opening the documents or conducting a search.

In FIG. 1, one or more terms can be extracted from the text content of each document, and be attached to the corresponding document objects (110), and be displayed as automatically generated tags under the exemplar headings of "first topic" (100), "second topic" (120), etc.

Multiple terms (130) can be displayed to the user either as automatically generated tags, or as candidates or suggestions, and the user can select or edit one or more terms for default display for the respective document. Such tags can also be used as a brief summary, or used as candidates for renaming the document if the user so desires.

The display window 130 also illustrates an exemplar case of displaying tags or summaries when the user acts on a document object, such as putting a pointing device over the document object icon or the tag field, or touching the document name or icon or the tag field.

FIG. 2 is an exemplar application of the automatic tagging for emails as a special type of documents, and in a list view format. In addition to the conventional "Subject" headings (200), other terms that can also represent the topics of the email content (210) can be extracted using the method described above and displayed under the exemplar heading of "Topics" (220) for each email.

Figure 3:
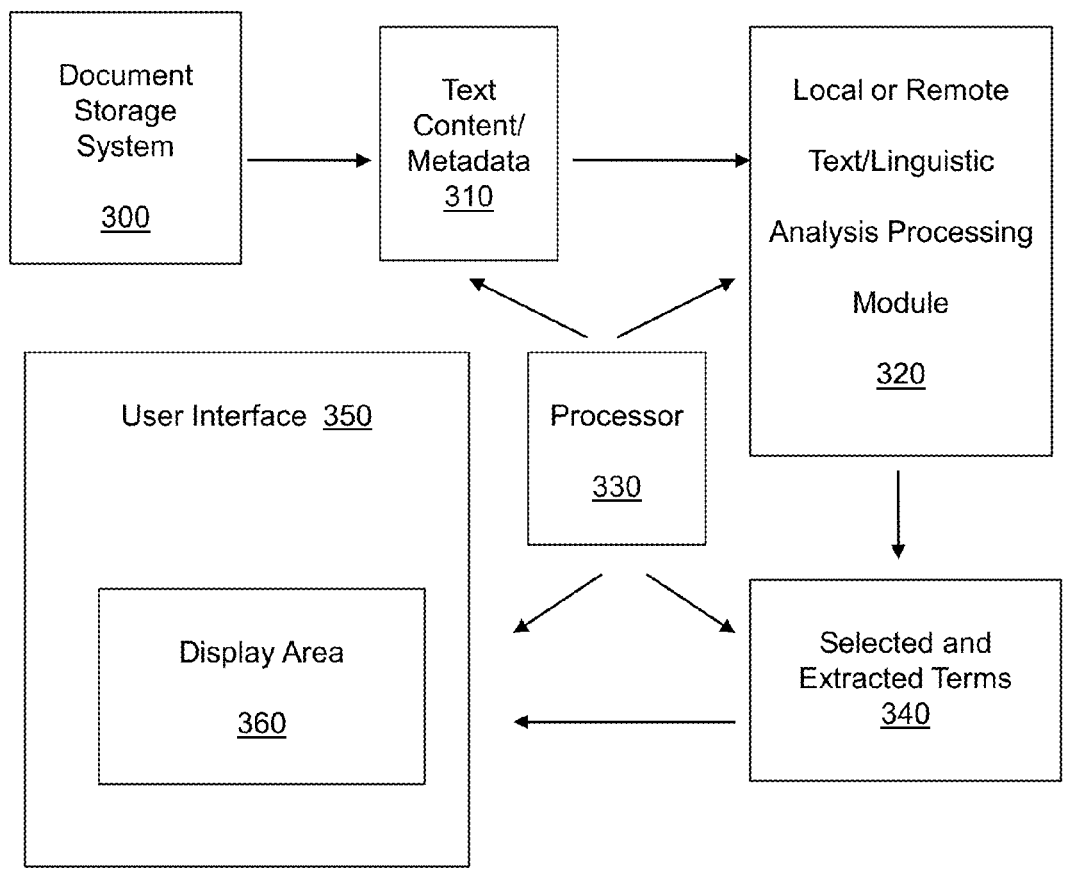
FIG. 3 is a conceptual high-level system diagram of one embodiment illustrating the components and steps for processing, selecting, extracting, and displaying the topic terms as tags or summaries.

FIG. 3 is an exemplar system diagram illustrating the components and steps for processing, selecting, extracting, and displaying the topic terms as tags or summaries. Text content or metadata (310) is received from the Document Storage System (300), and is transmitted to the Text/Linguistic Analysis and Processing Module (320), which can be either a local processing module on the same device with the document or email, or a remotely located server/processor. The module 320 selects and extracts, from the received text, terms that are considered to be representative of the information in the document content. The selected and extracted terms (340) are sent back to the source, and displayed in a display area (360) in a user interface (350).

In some embodiments, the tags can also be used as category names, or for linking a document to an existing or predefined category, especially, when a term for the tagging matches a category name.

In some embodiments, the terms extracted and displayed can contain a sentence or a paragraph, or a sentence or a paragraph that contains a specific word or phrase; and in such a case, these terms as tags can also function as a more informative summary of the document.

In some embodiments, the tagging or summary methods described above with examples of individual documents can further be applied to a collection of documents as a single object, such as a folder containing multiple documents, or an email folder containing multiple emails, or a collection of blog articles or comments displayed on or accessible from a Web page. In such cases, important terms extracted from individual documents can be merged based on a number of criteria, such as the number of documents containing the term and the importance score of the terms in each document, etc., and the most important terms can be selected as candidates for tagging the document collection.

Similar to tagging an individual document as described above, when tagging or summarizing a collection of multiple documents, in some embodiments, only a portion of the text in each document, or from a portion of the documents in the entire collection, are processed, and processing can take place either locally, or remotely, and users can select one or more of the terms as tags or summaries for the document collection, or use one or more of the terms to rename the document collection, such as the name of a document or email folder.

Using Terms Extracted from Document Content for Searching Related Information

Searching Related Information Based on an Open Document

In the present invention, the terms extracted using the method as described above can also be used for searching information in a more effective way than conventional search methods.

In one embodiment, when the user acts on a word (or a single-word term) in the document, the system can automatically create a search query with the word as one of the terms in the query, without requiring the user selecting or highlight the word.

In another embodiment, when the user acts on a word, the system performs a contextual analysis including grammatical or semantic analysis, and extracts a multi-word phrase that contains the word when applicable, without requiring the user to select the entire phrase, and then enables the user to use the identified phrase as an element in the query for searching related information.

In some embodiments, when the user acts on a word, the system further extracts other terms or phrases in the surrounding text of the word that the user is acting on, such as other terms in one or more sentences or paragraphs containing or surrounding the word, and enables the user to use the terms as an element in the query. This can make it much easier for the user to search information related to the content in the current or specific sentence or paragraph, without spending much effort looking for a suitable keyword or phrases in the context.

In some other embodiments, when the user acts on a word, the system can extract other terms from the entire document that are considered to be semantically, or conceptually related to the current word, and enable the user to use the terms as an element in the query.

Figure 4:
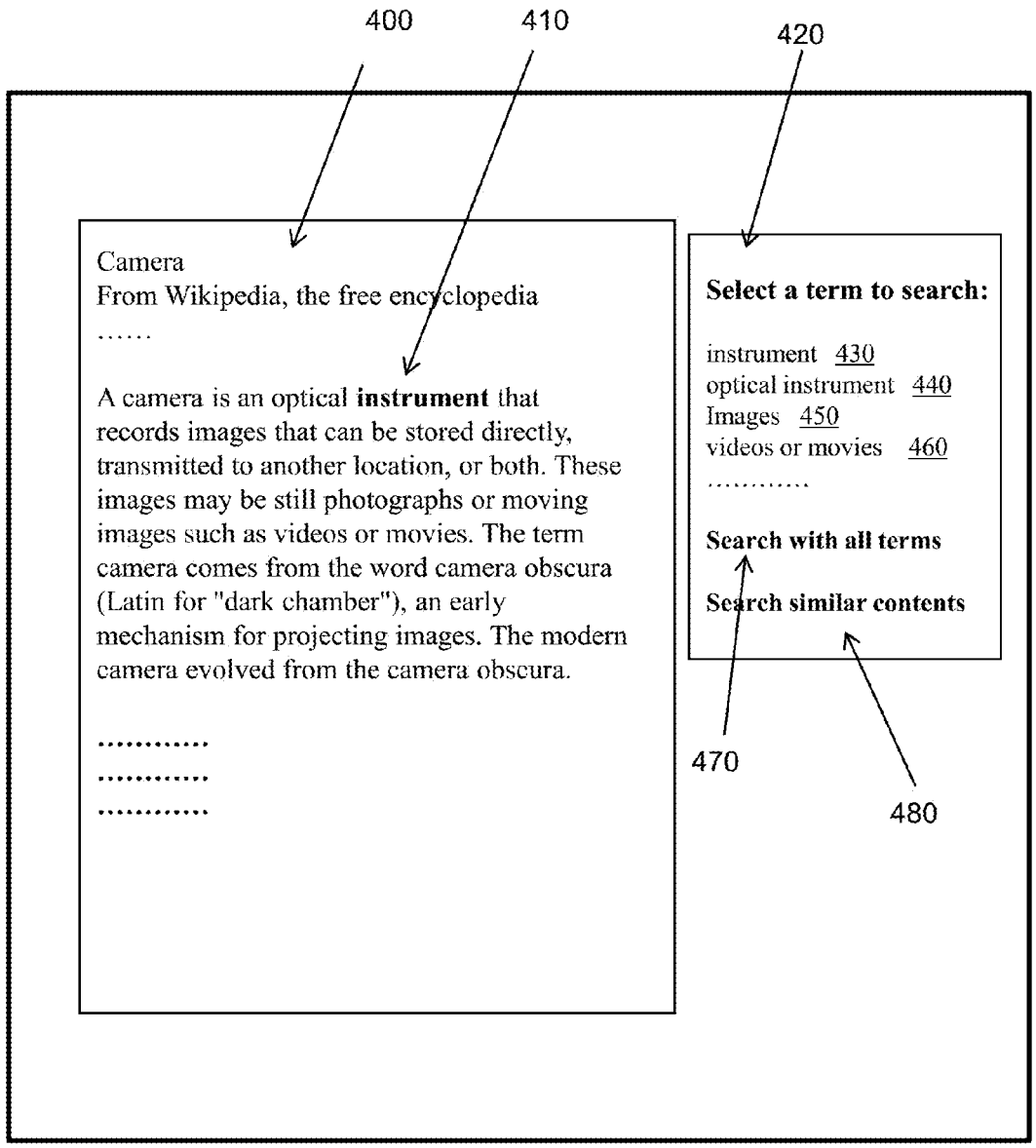
FIG. 4 is an illustration of one embodiment of the present invention showing the identification and extraction of surrounding terms for search when a user acts on a single word in an open document or Web page.

FIG. 4 is an illustration of identifying and extracting surrounding terms for search when a user acts on a single word in an open document or Web page. In FIG. 4, when the user is reading a document (400) and acts on the word "instrument" (410), unlike conventional approaches that allow the user to search with a selected word, in this case "instrument", in the present invention, when the user acts on a word, a window (420) can be opened showing suggested query words. In search window 420, in addition to the word (430) the user acts on, other terms in the context can also be identified and extracted without requiring the user to select each of them, such as the phrase "optical instrument" (440) that contains the word "instrument". Furthermore, other terms in the surrounding sentences such as "image" (450), and "videos or movies" (460) can also be automatically displayed as search suggestions. In some embodiments, the user can select all terms to be included in the query (470). In some other embodiments, the user can select the option of searching similar content with more terms extracted from the current document but may not be displayed (480).

In some other embodiments, when the user acts on a word, the system can extract other terms from the entire document, and enable the user to search information related to the current document using the terms in a query, without displaying the terms to the user.

In some other embodiments, the system can extract terms from a portion or the entire document, and enable the user to search information related to the current document using the terms in a query, without requiring the user to act on or select a specific word.

As is described above, in both the referenced disclosures and the present disclosure, various methods can be applied to determine the importance measure of a term in a document in representing the topics or concepts conveyed in the document. When searching related information based on a particular document, whether the document is in an open or viewable state or not, a portion or the whole of the content of the document can be sent to a text processing component of the system, and terms that are considered to be important in representing the topics or concepts can be extracted and returned, and can then be used as part of or the whole of a query to search for related information.

In some embodiments, the system can include terms from the metadata associated with the document, such as titles or subtitles, headings, file names, comments, and other terms in certain metadata tags, etc.

In some embodiments, only a portion of the document content is used when identifying terms that represent the topics or concepts conveyed in the document, especially with long documents.

In addition to the above use cases when a user acts on a word in an open document, in other cases, the terms so identified and extracted can either be displayed for the user to select which one to use in a query, or automatic search can be performed by the system using the most important terms as the default for an initial query, and the initial search results of this automatic search can be displayed to the user as well, without requiring the user to perform an action of search.

For example, when the user is reading a document or a Web page, terms representing the important topics of the content can be identified and extracted through background processing, and then be displayed in a separate area on the same user interface accessible to the user, and the user can select one or more terms to be used in a query. The system can either wait until the user indicates an intention to perform a search, or can automatically perform a search by using one or more of the most important terms displayed as the default initial query, and the initial search results of this automatic search can be displayed to the user.

Figure 5:
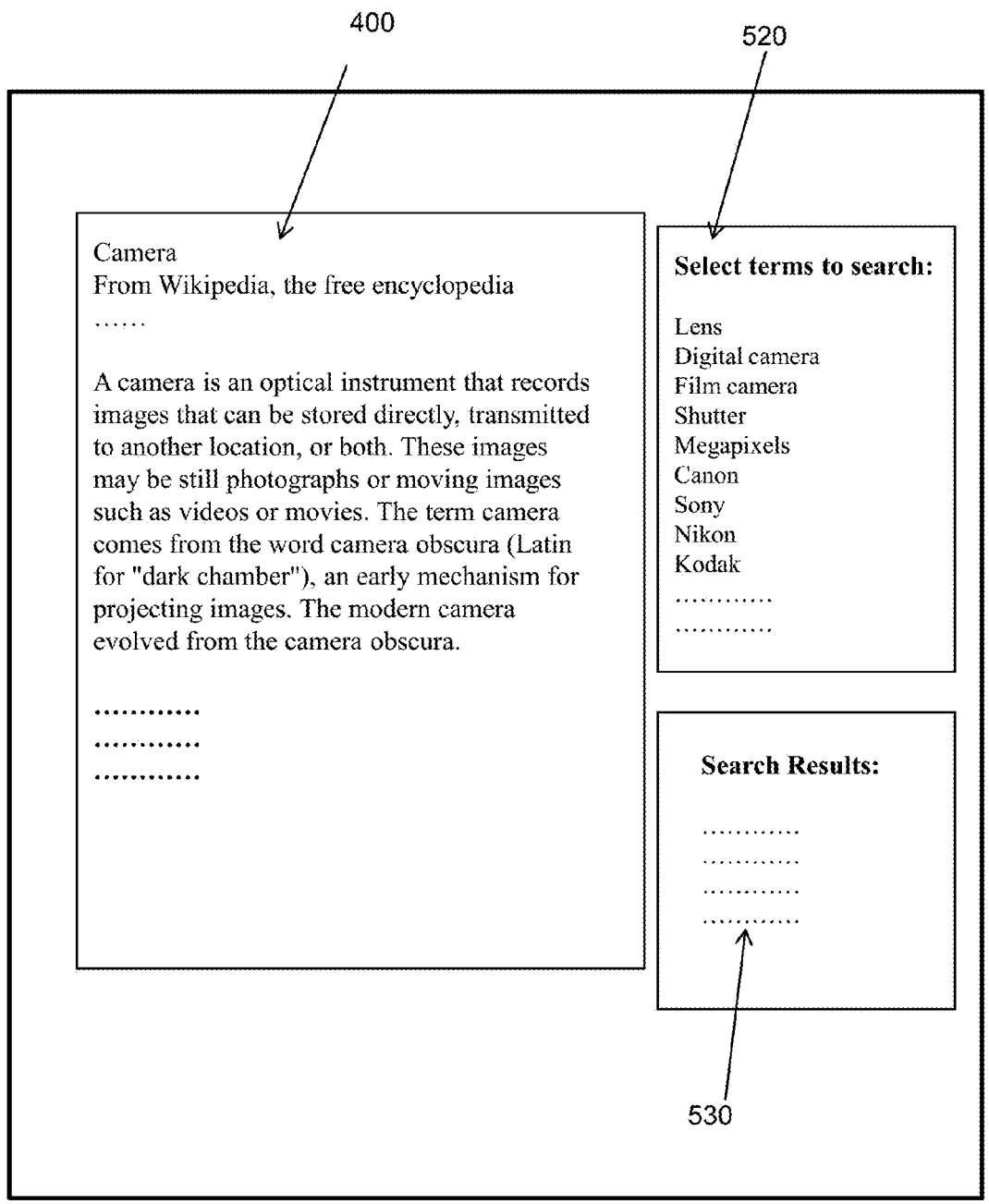
FIG. 5 is an illustration of one embodiment of the present invention where searchable terms extracted from the current document content are automatically displayed with results from an automatically performed search.

FIG. 5 is an illustration of one embodiment of the present invention that automatically displays searchable terms extracted from the current document content, optionally with results from automatically performed search. In FIG. 5, when the user is reading a document or a Web page (400), important terms representing the topics or concepts conveyed in the documents can automatically be displayed in a separate display area (520), and the user can select one or more of the terms to search for related information. Area 530 displays the search results, which can be the initial results from automatically performed search before the user performs a search action, or can be the results from user-initiated search, as described above.

In some embodiments, a user interface object, such as a button with an exemplar label of "show similar contents/information" can be provided to allow the user to enable or disable the display of the terms or the automatic search and the search results. And search can be executed using one or more of the displayed terms as a query when the user acts on one or more of the displayed terms.

In some embodiments, terms displayed to the user can also be based on user search history or a user profile.

In some embodiments, term importance scores as calculated using the various methods described above can also be displayed along with the terms, and users can select the suggested terms as well as edit the terms or their corresponding importance score values to customize the search, or to indicate how important a term is for the search.

In some other embodiments, user interface objects are provided for the user to indicate the importance of a term for the search purpose.

Figure 6:
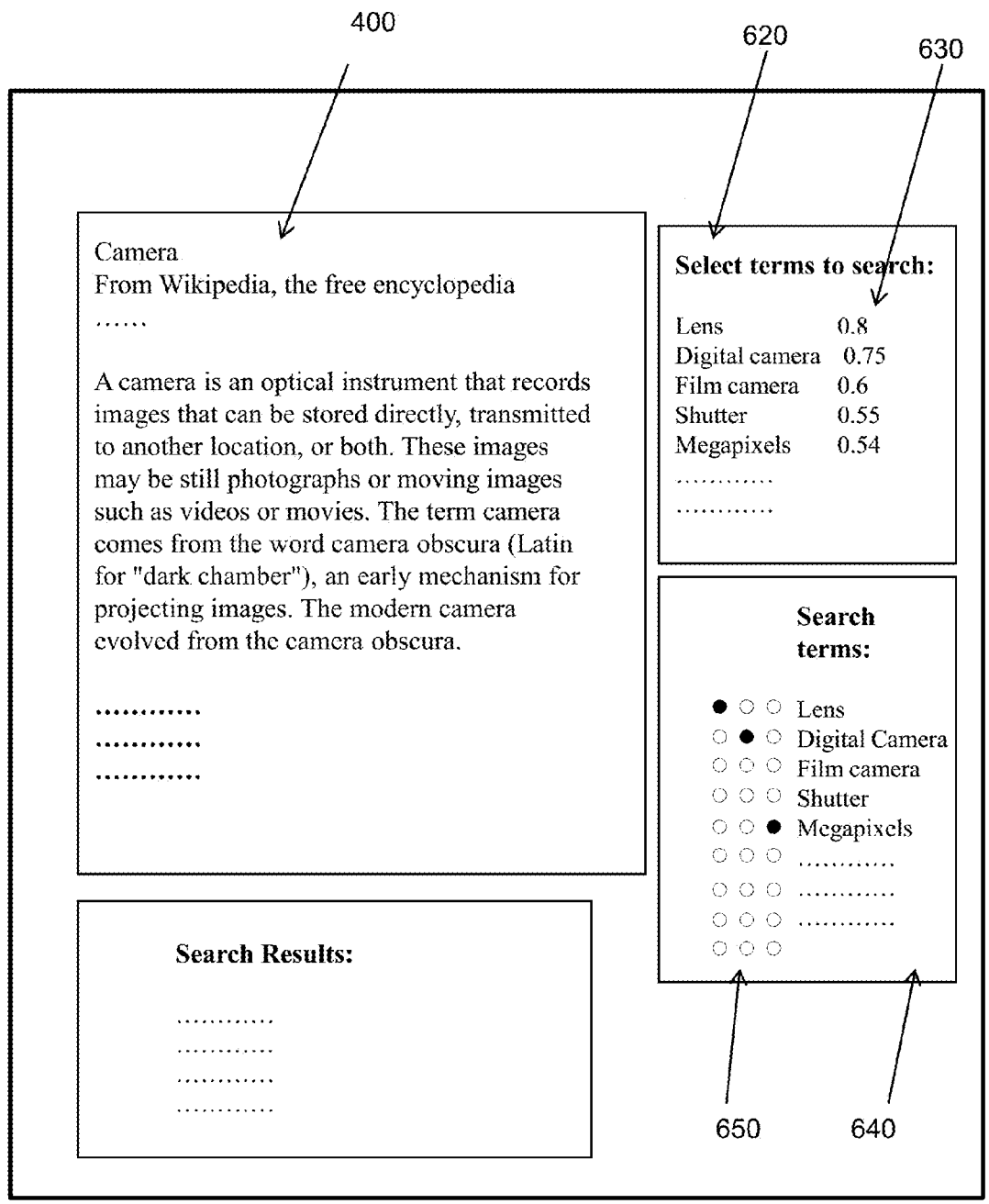
FIG. 6 is an illustration of one embodiment providing term importance scores and user interface objects for the user to indicate the importance of a term for the search purpose.

FIG. 6 is an illustration of providing term importance scores and user interface objects for the user to indicate the importance of a term for the search purpose. In FIG. 6, term importance scores (630) are provided in the display area 620, and the user can edit the values to customize the search. In some other embodiments, user interface objects (650) corresponding to each term for the user to indicate the desired importance are also provided in the display area 640.

An advantage of the above embodiments is that they make it much easier for users to search related content or information while reading a document, such as searching for other web pages or social data or documents with a similar topic while reading a web page or a blog, or writing a document, or searching a resume database while reading a job description, or searching for a similar candidate's resume while reading a resume, etc.

Usually, when searching for information related to what the user is reading, it can often be cumbersome in deciding on which keywords to use for the search. However, with the present invention, for example, if the user is reading a job description, the user can easily search relevant resumes without spending much effort in identifying which keywords in the job description to use and indicating how important each keyword is for the search. Terms can be identified and extracted based on the different importance criteria as described above, and displayed to the user, and along with an option to specify the importance values for each term, a user can customize the terms and values to his/her specific needs by simply selecting or editing terms or values that are automatically presented.

In some embodiments, a part or the whole of the document content or metadata can be transferred to a query box for search, and the various methods of determining the term importance can be applied to the text in the query box to transform the text into a list of terms as query keywords, which can be equivalent to treating the query text as a document.

In some embodiments, when the user acts on a search box, such as putting the cursor in the box or touching the text area as an indication of an intent to perform a search, one or more terms extracted from the document content or from metadata associated with the document as described above can be displayed in the search box or in an area near the search box, before the user enters any text, and the user can select one or more of the displayed terms to be included in the search query.

Figure 7:
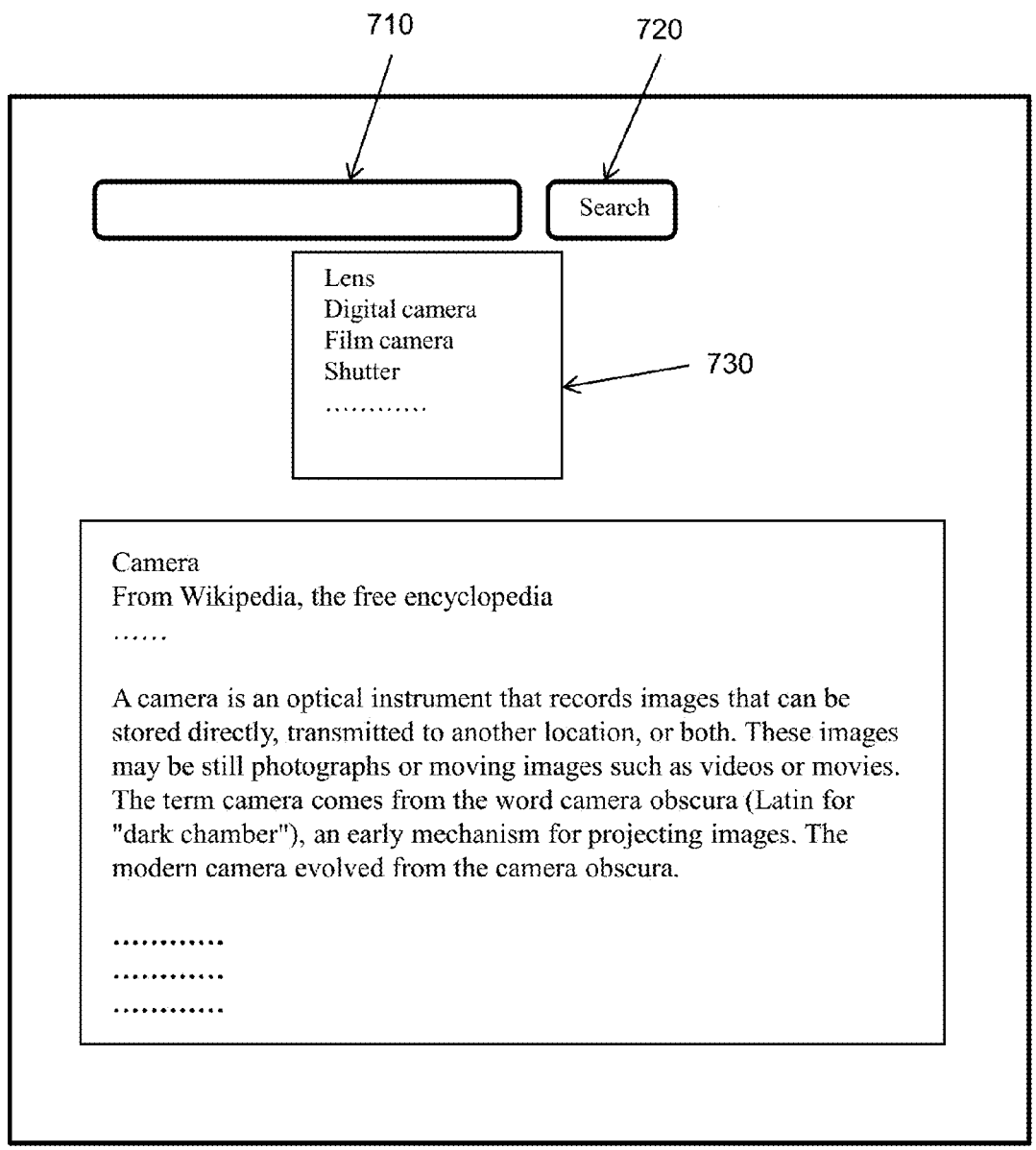
FIG. 7 illustrates an exemplar case when the user puts the cursor in a conventional query box according to one embodiment.

FIG. 7 illustrates an exemplar case when the user places the cursor in a conventional query box (710). In the present invention, before the user starts to enter any text in the query box, one or more terms (730) representing the main topics of the document can be displayed as search suggestions. This is different from conventional search in multiple ways. First, the terms are directly extracted from the document currently being viewed, and secondly, the terms are displayed even before the user starts to enter any text in the query box. It provides a convenient feature for the user to search for related information.

Searching Related Information Based on an Unopened Document

The methods of using topic terms extracted from the currently open document content as suggestions for search queries as described above can also be applied to cases when the document is in a closed state, or the content of the document, such as a personal or company document, or a resume or a job description, etc., is not in a viewable state.

For example, in some embodiments, when the document is in an unopened or not viewable state, such as a document in a folder or directory of a computer or network file system, when the user acts on an icon or an area associated with the document object, the present invention displays one or more terms extracted from the document content using the methods as described above, and allows the user to initiate a search using one or more of the terms displayed.

This method can provide a convenient way for searching documents of a similar topic or similar nature.

One special application of this feature is in searching a resume database based on a job description. When a job description is located in a file system's folder or directory, the user can simply act on the file icon of the job description to display the most important terms in a display area, and can select one or more terms extracted from the job description, and perform a search using the terms as a query, without having to type each keyword into a search box.

The same feature of providing the importance values of the terms for user to edit, or user interface objects that allow the user to indicate how important each term is for the search, as illustrated in FIG. 6, can also be made available for this type of search.

This method of automatic extraction and display of important terms can also be effectively applied to other types of documents, such as proposals, reports, etc., to reduce a user's efforts in finding the right keywords for searching other documents, or information that may be similar or related to the current document.

In some embodiments, an option to search with terms extracted from the content can be provided when the user acts on the file object, without also displaying the terms extracted from the content.

Figure 8:
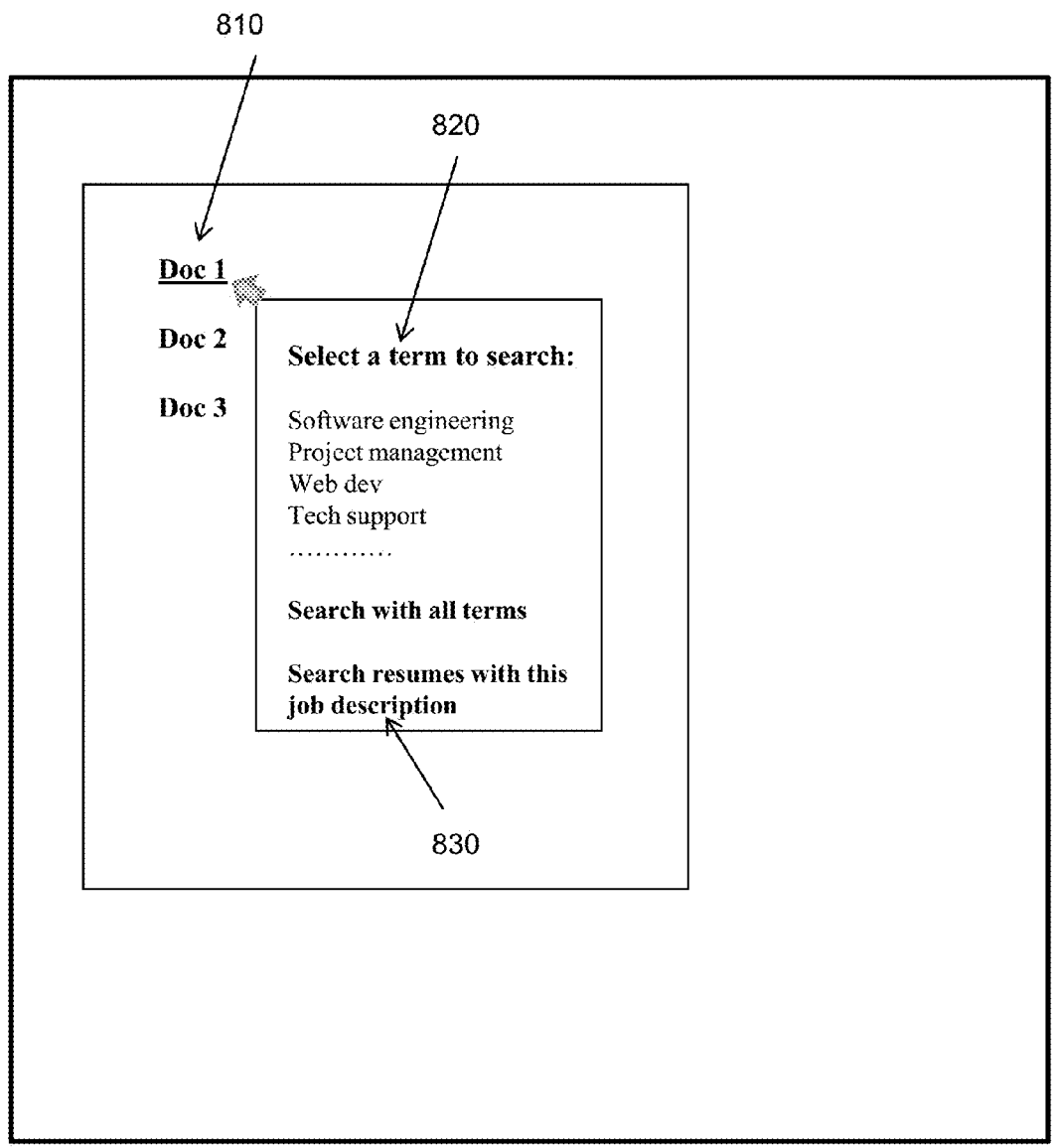
FIG. 8 is an illustration of searching based on topics or contents of a closed document according to embodiment.

FIG. 8 is an illustration of searching based on topics or contents of an unopened document. In FIG. 8, when the user acts on a document object's icon or name (810), terms (820) representing the main topics of the document can be displayed and made available for searching related information. In some embodiments, such as searching a resume database with a job description (830), the display of the terms can be optional.

In some embodiments, while the terms extracted from the content are displayed, term importance scores are also displayed such that the user can select the terms of particular score values, or edit the score values for more customized search results, such as illustrated in FIG. 6.

Searching in a Document Collection without Entering a Keyword

In conventional search, the user interface typically provides a search text box with a search button. Users need to come up with the right keywords to start a search. However, it is not always easy for users to come up with the right keywords.

On the other hand, if the number of documents in the index is not of an overwhelming amount like the index for Web pages over the entire Internet, but an index for personal documents, or company documents, or emails, search suggestions can still be provided even before the user enters a single character in the query box.

In U.S. patent application Ser. No. 12/972,462 entitled "System and Methods for Automated Document Topic Discovery, Browsable Search and Document Categorization", methods are disclosed for identifying the important terms in a document collection as the topic terms of the collection, and for using such terms for browsing the entire collection, without requiring the user to perform a keyword-based search in the conventional method. The disclosures in this patent application are herein incorporated by reference.

Using the methods in the referenced disclosure, a search index can be made browsable. In the present disclosure, when a user performs an action or indicates a desire to search in a document collection, prominent terms in the search index can be displayed to the user as suggestions, and the user can either select one or more of the suggested terms to be included in a query, or follow the links to the documents that contain such terms, especially those in which the terms are prominent in representing the topics of the documents in the collection.

In addition to making the search index browsable, in some embodiments, a special term list can be compiled consisting of prominent terms extracted either directly from the documents or from the search index, and can be displayed to the user as search suggestions before the user enters any text in the query box.

The importance measure of the terms can be calculated using the methods in the referenced disclosure or in the present disclosure as described above.

In the present invention, in response to a user's indication of an intention to search, such as putting a cursor in the query box, or pressing certain keys or key combinations, the topic terms of the document collection can be displayed as search suggestions, without requiring the user to enter a single character in the query box.

Figure 9:
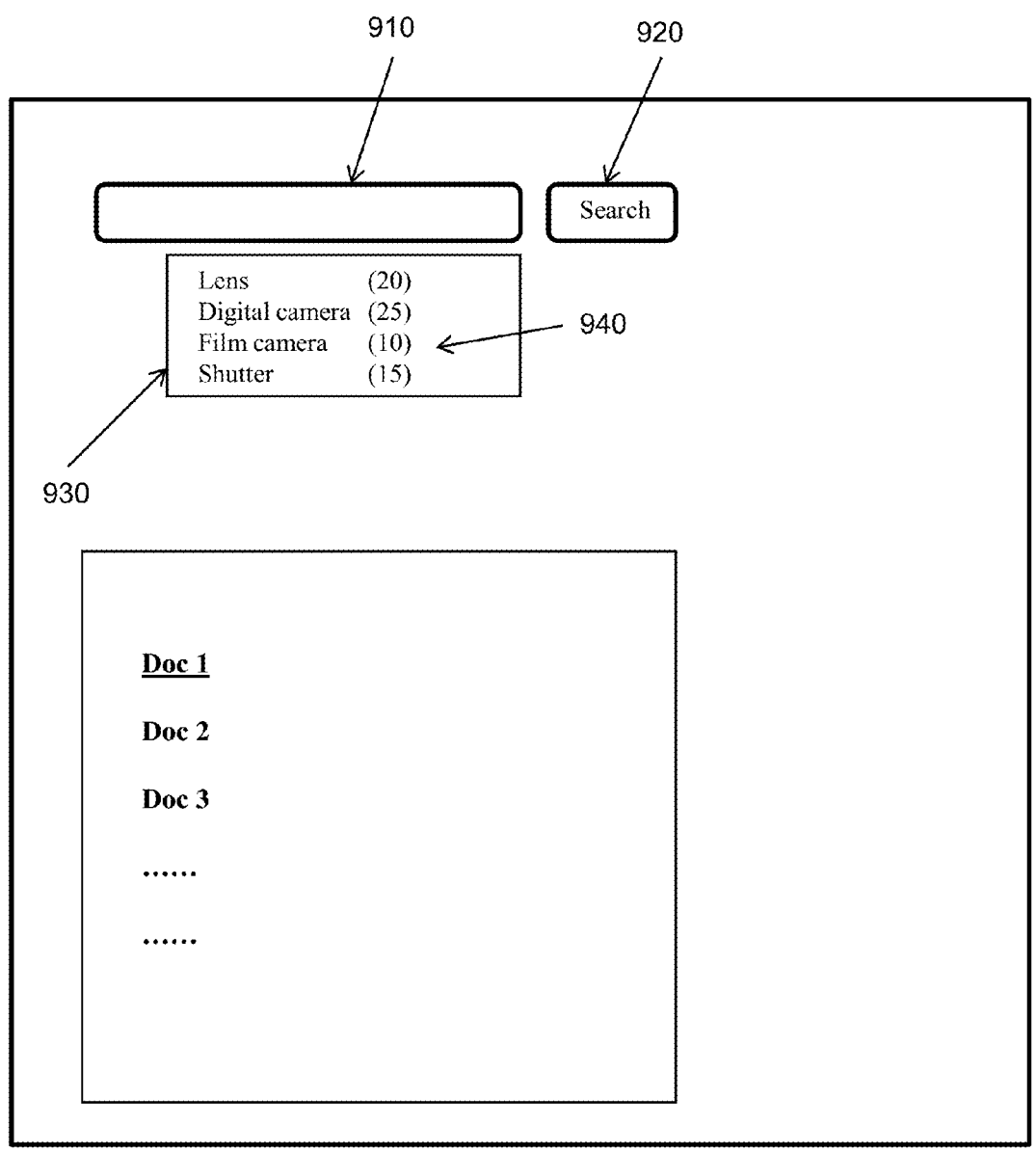
FIG. 9 is an exemplar case where prominent terms from a document collection are displayed when the user places the cursor in the query box prior to entering any text.

FIG. 9 is an exemplar case where prominent terms (930) from the search index or from the prominent term list are displayed when the user places the cursor in the query box (910) before entering any text. In some embodiments, the number of documents containing the corresponding terms, or other properties associated with the document containing the term (940), can also be displayed, as is described in the reference disclosures.

Such display can be enabled whether the documents in the collection are in a viewable state or not. In some embodiments, the terms displayed can also be sentences, or sentences that contain a specific term that represents the important information in the documents.

In some other embodiments, terms representing the topics of the document collection (930) can be displayed without the user indicating an intention to search, such as putting the cursor in a query box. In such cases, in the user interface, the presence of the query box (910) and the search button (920) are optional, and the terms can contain links to the documents such that while the terms provide a preview of the prominent topics of the document collection, users can access the related documents by following the links associated with the terms.

In some embodiments, the number of instances of a term under a certain type of context, or with a certain type of attribute or properties, can also be displayed in a similar way as illustrated in (940). For example, when the document collection contains user comments or reviews or articles that carry opinions, terms representing topics are often associated with comments that carry a positive or negative opinion, or sentiment type. In such case, when a term represents a topic, such as the name of a company or a product, the number of positive or negative or neutral comments associated with the topic can also be displayed in a similar fashion as illustrated by (940).

In some embodiments, as is described above with the tagging or summery feature, in the case of a product or service review or other type of contents where certain attributes such as an opinion or sentiment type is an important part of the information in the content, the topic terms that has the most comments, or the topic terms that has the highest or near highest number of positive comments, or negative comments, or certain types of other attributes, can be extracted and displayed as the most relevant or important information in the collection or individual document, and can be labeled with a heading such as "the best/worst feature", "the most liked feature", "the most agreed viewpoints", "the most discussed issues", etc., with or without the total number of comments being displayed, to function as a summary of the document collection or a single document, for more effective information presentation and utilization while searching function can also be enabled for these terms.

Also as described above, in U.S. Provisional Patent Application 61/680,715, entitled "System, Methods And User Interface For Facilitating Searching Of Electronic Objects", methods are disclosed to enable users to start searching in a browsing fashion, by pre-organizing information about the available document objects into groups and sub-groups, based on keywords as well as various metadata or properties of such document objects.

Based on methods in the above referenced disclosure, information about a plurality of documents as electronic objects stored on a local or remote computing or communication device is first gathered. Terms contained in the objects containing text are identified, and metadata or properties associated with the objects are collected. The objects are then organized into groups/categories or sub-groups/sub-categories based on the terms contained in the objects, or ranges of values of the metadata or properties associated with the objects. The groups or sub-groups are labeled with names based on the terms or descriptions of the metadata values or ranges. The groups and sub-groups are linked to the objects associated with the corresponding terms or metadata values or ranges.

In the present invention, when the user acts on a query box, such as putting a cursor in the query box, or touching the query box, before starting to enter any text in the query box, one or more of the groups and links are displayed. The user can retrieve the linked objects as search results by acting on the group or sub-group icons or names in the user interface associated with the objects.

Figure 10:
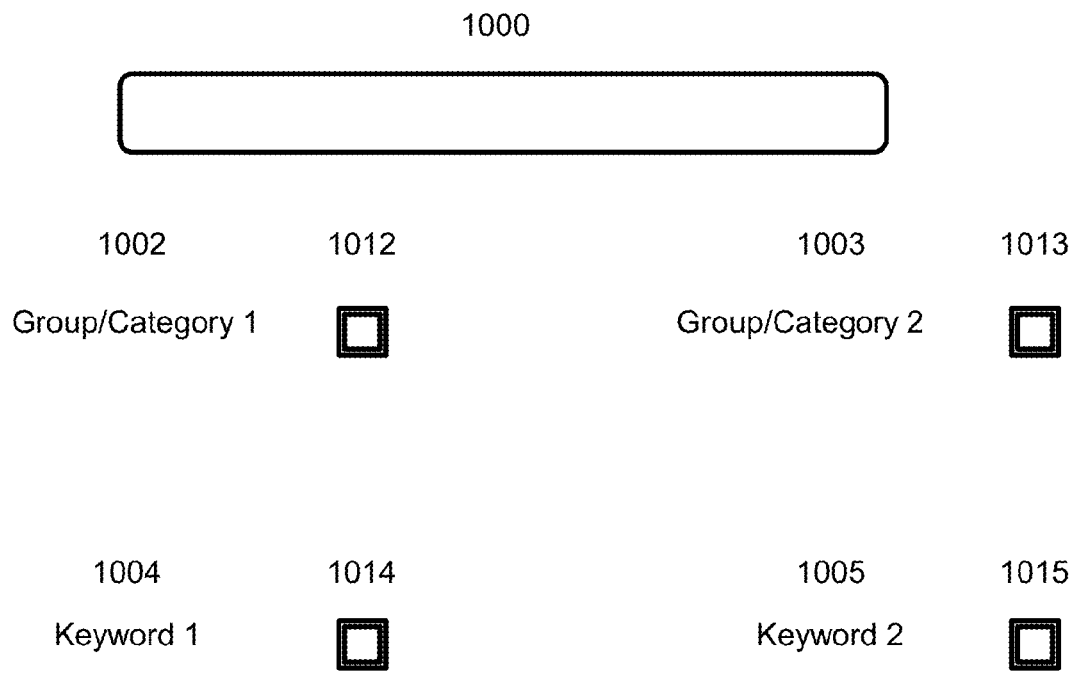
FIG. 10 illustrates an exemplar case when the user puts the cursor in the search box and grouped objects are displayed prior to the user entering any text in the query box according to another embodiment.

FIG. 10 illustrates an exemplar case when the user puts the cursor in the search box and grouped objects are displayed before the user enters any text in the query box. In FIG. 10, when the user places the cursor in the query box (1000), group or category names (1002-1005) are displayed and the user can act on any of them to continue browsing by groups or categories.

Figure 11:
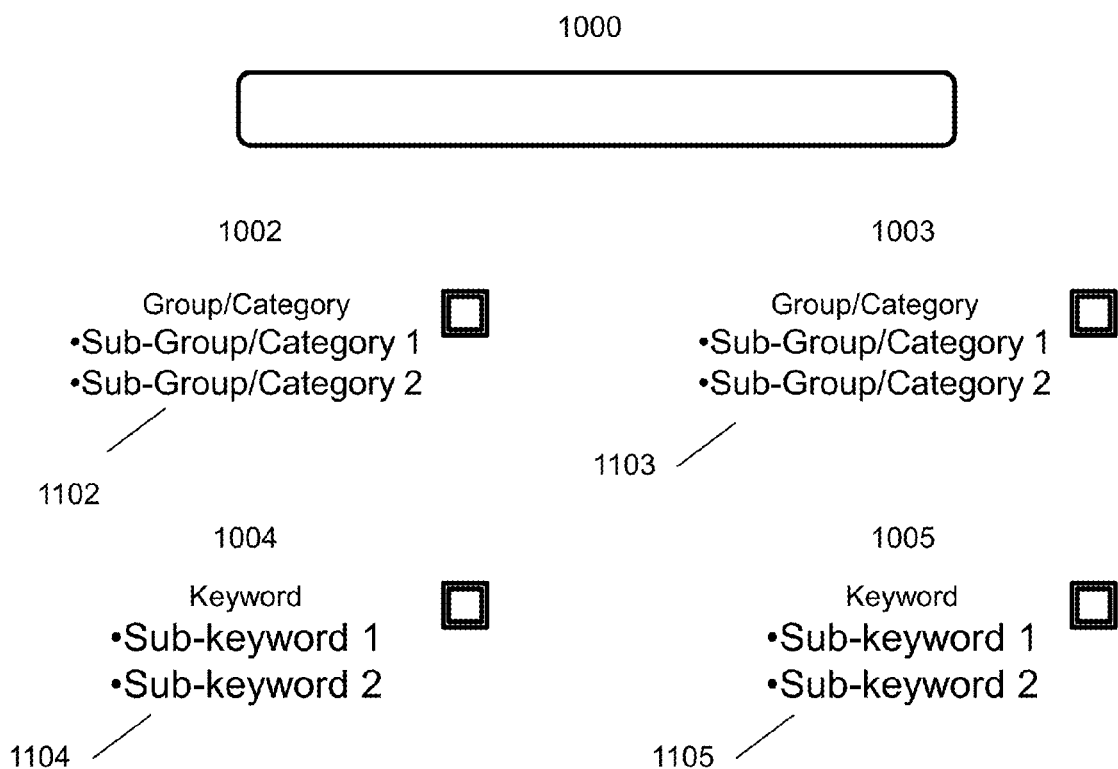
FIG. 11 illustrates an exemplar case when sub-groups (1102-1105) are displayed and available for browsing according to one embodiment.

FIG. 11 illustrates an exemplar case when sub-groups (1102-1105) are displayed and available for browsing.

As described above, the document object can include regular documents, emails, images, videos, audio or other types of file objects with textual or non-textual contents.

The metadata or properties can include file types, file locations, file date, author, number of objects in each group or sub-group, and other metadata associated with the objects; and the property values can include a specific file type, a specific date, a specific author name, or other specific information under a corresponding metadata or property.

In some embodiments, the number of objects having a specific term, property or property value, like the one shown in 940, can be dynamically displayed in the user interface in response to the user selection of the group or sub-group.

System, Methods, and User Interface for Presenting Information Based on Document Contents In U.S. Provisional Patent Application 61/805,141, entitled "System, Methods, and User Interface for Presenting Information Based on Document Contents", filed on Mar. 25, 2013, methods are disclosed for effectively presenting information extracted from document contents, in addition to the tagging or summary function as described in the present disclosure. The disclosures in this referenced application are herein incorporated by reference.

Conventional search engines display search results as links to the documents, together with a brief excerpt from the original documents showing the part of the content in the linked documents containing a keyword in the query. While an excerpt like that helps the user to determine whether the linked document is relevant to the intended search or not, and if relevant, users need to follow the link to open the document and read through the document to locate the specific information being sought.

Often, users may only need a quick answer to a question, or a brief overview of what is being said about a topic that the user is querying. In such cases, reading though the entire document to find the relevant information is inefficient.

For example, on the home page of certain Internet portals such as Yahoo.com, a number of popular search results are listed as "Trending Now". Acting on an entry in the list opens a search result page containing links to the Web pages that have contents about the topic. This is an example of the conventional way of displaying certain information.

Some other search engines can provide a well-formatted summary of the content as an answer to the query.

In contrast, the present invention provides a novel method of extracting comments on a given topic from multiple sources such as multiple Web pages, reviews, or other documents, or extracting terms that are identified as carrying related information about the topic, and displaying such comments in relation to the topic in a format like a tree structure, or a hierarchical structure for easy information utilization.

Figure 12:
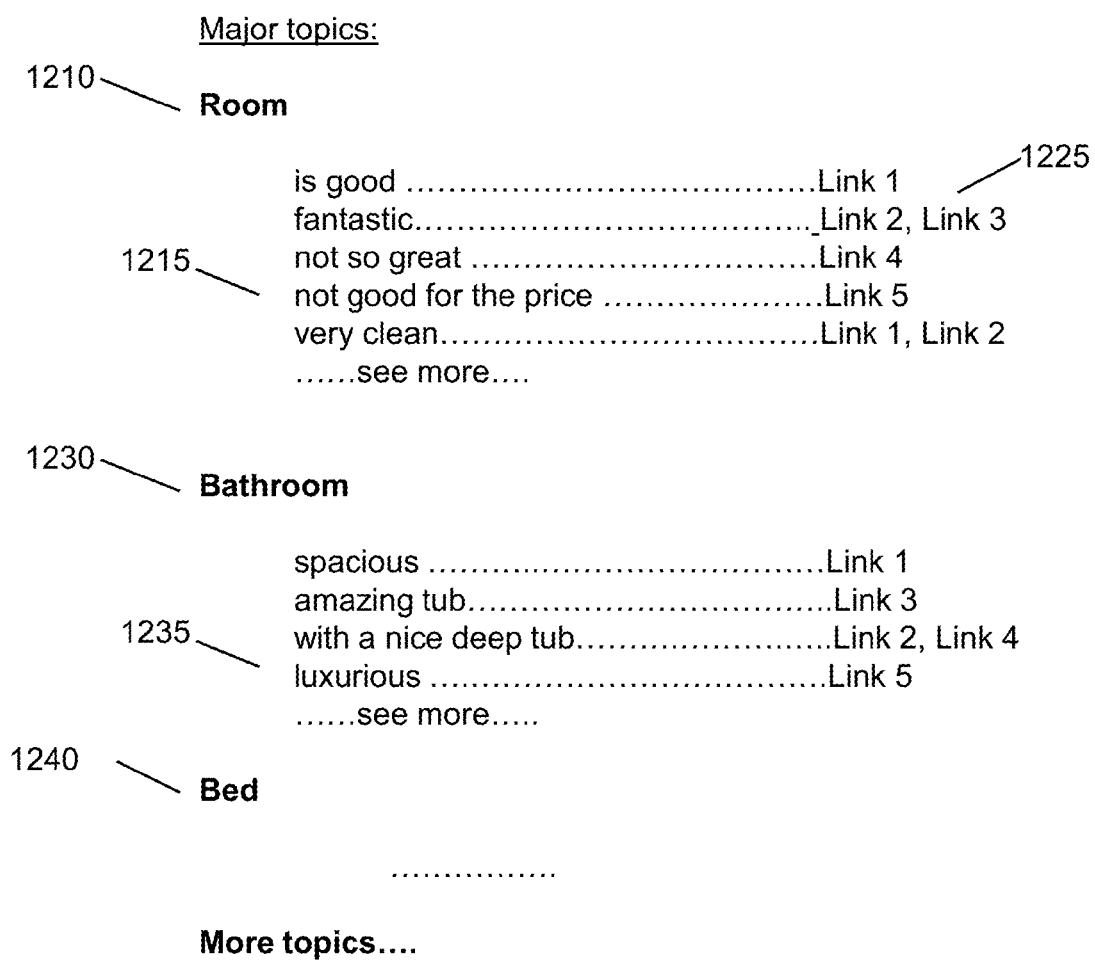
FIG. 12 is an example of displaying comments under a topic as a heading.

FIG. 12 is an example of a way such comments are displayed under a topic as a heading; and multiple topics and comments can be displayed in the same way as additional levels or nodes in the tree structure.

In FIG. 12, exemplar comment terms (1215, 1235) are extracted from one or more user reviews on a hotel. Such user reviews are the source documents. Topics or topic terms (1220, 1230, and 1240) are either identified or pre-defined. A method for identifying such terms as topics or as comments on the topic, and then extracting such terms for display in such a tree format is disclosed in the U.S. patent application Ser. No. 13/707,940, entitled "Automated Topic Discovery in Documents and Content Categorization", filed on Dec. 7, 2012, and also in U.S. patent application Ser. No. 13/709,827 entitled "System, Methods and User Interface for Discovering and Presenting Information in Text Content", filed on Dec. 10, 2012, as a method for creating a category structure for organizing the content of a document or multiple documents, and displaying in such a format.

In U.S. patent application Ser. No. 13/844,143, entitled "Systems, Methods, and User Interface for Effectively Presenting Information", filed on Mar. 15, 2013, and U.S. Provisional Patent Application 61/754,652, entitled "System, Methods, and User Interface for Presenting Information Associated with an Object", file on Jan. 21, 2013, the method is further extended to include displaying a search result, or dynamically displaying related information in a similar format when the user is reading or writing a document. The disclosures of these applications are herein incorporated by reference.

In one embodiment of the present invention, this topic-comment display format is further applied to any word or phrase that is used as a topic or heading and displayed in a user interface, such that, when the user acts on the word or phrase, such as moving a pointing device over the term, clicking, or touching on the term, one or more comments or comment terms related to the topic or topic term can be displayed to the user, without the user further needing to open the individual source pages.

In the following description, the words of "comment" and "comment term" are interchangeably used, and the words of "topic" or "topic term" are also interchangeably used. Furthermore, as in the referenced disclosures, the relationships between a topic and a comment can also be called, in a more general sense, the relationships between an object (or concept) and its properties. In some other cases, they can also be called the relationships between a property and its values. The methods of displaying information extracted from user generated content in the format of showing topic-comment, or object-property, or property-value relationships can generally apply to other cases in addition to the specific examples described below.

FIG. 13 illustrates an example of this embodiment when applied to the exemplar "Trending Now" section on the home page of Yahoo.com displayed as of this writing, or a second page after clicking on a topic. In FIG. 13, acting on one of the topic terms such as "Matt Lauer ABC" (1310) will display a list of comments (1320) extracted from the source web pages, instead of the conventional method of displaying a list of links to the individual source pages.

An advantage of the present method is that if a user only wants to have an overview of what is being said about the topic, the user does not need to follow the links to each individual document to find out the specific information, thus providing the user with a convenient choice of getting the needed information, without spending unnecessary time and efforts in digging for such information.

FIG. 13 is only an example of the application of the present invention. When the topic-comment relations can be identified using the methods disclosed in the referenced disclosures, any terms in any document such as a file or an email, or a text message or a social network comment, etc., can be treated as a topic term, and related comments can be extracted and displayed in connection with the topic term.

For example, important words or phrases, or terms in general, in a document or email can be identified using various methods including the methods disclosed in the referenced disclosures, and can be displayed to the user as tags or summaries of the contents of the document or email as described above. In addition to displaying such terms, comments related to such terms can also be identified and extracted, and displayed in a format as illustrated in FIG. 13.

Figure 14A:
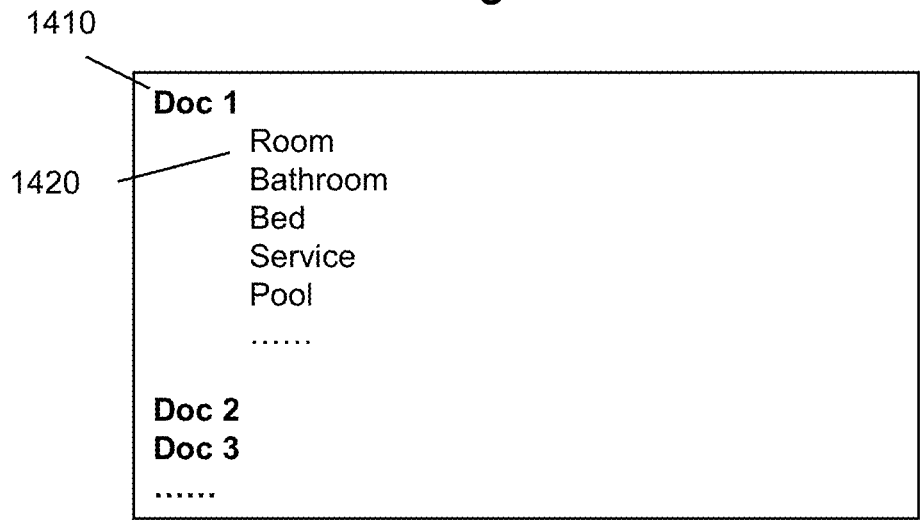
FIGS. 14A and 14B illustrate examples of displaying topic terms and comments under a topic in a user interface of a file management tool.
Figure 14B:
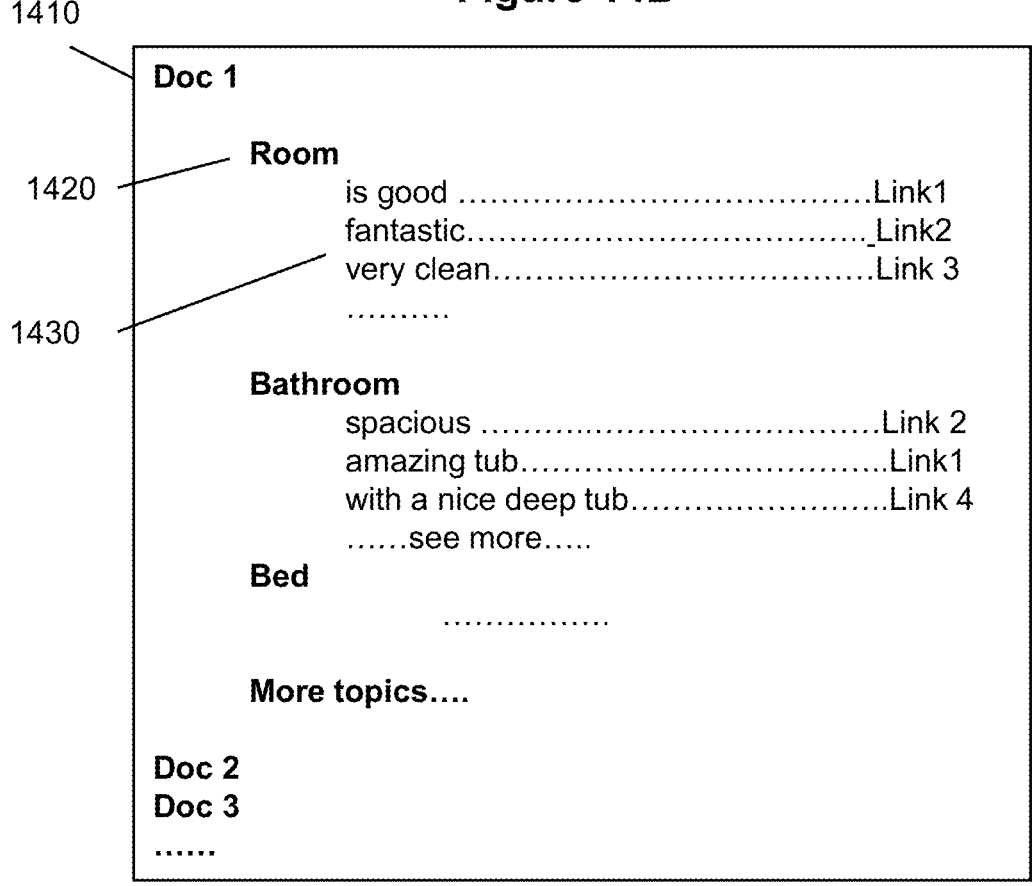

FIGS. 14A and 14B illustrate a user interface of a file management tool, such as the Windows Explorer that comes with the Windows Operating System. In FIG. 14A, for a given document (1410) of which an icon or name is displayed in the user interface, a list of automatically extracted terms 1420 can be displayed with or without the user acting on the icon or name of the document. In FIG. 14B, in addition to the keywords, comments (1430) related to the terms in 1420 can further be displayed to the user.

When such a function is enabled using the methods of the present and the referenced disclosures, users can effectively access information contained in the document in an organized way, without the need to open the document and then spend time to locate such information.

Displaying Comments Related to a Topic in a Cloud Format

In addition to gathering the topic-comment data, and displaying in a tree or hierarchical format, in some embodiments, a topic can have multiple comments or terms that carry related information; and some of them can be repetitive. For example, given a topic term such as "Health Care", numerous comments or terms carrying information related to the topic can be identified in multiple document sources such as Web pages or social network comments or blogs. Some people may say that "the cost of health care is increasing too fast"; and other may say that "Health care is a complicated issue" or "the quality of health care does not match the cost", etc. Using the methods described above and in the referenced disclosures, comments such as "a complicated issue", "cost increasing too fast", or "quality does not match the cost", etc., can be identified and extracted and displayed under the topic of "Health Care".

In some cases, multiple persons may have expressed the same comment, or certain comments can have a different frequency of occurrence than others, or from sources that are considered more important or more trustworthy than others. In such cases, each comment can be assigned a weight reflecting its importance or prominence, which can be based on the frequency of occurrence, or types of sources, etc. And in addition to displaying such comments in a tree or hierarchical format as described above, these comments can be displayed in a word-cloud format, in which the size, position, orientation, or color, etc., can be different for different comment terms, based on their importance measure.

Conventional word-cloud display is usually based on term frequency only, and does not identify nor indicate which terms are comments related to a certain topic, based on various grammatical or semantic or contextual relationships between the topic term and the comment terms in the source text. In the present invention, such relationships are first identified, and terms are extracted and then grouped together under a relevant topic; and then, in addition to displaying such topic and comment terms in a tree or hierarchical format, the comments can be displayed in a word-cloud format, with an indication that these terms are comments related to a given topic. This type of display can provide more effective visual clues for information digestion in certain cases.

Furthermore, each comment term can be linked to the sources in the original text, and users can easily follow the link to get more detailed information related to such comments.

Figure 15:
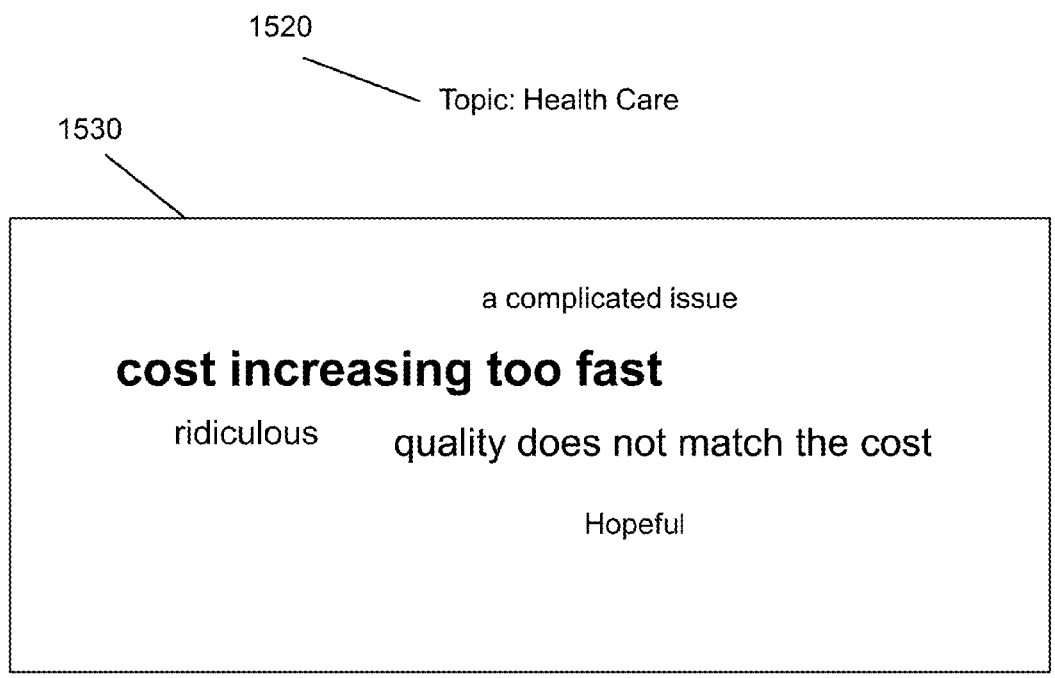
FIG. 15 is an example of displaying topic and comment terms in a word-cloud format.

FIG. 15 is an illustration of such a display format. In FIG. 15, a topic of "Health Care" (1520) is first determined, and then the comments are identified, and their weights are determined based on the factors described above, and the terms are extracted for display in such a format (1530).

User Interface Object for Expanding Display Area for a File (as a Terminal Node in the Folder Structure)

In addition to the above embodiments, the present invention provides more methods and user interface objects to make information in a document more accessible to users.

In conventional user interfaces of various file management tools, files are stored in folders or directories, and folders can have a hierarchical structure, with each folder or sub-folder being a node on a certain level of the structure. In such a structure, an individual file or document is treated as a leaf node, or a terminal node on a given level of the folder structure where the file is located, and such terminal node does not have any more branches underneath, which is intuitive and logical with conventional approaches, which do not further look into the contents of the file or document. However, in the present invention, a file or a document as a terminal node in the conventional approach can be further expanded to display important content extracted from the document.

In one embodiment of the present invention, a user interface object is provided and attached to the name or icon of the file or document in the file management tool's user interface, and when the user acts on such a user interface object, a display area can be made available for presenting information about the content of the document.

Figure 16A:
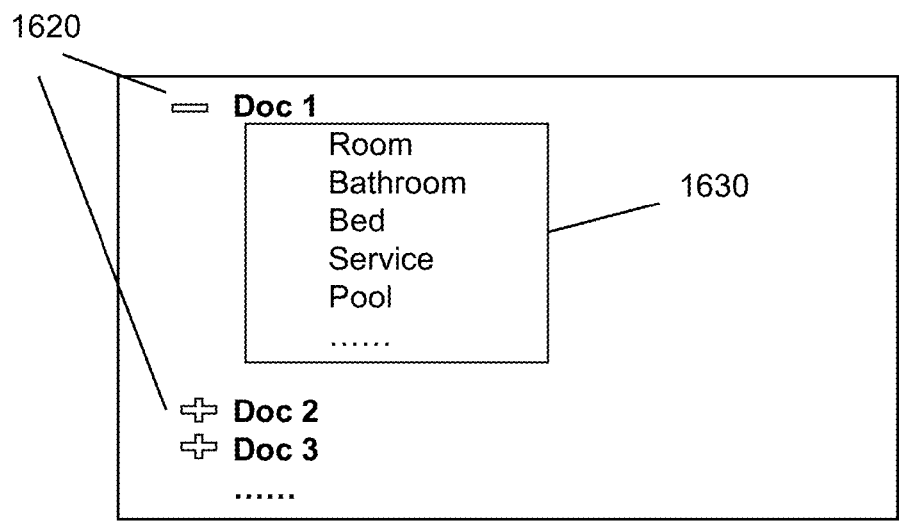
FIGS. 16A and 16B are exemplar cases in which a user interface object is attached to a file object for displaying the topic and comment terms, making the file object a non-terminal node in a tree structure.
Figure 16B:
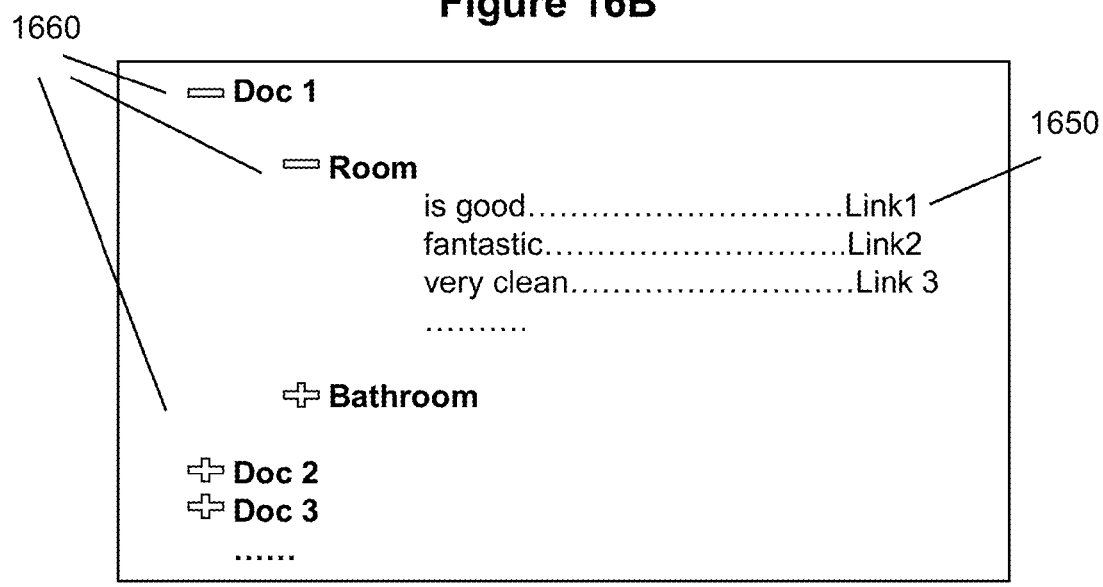

FIGS. 16A and 16B illustrate an exemplar case in which a user interface object 1620 is attached to the icon or name of a file in a folder. When a user acts on the object, a display area (1630) can be presented to the user, with information about the content of the document. And links can be provided such that when the user acts on a word or phrase (1650), the user can be taken to the specific part of the document related to the term.

FIG. 16B further illustrates that the user interface object (1660) can be applied to terms in deeper levels of the data structure being displayed.

In some embodiments, the content being displayed in such an area (1630) can be a summary of the document, or other information related to the document, and can be displayed in various formats, including the topic-comment or tree or hierarchical format, such as shown in FIG. 16B.

In some embodiments, the user interface object can be omitted, and the important information such as the topic/comment terms extracted from the document can be displayed to the user without the user acting on a user interface object, such as the one illustrated in FIGS. 14A and 14B.

In addition to displaying a list of terms, the display area connected to the icon or name of the document can be used to display a structured information unit such as the topic-comment hierarchical format as illustrated above with FIG. 14B, even when there is only one topic-comment pair in the tree structure. Furthermore, such a topic-comment pair can be manually created or edited in the display area for customized use.

Figure 17A:
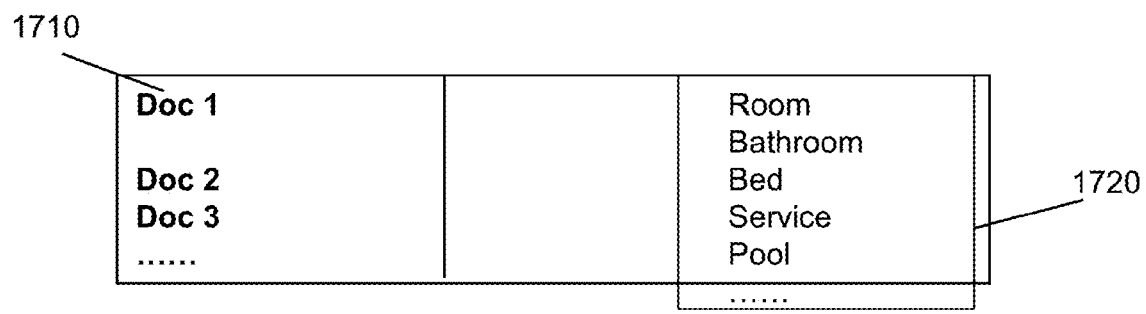
FIGS. 17A and 17B illustrate exemplar cases of displaying topic-comment pair in different display areas.
Figure 17B:
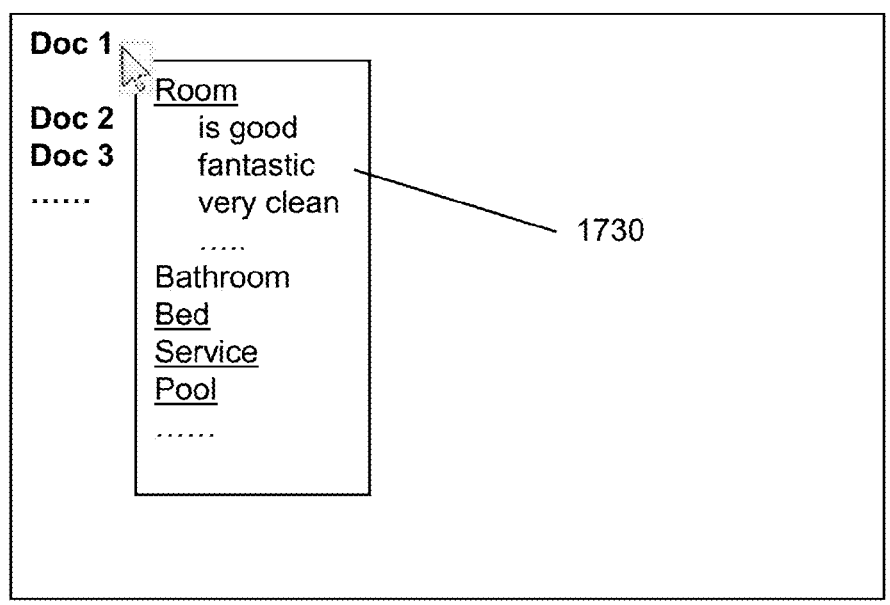

Furthermore, in addition to displaying such a topic-comment pair or a summary in the special display area that is directly connected to the icon or name of the document or the file object, the topic-comment pair can also be displayed in an area separated from the icon or name of the document, such as being displayed in a separate window for preview, or in a popup window when the user acts on the icon or name of the document. FIGS. 17A and 17B illustrate an exemplar case of displaying such topic-comment pair in different display areas. In FIG. 17A, a separate window 1720 is provided for such display when the user acts on the document object (1710). And in FIG. 17B, a popup window commonly known as an "infotip" window (1730) can be used for displaying the topic-comment pair or a topic list.

As illustrated above, in certain case, links can be provided to the location in the document content where the topic or comment terms are contained, such that the user can have quick access to the source without reading through the entire document or performing a search.

As described above, the relationships between the topic and comment terms can be identified using the methods disclosed in the referenced disclosures, such as based on the grammatical, semantic, contextual, positional, and frequency attributes associated with the terms, which are incorporated herein by reference.

The methods can also apply to other types of documents, such as emails and other text objects.

Displaying Information about Other Attributes Identified in the Files or Documents In addition to the topic terms displayed in a list format, and topic-comment pairs displayed in the tree or hierarchical format showing relationships between the topic and comments, and in a cloud format, the present invention provides more methods for displaying more relevant information about the content of a document for easy information access and utilization.

In some embodiments, the present invention identifies a predefined semantic attribute associated with one or more terms in the source text, and extracts terms that carry the semantic attribute, and displays such terms in connection with the name or description of the semantic attribute.

For example, a predefined semantic attribute can be "drug name", or "company name", or "phone number", or "person name", etc. Using a linguistic analysis method, including a dictionary lookup method, or a pattern analysis method, many terms carrying the predefined semantic attribute can be identified in the source text, and can be extracted and grouped under the name of the semantic attribute.

FIG. 18 illustrates an example of such information extraction and display. In FIG. 18, the name of the semantic attributes "drug name" (1810) is displayed, underneath the attribute name, terms that are drug names (1820) in the source text are automatically identified and extracted using the methods described in the present and referenced disclosures, and displayed in a list format in a display area underneath the file or document name or icon in a file management software tool's user interface. Another semantic attribute of "company name" (1830) is also displayed, and underneath the attribute name, terms that are company names (1840) in the source text are identified and extracted, and displayed in a list format in a display area.

This type of display can provide a convenient way for users to quickly know the key information contained in the document, and can help users quickly find the exact document that is needed among a long list of documents.

Such information can also be displayed in other display areas or in other display formats as described above.

The effect of the display methods provided in the present invention can be more apparent when there are a large number of files or documents or their names or icons concurrently displayed in a folder or a window or other single viewing area, in which case finding a particular document can be difficult, but with the methods of the present invention, the task of finding a particular document among many candidates in a long list can be much easier.

In some embodiments, the names of semantic attributes and location of documents that contain instances of terms of the corresponding semantic attributes can be integrated into a search index, such that, the search tool can enable features such as "search documents containing drug names", or "search documents containing phone numbers", or "search documents containing positive comments", etc. While conventional search interface is limited to allowing users to only enter a search query as keywords, with the present invention, options such as a dropdown list, or other forms, can be used to allow the user to preview what semantic attributes are available and searchable in the index, and to search with such parameters, in addition to conventional keyword-based search. Such features can also be integrated into the embodiments for displaying the topics of a document collection without requiring the user to enter any text in the query box, as described above.

Displaying the Category or Class Information for Files or Documents

In U.S. Pat. No. 8,370,129, entitled "System and Methods for Quantitative Assessment of Information in Natural Language Contents", and U.S. patent application Ser. No. 13/655,415 entitled "System and Methods for Determining Relevance between Text Contents", system and methods are disclosed for classifying documents using a conceptual association dataset. In U.S. patent application Ser. No. 13/732,374 entitled "System and Methods for Quantitative Assessment of Information in Natural Language Contents and for Determining Relevance Using Association Data", system and methods are disclosed for classifying documents using other methods in addition to the conceptual association dataset. The disclosures of which are herein incorporated by reference. When a document is identified as belonging to a predefined class or category, such information can also be displayed in a file management tool's user interface, or an email interface for easy access to the relevant document among a long list of other documents or emails, in a way similar to the tagging or summary function as described above.

In U.S. Pat. No. 8,407,217 entitled "Automated Topic Discovery in Documents", and U.S. patent application Ser. No. 13/707,940 entitled "Automated Topic Discovery in Documents and Content Categorization", system and methods are disclosed for displaying topic or summary information in a column format that is typically seen in a computer operating system's file management tool, such as Windows Explorer, etc., as well as in other formats such as word-cloud format, etc. In the referenced disclosures, what is displayed is usually terms extracted from the document contents, representing the important information contained in the documents. In the present invention, the terms that are not necessarily contained in the original document, but can represent the class or category of the document can also be displayed in connection to the document objects in the user interface for easy access to such information.

In some embodiments, a classifying process, or a classifier, is first used to determine the name of a class or category of which the document can be a member. The name of the class or category associated with the document object is then displayed in an area in the user interface connected to the document object, such as the name or an icon of the document. This type of display is especially effective in a multiple document list view format or group view format of a file management tool's user interface, or email interface.

FIG. 19A is an illustration of an exemplar case where such class or category information is automatically displayed for one or more documents in the file management tool's user interface. In FIG. 19A, a document (1920) is identified as belonging to a category named "marketing"; and another document (1950) is identified as belonging to a category named "finance"; and another document (1960) is identified as belonging to a category named "engineering".

A conventional system would require the user to manually enter such information into these fields. In the present invention, once the class membership information is obtained through an automatic classification process, either using a local processor, or a remote processor, the result can also be automatically displayed in various formats. FIGS. 19A and 19B show one example in a column format, while the same information can also be displayed in other formats as described above.

In some embodiments, especially when a document can be classified into two or more classes or categories, the system of the present invention can display the candidate class/categories names as suggestions and allow the user select one or more names for display. In some embodiments, the system can allow the user to edit the automatically generated class or category names, or edit the name of the document based on the class or category names.

With such class or category information, documents displayed in the exemplar file management tool's user interface can be sorted by class or category. In some other embodiments, documents can be first grouped by their class or category membership, and then displayed in groups. This way, users can easily find the documents by their class, rather than by searching through a long list one by one.

FIG. 19B shows an example of displaying the documents by sorting or grouping by classes or categories.

Displaying the Overall Sentiment Value for Files or Documents

In U.S. patent application Ser. No. 13/709,827 entitled "System, Methods and User Interface for Discovering and Presenting Information in Text Content", and U.S. patent application Ser. No. 13/794,800 entitled "System, Methods and User Interface for Identifying and Presenting Sentiment Information", system and methods are disclosed for identifying the sentiment type or value of sentences contained in the document, the disclosures of which are herein incorporated by reference. An overall sentiment value conveyed in the content of a document can also be obtained by summing up the sentiment measurements of each sentence in the document. In the present invention, the overall sentiment type or value associated with a document can also be displayed in a similar way as the class or category information is displayed as described above. For example, a document object that is displayed in a file management tool's user interface can be labeled as being positive, negative, or neutral, or in some another embodiments, can be labeled as "strong positive", "medium positive", "weak positive"; or "strong negative", "medium negative", "weak negative", etc., or in a numerical value format such as 5, 3, 1, or 0, or −1, −3, −5, etc., to indicate the degree of sentiment on either the positive or negative scale. In general, some label of the sentiment type of the document is provided.

FIG. 20A is an example of labeling the document in a file manager tool's user interface with sentiment type.

Similar to the case with class or category as described above, document objects such as names or icons in the user interface can be sorted or grouped by the value of the sentiment measures associated with each document. This way, users can easily find the documents by their sentiment type, rather than searching through a long list one by one.

FIG. 20B shows an example of displaying the documents by sorting or grouping based on sentiment types.

Applying Visual Effects to Indicate Different Attributes of Files or Documents

The various display methods of the present invention as described above distinguish themselves from conventional approaches in that they obtain useful information or attributes about the documents, based on either grammatical, or semantic, or contextual analysis of the document contents, and display such information in a way similar to other metadata are displayed, to further aid the users to quickly and easily find the document they are looking for, without having to go through a long list of candidates.

The above display formats can be further enhanced by applying different visual effects to the document object in a file management tool's user interface, such as the name or icons of the documents, or emails, based on the specific information or attributes obtained using the above methods.

For example, in the display area of the user interface, documents or emails of the same class can be highlighted with the same color, or be associated with an icon representing a specific class for easy recognition. This can have either the same effect, or a complementary effect of sorting or grouping by class or category.

The method of applying a special visual effect can also be used with the attribute of sentiment type or value associated with each document. For example, in a file management tool's user interface or an email interface, a document that is associated with an overall positive sentiment can be highlighted using a special color to distinguish documents that have an overall positive sentiment from documents that have an overall negative sentiment, or different colors can be used to highlight documents of different degrees of overall sentiment values such as "strong positive, "weak positive", etc., to further distinguish documents having similar attributes from other documents.

Furthermore, as described above, documents having certain semantic attributes, such as containing terms that are drug names, or company names, or phone numbers, product names, etc., can be highlighted in different colors or associated with different icons to make it easier for the user to quickly recognize and locate the needed document among a long list of candidates.

In U.S. patent application Ser. No. 13/844,143, entitled "Systems, Methods, and User Interface for Effectively Presenting Information", and U.S. Provisional Patent Application 61/754,652, entitled "System, Methods, and User Interface for Presenting Information Associated with an Object", file on Jan. 21, 2013, methods for highlighting documents using different visual effects based on attributes associated with the documents are disclosed. The disclosures of which are herein incorporated by reference. The present invention further extends application scope of such methods to the use cases as described above with various attributes obtained from the document contents as user-generated contents in contrast to system-generated metadata.

Contextually Determine Term Importance Score, and User Interface for Domain-Specific Search, Job Search and Resume Search In U.S. Provisional Patent Application 61/809,893, entitled "System, Methods, and User Interface for Automatically Presenting Information Based on Relevance", filed on Apr. 9, 2013, more methods are disclosed for determining the term importance values for certain specific domains such as the domain of job/resume search, and with methods for displaying terms and their relationships for easy information access. The disclosures in this application are herein incorporated by reference.

Specifying an Importance Value for a Search Parameter

In the case of an employer or recruiter looking for a suitable candidate to fill a job position, a common problem is that usually the employer or recruiter has to review a large number of resumes, and each may satisfy a specified skill requirement, but each may have a different degree of strength in the required skill, whereas the search system may produce a long list of results without effectively considering the degree of strength. For example, an employer may require a candidate to have a minimum of three years of experience in a specific skill or area. If in the resume database, a candidate's years of experience is specified by integer increments in years, then a candidate with two and half year's experience may be filtered out and will not be in the search results. However, it is possible that the candidate's strength in other areas may compensate for the half year's short of experience in that area. With conventional search approaches, such a candidate can be filtered out or missed. In the present invention, user interface objects are provided to let the employer or recruiter as the user of the search system specify how important this criterion is, for example, to specify a value on a 0 to 1 scale, and the system can adjust the search results accordingly. For example, if the user specifies a value of 0.7, then, a candidate with two and half year's experience in that area can still be considered as meeting the requirement, and can be presented in the search results.

In one embodiment for implementing this method of specifying an importance value, a user interface or a template can be provided. FIG. 21 is an illustration of an exemplar user interface of the present invention. In FIG. 21, a user interface is provided for the user to specify qualifications and additional requirements as search parameters. Users can specify a skill name (2110) such as "Skill A", an additional requirement associated with the skill (2120) such as "three years of experience", and an importance or relevance value (2130) such as 0.7 associated with the skill as well as its additional requirements. The system can check with the resume database, and calculate a relevance score for the parameter of "three years of experience", which can result in an effective value of "2.1 years", thus a candidate with 2.5 years of experience in that area can still be presented, based on the assumption that the employer is willing to consider such a candidate, but the result can be displayed in a different format to indicate the special case.

Furthermore, the user interface as described above can be used as a template for creating a job description, especially with the field of specifying the degree of importance or relevance of a particular requirement, as illustrated in FIG. 21. For example, if the employer requires a minimum three years in skill A, the employer can further specify that this requirement has an importance score of 0.8, etc.

Determining the Term Weight Values Based on Contextual Information

For resumes in document format as unstructured data, in contrast to the conventional approaches of indexing a collection of resumes based on keywords and frequencies, the content analysis methods in the referenced disclosures can be used to identify the most important information contained in each resume, and assign different weighting scores to different words or phrases in the text. For example, grammatical analysis can be performed to identify whether a word is a noun or a verb or an adjective, or in a grammatical role of a subject, or object, a modifier or a head of a phrase, etc., and such information can be used to assign different weight values to different terms, which can further be used as a measure of relevance to a search query, or to a job description as described above.

Furthermore, semantic analysis can be performed to identify whether a word or phrase is the name of a skill, a position, a role, etc., and different weight values can be assigned to different terms based on such semantic attributes. For example, for contents related to a particular skill, such as "Skill A", in one resume, the candidate may say "managed two projects", another candidate may say "involved in a project", another candidate may say "lead a team", etc. In the present invention, words or verbs like "managed", involved", "lead", etc., can be assigned different weight scores based on their semantic attributes in indicating different degrees of involvement and influence related to a previous job, and when a query including "Skill A" is issued to a search system, the system of the present invention can assign different relevance scores to the keyword of "Skill A" in different resumes based on whether the keyword "Skill A" is related to the verb of "managed", or "involved", or "lead", etc., and can rank the results accordingly.

In addition to the verbs that can be identified by the grammatical or semantic analysis, other terms such as the candidate's length of experience using a particular skill can also be identified using the grammatical and/or semantic analysis and calculation, either from resumes in the unstructured document format, or from structured database, and can then be used to assign different weight values to the related keyword, and rank the results accordingly. For example, in one resume, Skill A may be identified to be related to a length of experience of 3 years, and in another resume, Skill A may be identified to be related to a length of experience of 4 years. Such information can be used to assign a weight value to the keyword of "Skill A" in the corresponding resume to indicate the different strength of the skill, and further determine the relevance of the resume to the search.

For example, a recruiter with a job description that requires four years of C programming experience may enter keywords such as "four years", "C programming", etc., in his or her search query. If a resume containing information such as "having basic knowledge in C programming", and "tested software products for four years" exists in the recruiter's database, a conventional search engine can return the resume as highly relevant due to the presence of the keywords of "four years" and "C programming", which likely does not meeting the required qualification. However, using the methods of the present invention and in the referenced disclosures that identify the grammatical and semantic attributes of the terms and their relationships, the term of "four years" is not identified as an attribute of the skill name of "C programming", thus the relevance score for the skill name of "C programming" will not be high for this resume. On the other hand, if another resume has such contents as "worked five years in C programming", the present invention can identify the term "five years" as an attribute associated with the term "C programming", and assign a high weight value to the term of "C programming". Thus, in response to the query containing "C programming" and "four years", even though the keyword "four years" does not match the actual word of "five years", the present invention can assign a high weight value to the keyword "C programming", thus giving the resume a high relevance score, with which it will likely be retrieved as a high-relevance search result.

In this embodiment of resume search, the above examples illustrate a type of importance score or relevance score of a term that is further based on the grammatical and semantic context, in addition to the grammatical and semantic attributes associated with the term itself. Similar to the methods in the referenced disclosures, where weighting co-efficients can be assigned to the terms based on the grammatical or semantic attributes associated with the terms for calculating the term importance score, in the present invention, weighting co-efficients can also be assigned to the terms based on the grammatical or semantic attributes associated with terms in the context, and their relationships with the target terms.

For example, in the phrase "five years in C programming", the noun phrase of "five years" is being modified by a prepositional phrase of "in C programming", the semantic attribute of "five years" as a time duration expression can be assigned an exemplar base weight of 2 for semantically expressing a time duration and grammatically being a noun phrase, and an additional weight of 5 to indicate the number of years as the value of the semantic attribute. Then, the total weight of 7 can be used as a weighting co-efficient and applied to the term "C programming", which can have its own non-contextual weight based on its grammatical role of a noun phrase in a prepositional phrase, and its semantic attribute of being a skill name, as well as based on its frequency of occurrence in the text. The importance score or relevance score of the term "C programming" can then be determined based on all these factors, such as by addition or multiplication or a combination thereof, and the score can be stored with the resume associated with a search index. When a user searches with "C programming" in the query, the score in the index can be used to represent the importance or relevance of this particular resume to the query, and can be compared with scores of the same phrase in other resumes, and the resumes containing this phrase can be ranked by their respective scores, and be presented to the user as a search result.

In the particular case of job or resume search, this type of term importance score can represent a measurement of the strength of an aspect of a candidate, such as the candidate's skills, or other abilities.

Usually, employers look for strong candidates to fill their positions. In the present invention, the strength can be determined based on estimates of the candidate's breadth and depth in certain areas including skills, involvement, roles, accomplishments, as well as length of time or experiences, etc. In addition to the skill names as illustrated above, the strength-based term importance or relevance score calculation method can also be used for other qualifications or requirements. For example, for a given job title, such as "project lead", if the resume provides information about a wide range of skills or accomplished projects related to the job, the term importance score of the noun phrase "project lead" can be assigned a high value using the methods illustrated above. And even though such specific information about the breadth or depth of the experience is not included in the search query or job description, the resume that contains such information can be ranked much higher in the search results than others that may only contain the keywords that match the search query or job description.

While the results can be ranked by strength, the results can also be displayed in sections defined by strength measures or importance scores of the search terms. For example, one section can display the resumes of the strongest candidates, and one section can display the resumes for the medium strength candidates, and another second can display the resumes for the more junior candidates, and the employer can select the desired sections to view the results that match the specific job requirements, whether it is for a senior or junior position. Furthermore, different sections being displayed can be marked for their strength range, such as "senior candidate" or "junior candidates", etc. Also, different visual effects can be applied to the results in different strength score ranges, such as highlighted in different colors or displayed in different font style or size, etc, to facilitate the selection and review process.

In addition to skill names and job titles, other attributes can also be identified and used to determine term importance score, or the relevance or strength of the topics, qualifications, or requirements, and search results. Such attributes can include the person's level of education, previous job position, role, project type, achievements, location, industry category, type or size of company, number of companies worked, years or months of experience, maximum or minimum length of time stayed with a company, type of employment such as whether worked as a consultant, part-time or full-time employee, etc. Different weight values can be assigned to keywords that represent such topics, qualifications, or requirements based on their associated attributes.

As described above, the semantic attributes can be the identifiable meanings associated with the terms in the resume document, and can be obtained by using a dictionary containing the semantic information about the terms. Such a dictionary can be compiled either manually, or automatically or semi-automatically using a machine-learning method. Meanings can also be contextually determined by various rules for contextual analysis, and such rules can also be compiled either manually, or automatically or semi-automatically using a machine-learning method.

Automated Process for Matching a Job Description with a Resume and Vice Versa

As described above, using the content analysis methods as described above and in the referenced disclosures, both a job description and a resume as an unstructured data type can be transformed into a structured or semi-structured format. For example, terms representing qualifications or requirements, as well as terms representing positions, skills, educations levels, activities, accomplishments, roles, etc., can be identified and extracted. Attributes associated with such terms can also be identified, such as years of experience, related skills, etc. In some embodiments, the contents of a job description or a resume can be transformed into a format similar to the user interface and the template format exemplified in FIG. 21.

Term importance scores or relevance scores can be calculated using the contextual and strength-based scoring methods described above.

Once transformed, a transformed job description can be used as a query, and a search can be automatically conducted against a resume index, or resume database. In the reverse direction, a transformed resume can be used as a query, and a search can be automatically conducted against a job description index. This way, the entire process can be automated. The search system can use the strength-based relevance calculation methods described above to determine the relevance of the matched resume or job description.

Furthermore, once transformed, a document comparison method can also be used for determining the matching of the requirements in a job description and the qualifications in a resume, and vice versa. The terms and term scores can be extracted from the resume or the job description, and can be represented as term vectors, together with the corresponding term scores. The comparison methods can include document vector operations such as dot product, or cosine, or distance between two vectors, etc., based on the scores associated with the matched terms.

In some embodiments, the scores associated with the terms can be normalized, or adjusted in certain ways to facilitate the calculation. In one embodiment, a maximum score value is predefined, and if a score is above the maximum value, it is adjusted to be equal to the maximum value.

Combining Searching with Browsing Using Terms Extracted from the Contents

In addition to enabling the relevance measure of certain particular keywords or terms using the above methods, the present invention further provides methods for facilitating the search process by making a search index or interface browsable with relevant information, based on methods disclosed in U.S. patent application Ser. No. 12/782,545 as described above. For example, instead of waiting for the user to enter a keyword to search as with conventional search methods, in the present invention, words or phrases representing domain-specific topics of importance can first be identified, and can be extracted from a search index, or directly from documents in a collection, and displayed in a user interface. For example, in the case of resume search, names of skills or functions for a certain domain, such as the domain of software engineering, or bioengineering, etc., can be identified using grammatical or semantic analysis as disclosed in the various referenced disclosures, and can be displayed in a user interface, and with links to the specific resumes that contain such skill or function names. When the user acts on the skill or function name in the user interface, those resumes can be displayed as a search result, without requiring the user to construct a query and perform a search.

Furthermore, as described above, additional information about such skill or function names can be obtained, and can be displayed in association with the skill or function names in the user interface.

Figure 22:
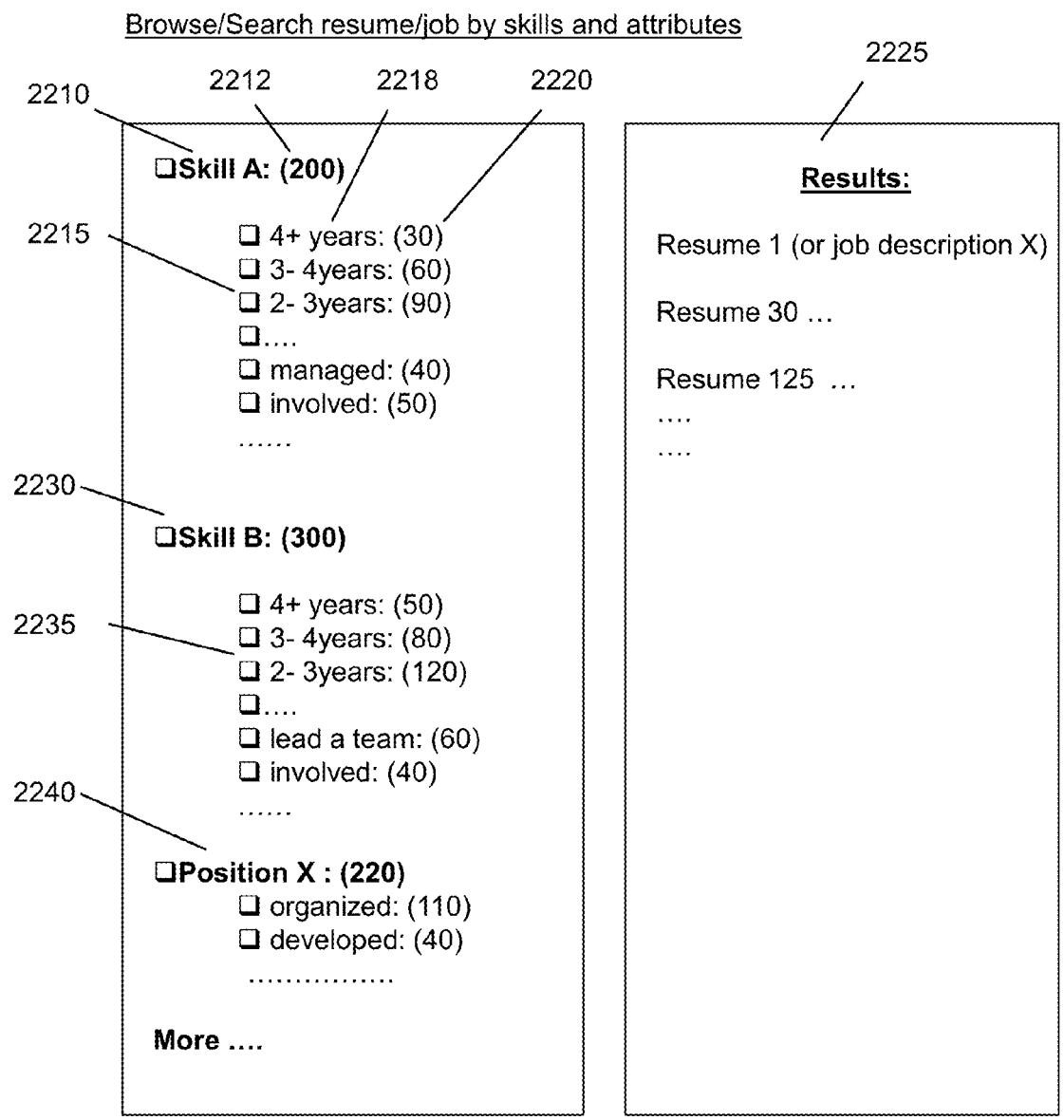
FIG. 22 is an exemplar user interface displaying a browsable search system with important topics displayed together with associated information in a format of a hierarchical structure.

FIG. 22 is an exemplar user interface displaying a browsable search system with important topics displayed together with associated information in a format of a hierarchical structure. In FIG. 22, domain-specific topics of importance, such as names of skills (2210, 2230, and 2240) in a particular domain, are first identified and displayed in the user interface. The number of resumes or document instances or job descriptions containing such skill names are also displayed (2212). When the user acts on a skill name, such as clicking or touching on a touch screen, initial results are displayed (2225), without requiring the user to write a query to initiate a search. Furthermore, additional information or attributes (2218) associated with the selected skill name are also displayed, in a format that is like a tree or hierarchical structure; and the number of resumes or document instances or job descriptions associated with the corresponding attributes are also displayed (2220). Furthermore, selectable objects, such as check boxes or radio buttons (2215, 2235) are provided, in association with the additional information or attributes as shown in 2218. When the user further acts on the selectable objects (2225, or 2235), search results (2225) can be dynamically updated to display only the resumes or document instances or job descriptions that are associated with the selected attributes. As is described above, the additional information or attributes (2218) can be obtained using grammatical or semantic analysis methods described above and disclosed in the referenced disclosures.

Figure 23:
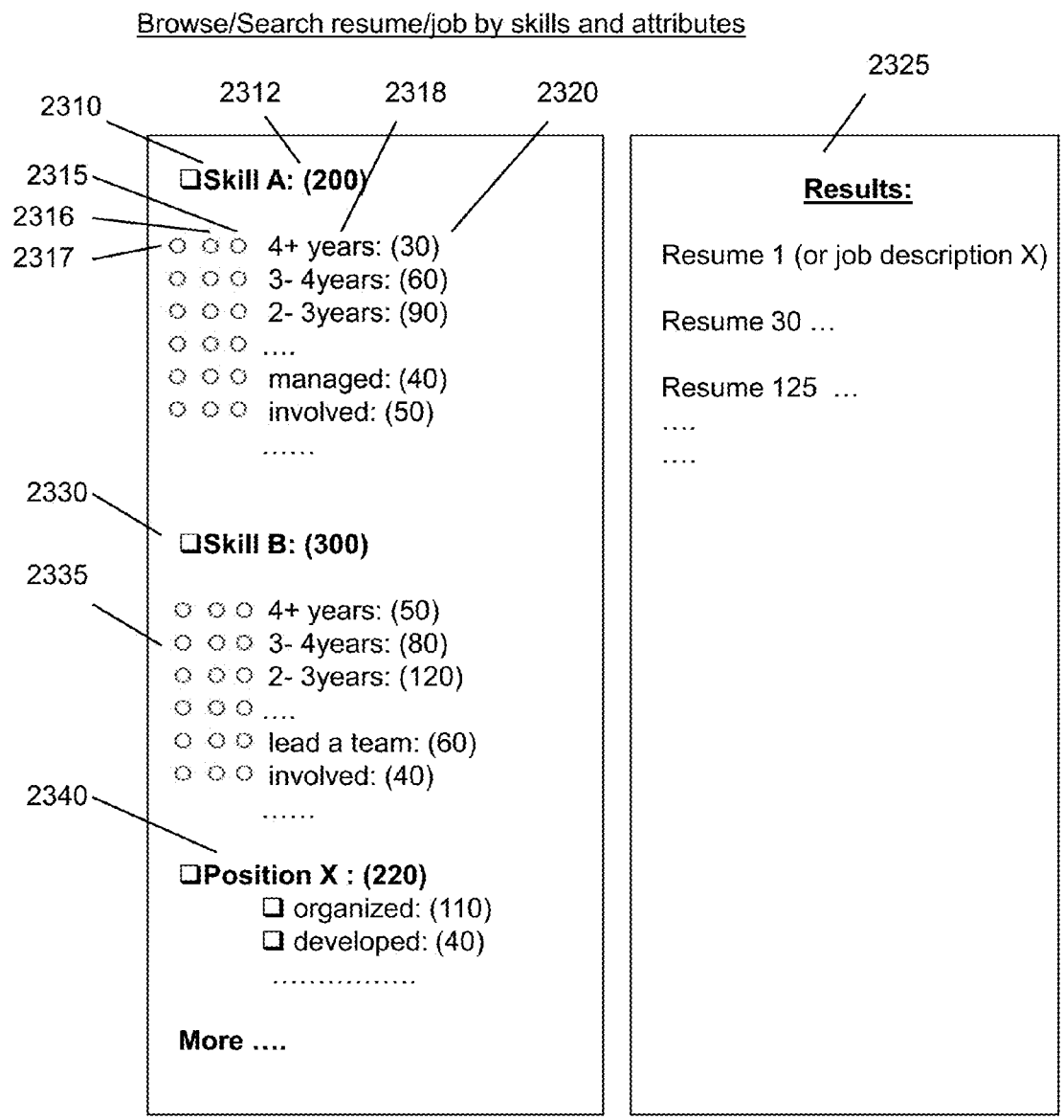
FIG. 23 is an expanded version of the system illustrated in FIG. 22.

FIG. 23 is an expanded version of the system illustrated in FIG. 22. In FIG. 23, additional user interface objects, such as button or check boxes depicted by 2315, 2316, and 2317 are provided to allow the user to further specify the degree of importance or relevance of a particular attribute. For example, button 2315 can be used to specify a high degree of importance, button 2316 can be used to specify a medium degree of importance, and button 2317 can be used to specify a low degree of importance, for a specific attribute. In the same way as is described above, the search engine can re-rank the results based on the degree of importance as specified by the user.

In some embodiments, the topics of importance, such as names of skills illustrated by 2210, 2230, and 2240, and their associated attributes, such as illustrated by 2218, can be items in a dropdown box in a user interface. When the user selects an item from the dropdown box, the search results in 2225 can be automatically or dynamically updated based on the user selection, without requiring the user to specifically perform an additional action of search. This way, the user can immediately know what or how many results there may be when a given criterion is being entered.

A search system as illustrated above with FIG. 22 and FIG. 23 with the exemplar use case of resume search can significantly facilitate the search process. Users can find the needed information in a way that can be much faster and more efficient than the conventional search methods.

The above examples are based on resume or candidate search, usually conducted by employers or recruiters. The same methods described above can also be used for job search by job seekers, in the reverse direction of the resume search illustrated above. For a job search, a service provider can collect or aggregate job descriptions from various employers, and process the collection of the job descriptions in the same way as processing the resumes, and make a browsable index and user interface such as the one illustrated in FIG. 22 for job seekers to easily find positions that meet his or her expectation. Furthermore, in both cases, the additional feature of the present invention for specifying a degree of relevance or importance in the user interface can also be applied to both the job search and candidate or resume search embodiments.

The methods of the present invention can be applied to search systems other than the job or resume search systems as exemplified above. The methods of the present invention include applying content analysis including grammatical or semantic analysis to unstructured text data to identify important topics, and display such terms in a user interface, and with links to the original documents before the user even starts to search; and to further identify additional information or attributes associated with the topics, with such additional information or attributes represented by other terms in the document, to determine a relevance or importance of a keyword that represents a topic based on such information or attributes, and to display the search results based on such relevance.

In addition to displaying such topics or keywords or terms as well as their associated attributes in a user interface and making the search index browsable, and allowing users to specify a degree of relevance or importance with a specific topic or attribute, the methods also include displaying the results in different areas or with different visual effects based on the degree of relevance, as described in more detail in the reference disclosures, and incorporated herein by reference. The methods of the present invention can significantly facilitate the search process. Users can find the needed information in a way that can be much faster and more efficient than the conventional search methods.

It should be noted that the above examples are related to job descriptions or resumes for illustrative purposes. The system, methods, and user interface illustrated with the specific examples are equally applicable to other types of documents or text object, such as proposals, reports, articles, etc., and can be applied to other areas or domains without deviating from the principle spirit of the present invention.

For ease of reference, the following are recitations of contents from U.S. Provisional Patent Application 61/682, 205 (for term weight and relevance methods), with references to the recited drawings re-numbered to follow the sequence of the present disclosure. While not all contents are copied over, no new matter is added.

In US patent application 201001742826 titled "SYSTEM AND METHODS FOR QUANTITATIVE ASSESSMENT OF INFORMATION IN NATURAL LANGUAGE CONTENTS" filed on Oct. 4, 2009, by the present inventor, system and methods were disclosed for determining the relevance of a document in relation to a query. In the referenced disclosure, a term in a query is treated as an object name, and an object-specific dataset containing a plurality of terms each functioning as a property name of the object is used for the calculation of a quantitative measure of information contained in the document about the object. This quantitative measure of the information about the object name is then used as the measure of relevance between the document and the query. An important aspect of the above referenced disclosure is that even if a document does not contain the keyword in the query, the document can still be returned to the user as long as the document content is conceptually relevant to the query.

In the above referenced disclosure, the focus was on determining the relevance between a query and a document, or between a document class and a document instance. In the present invention, the focus is on determining the relevance between two or more documents, or between two or more text contents in any other format, such as emails, descriptions, news, user comments or opinions, blogs/forum, SMS, IM, advertisements, job descriptions, resumes, etc.

In the present invention, the object-specific dataset in the above referenced disclosure is interchangeably referred to as a conceptual association dataset for ease of description of the new applications of the methods that will be described below.

FIG. 24 is an illustration of a conceptual association dataset for the concept of "Computer" as is disclosed in the above referenced disclosure. In the present invention, the column containing the numeric values that represent association strength between the property terms and the concept can be optional, such that, when the numeric values are not available, the dataset can still be used to determine the relevance between two or more documents.

FIG. 25 is a system diagram illustrating the components of the system that can be used to determine the relevance between two or more documents in accordance with the present invention.

In FIG. 25, a first text content 2501 and a second text content 2502 is stored in storage device 2500, and are input into processor 2540 respectively. The processor includes algorithmic modules 2510 that analyze the content of the two text contents respectively. The processor further retrieves a conceptual association dataset (2520) from a plurality of datasets from a storage device (2530), each of such datasets being associated with a different concept, and calculates a first relevance score R1 between the first text content and the conceptual association dataset, and a second relevance score R2 between the second text content and the conceptual association dataset. If the relevance scores R1 and R2 are above a pre-defined threshold, it then calculates a relevance score R12 as the numeric measure of the relevance between the first text content and the second text content. It R12 is above another pre-defined threshold, the processor outputs a signal indicating that the two text contents are relevant, otherwise, the processor outputs a signal indicating that the two text contents are not relevant. The system can take further actions with the relevance signal, such as to display a relevant document or email, etc., to the user, or display a relevant advertisement somewhere in the user interface.

In some embodiments, the system may check the relevance not by retrieving a single dataset at a time, but retrieving multiple datasets in a certain way or in a combined format, and concurrently checking multiple datasets to find the most relevant dataset and relevance.

The system first analyzes the text contents as they are input. FIG. 26 is a flow diagram illustrating the steps of analyzing the text content. In FIG. 26, a text content is first tokenized into words, phrases, sentences, and paragraphs, whenever applicable (2610). Then, optionally, linguistic analysis is applied to identify the parts of speech of each word or phrase, such as a noun or a noun phrase, a verb or a verb phrase, or a preposition or a preposition phrase, a pronoun, etc. (2620). Then, optionally, grammatical roles are identified for such nouns or verbs and their phrases such as whether a noun is a subject of s sentence, or a direct or indirect object of a verb, or a head or a modifier of a phrase, etc. A sentence can also be identified as an independent clause, or a dependent clause of various types such as a relative clause or an adverbial clause, etc. (2630). Optionally, semantic analysis can also be performed to identify the semantic roles of these words or phrases such as whether a noun is referring to an actor or agent of an action, or a recipient of an action, or an instrument, or whether an adjective is referring to a state, or an attribute of something (2640). Furthermore, the frequency of each term occurring in the text content is also counted as an importance factor (2650).

Then, in step 2660, an importance score of a term is calculated based on one or more of the factors in 2620, 2630, 2640, and 2650.

In one embodiment, the method for the calculation of the importance score is to simply count the frequency of each term occurring in the text content. This method is simple, but not always reliably accurate by itself alone.

In another embodiment, the method is to first assign different weighting co-efficient values to the terms according to their parts of speech. For example, a noun or noun phrase may be assigned a weighting co-efficient of 0.9, while a verb or verb phrase can be assigned a weighting co-efficient of 0.7, or a preposition can be assigned a weighting co-efficient of 0.2, or a pronoun or an article can be assigned a weighting co-efficient of 0.1 (to indicate their relative lower importance), and such values can be used as the importance score of the term.

In yet another embodiment, the method is to first assign different weighting co-efficient values to the terms according to their grammatical roles. For example, a term that is the subject of a sentence may be assigned a weighting co-efficient of 0.9, while a term that is the predicate of the sentence can be assigned a weighting co-efficient of 0.8; a term that is the head of a subject phrase can be assigned a weighting co-efficient of 0.6; a term that is a modifier of a subject phrase can be assigned a weighting co-efficient of 0.5; a term that is a head of a predicate phrase can be assigned a weighting co-efficient of 0.4; and a term that is a modifier of a predicate phrase can be assigned a weighting co-efficient of 0.3, etc., as its importance score.

In yet another embodiment, the method is to first assign different weighting co-efficient values to the terms according to their semantic roles. For example, a term that is the "actor" of an action may be assigned a weighting co-efficient of 0.9, while a term that is the 'recipient" of an action can be assigned a weighting co-efficient of 0.8; a term that is an "instrument" can be assigned a weighting co-efficient of 0.6; and a term that indicates a state or an attribute can be assigned a weighting co-efficient of 0.4, etc., as its importance score.

In yet another embodiment, the method is to combine two or more of the above weighting co-efficient values to produce the importance score of the term.

In yet another embodiment, the method is to use one or combine two or more of the above weighting co-efficient, and then to multiply the frequency of the term by the weighting co-efficient value to produce the importance score of the term.

Once the importance score is determined, a threshold can be defined such that only those terms the importance scores of which are above the threshold can be selected and output to the next step (2670). Optionally, the corresponding importance scores can also be output (2680).

In some embodiments, the terms selected and output from the text content using the above described methods can be used as topic terms of the text content, or as a representation of the text content (2670). Optionally, the corresponding importance scores can also be output as part of the representation of the text content (2680).

Figure 30:
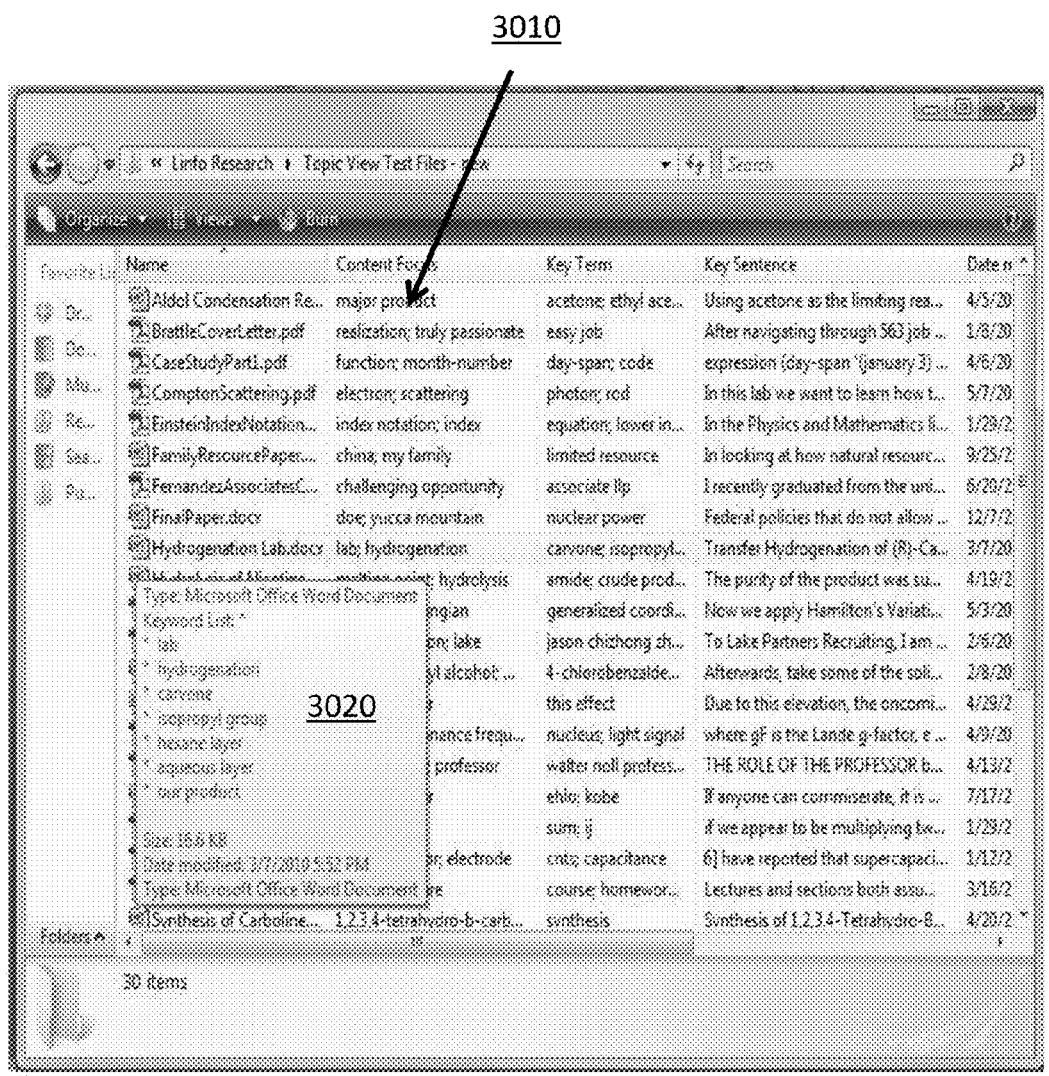

Such topic terms can be used for various purposes. For example, in a different embodiment, one or more of the topic terms can be displayed in a user interface alongside the text content as a summary of the content. This is especially useful when the text content is long, or when there are multiple text contents displayed in a list or group format. FIG. 30 is an example of topic terms used as summary information for a list of files. While one or more topic terms are displayed alongside each file (3010), an infotip window can also be used to show a list of such topic terms as a summary (3020).

In some other embodiments, topic terms obtained by using the methods in the present invention as described above can also be used for categorizing the contents by grouping various parts of the contents that share certain topic terms as categories, and can be recursively applied to create sub-categories of the contents in the same way, and displayed to the users.

Furthermore, in some embodiments of using the topic terms for content categorization and sub-categorization in the form of multi-level category tree, the values of the weighting co-efficient for different parts of speech, grammatical roles, and semantic roles can be different for different levels in the category tree to achieve some special effects of information presentation. For example, terms that are intended for the first level of category nodes can have a relatively larger value for the parts of speech of nouns or noun phrases, or for the grammatical role of subject, or for the semantic role of actor, etc.; and the terms intended to be the second-level node under the corresponding first level node can have a relatively larger value for the parts of speech of adjective or verb, or for the grammatical role of predicate, or for the semantic role of action, etc., such that, a special category tree can be created using this method as an effective information presentation tool, in which the first level of nodes are names of subjects or actors, while the corresponding second-level nodes are terms representing what and how a subject is and does.

Figure 31:
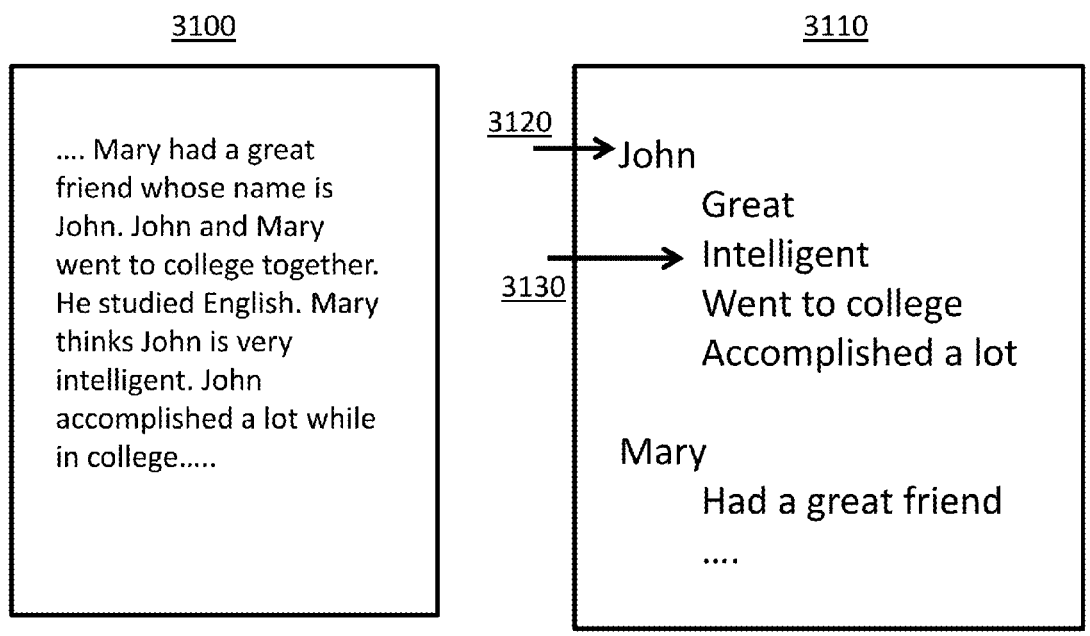

FIG. 31 illustrates an example of categorizing document contents using terms with different values on different levels of the node tree. Document 3100 contains text content. When larger weight is placed on grammatical role of subject when determining the first level node in the node tree 3110, subject nouns such as "John" will be selected for the first level node since the word "John" has a number of occurrences in the document as the subject of sentences (3120). Now, when determining the node names for the second level nodes underneath this node, if larger weights are placed on grammatical roles such as predicate, or parts of speech of adjective or verb, then the second level nodes can include such terms as "intelligent", "went to college", "accomplished a lot", etc., (3130) and a special effect can be achieved in presenting the important information about "John" in a much easier manner than reading the entire text content for information about John.

In some other embodiments, the importance score of a term can be further determined in combination with a corresponding score of the same term from one or more other text contents herein referred to as "external contents", and the corresponding score of the same term is herein referred to as "External Term Prominence" score, or ETP, in short. In some embodiments, the external contents used for obtaining ETP score can be a collection of random text contents.

Figure 26B:
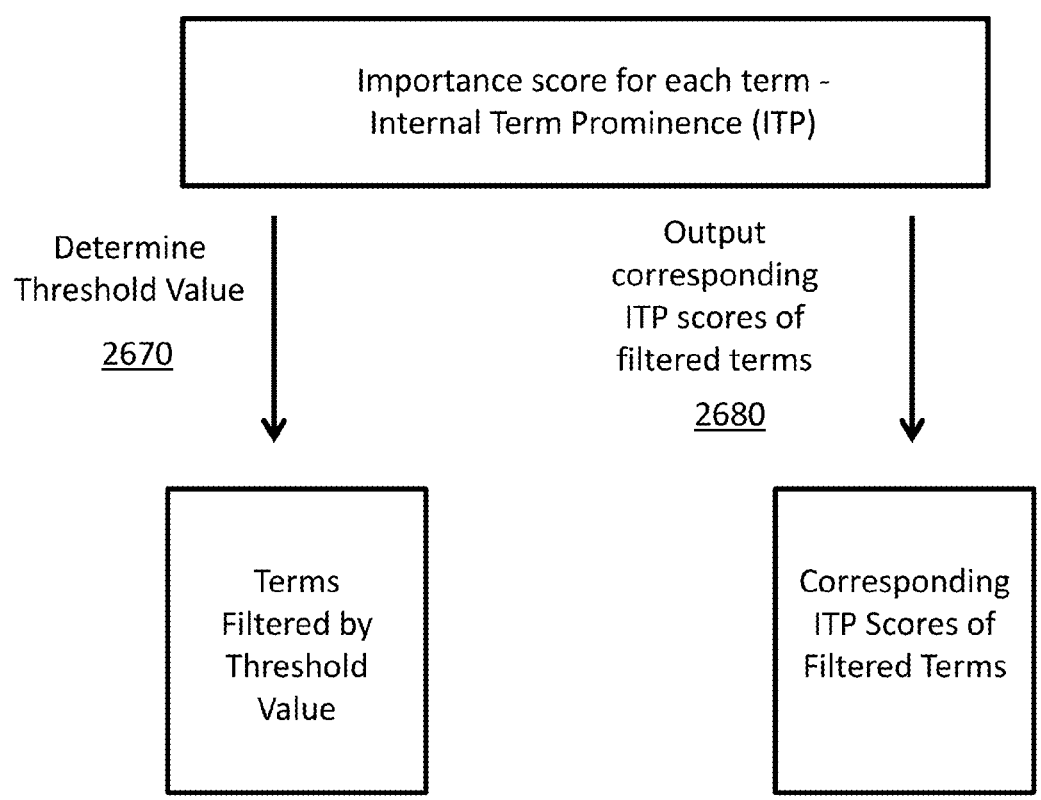
Figure 27:
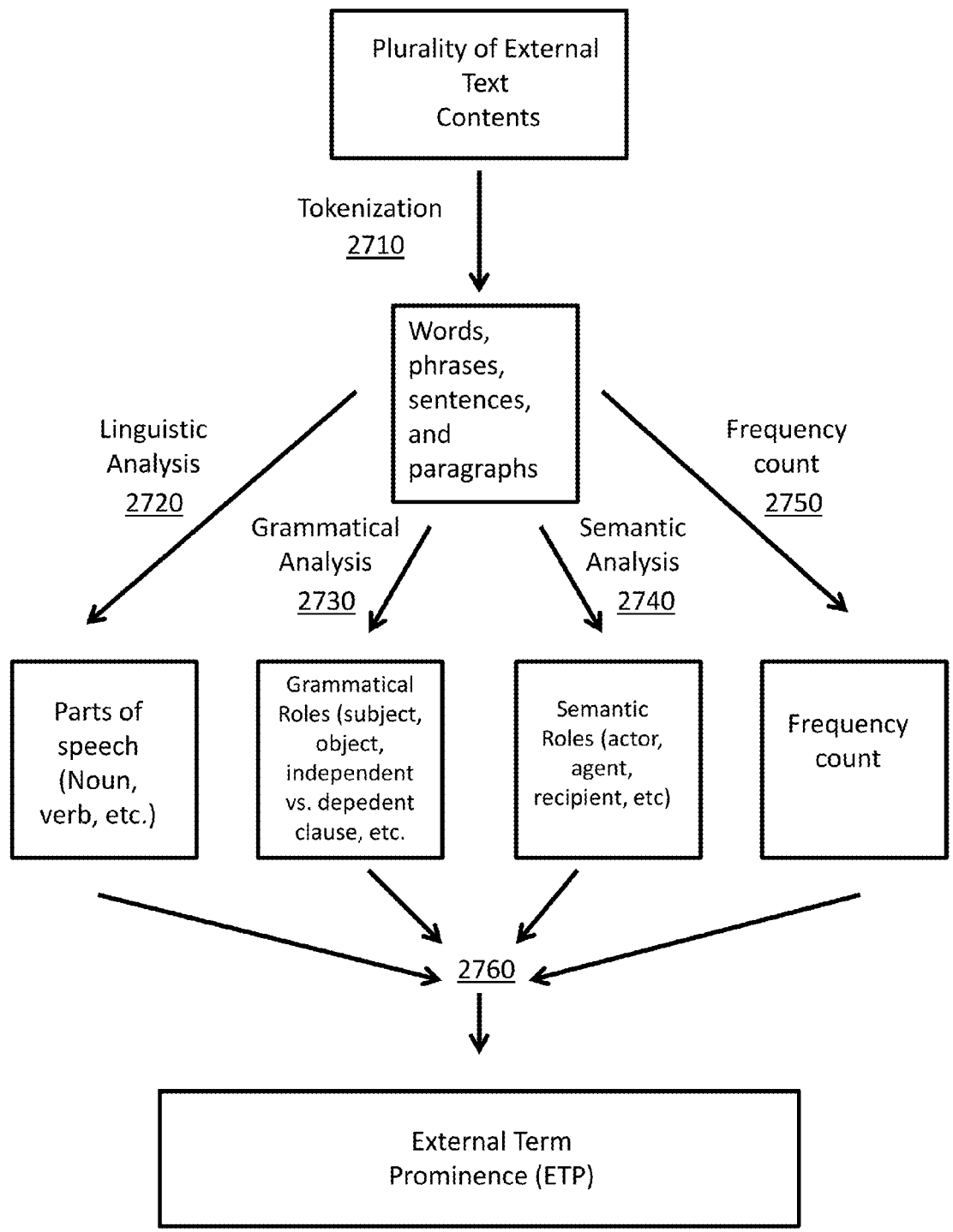

FIG. 27 is a flow diagram illustrating the process of obtaining ETP values for terms from a plurality of external contents using the same steps as described in conjunction with FIG. 26*a* for each such external content, and then averaged by the total number of external contents used. FIG. 28 is an example ETP dataset with hypothetical terms and their corresponding ETP score values.

To distinguish from the external score, the original term importance score obtained from the first text content using the steps as described in FIG. 26*a* and FIG. 26*b* is herein and hereafter named "Internal Term Prominence" score or ITP in short.

When EPT score is used for determining the term importance score in a text content, in some embodiments, the final score is determined by the following formula, wherein S_j denotes the final term score of the j-th term in a plurality of terms in the first text content.

$$S\_j = ITP - EPT \qquad \text{Eqtn(1)}$$

In some other embodiments, the final score of S_j for the j-th term in the first text content is determined by the following formula.

$$S\_j = ITP*((ITP-ETP)/(ITP+ETP)) \qquad \text{Eqtn (2)}$$

Once the importance score is determined in combination of ETP by using equation 1 or equation 2, a threshold can be defined such that only those terms the importance scores of which are above the threshold can be selected and output to the next step like in 2670. And optionally, the corresponding importance scores can also be output like in 2680.

Same as with ITP as described above, in some embodiments, the terms selected and output from the text content using the above described methods can be used as topic terms of the text content for various purposes, or as a representation of the text content like in 2670. Optionally, the corresponding importance scores can also be output as part of the representation of the text content like in 2680.

The above steps are repeated for the second text content, and a list of terms with their importance scores can be output to the next step for relevance calculation.

After the importance scores are calculated and representative or topic terms are selected from both the first and second text contents, the next step is to calculate the relevance scores.

In contrast to the conventional methods, in which the terms from first text content are matched with the terms from the second text content, and the relevance score for the two text contents is based on the number of terms that occur in both the first and second text content, the present invention in general does not directly match the terms from the first text content with the terms from the second text content. In the present invention, the terms from the first and second text contents are respectively matched against one or more conceptual association datasets retrieved from the dataset storage (2530).

Figure 29:
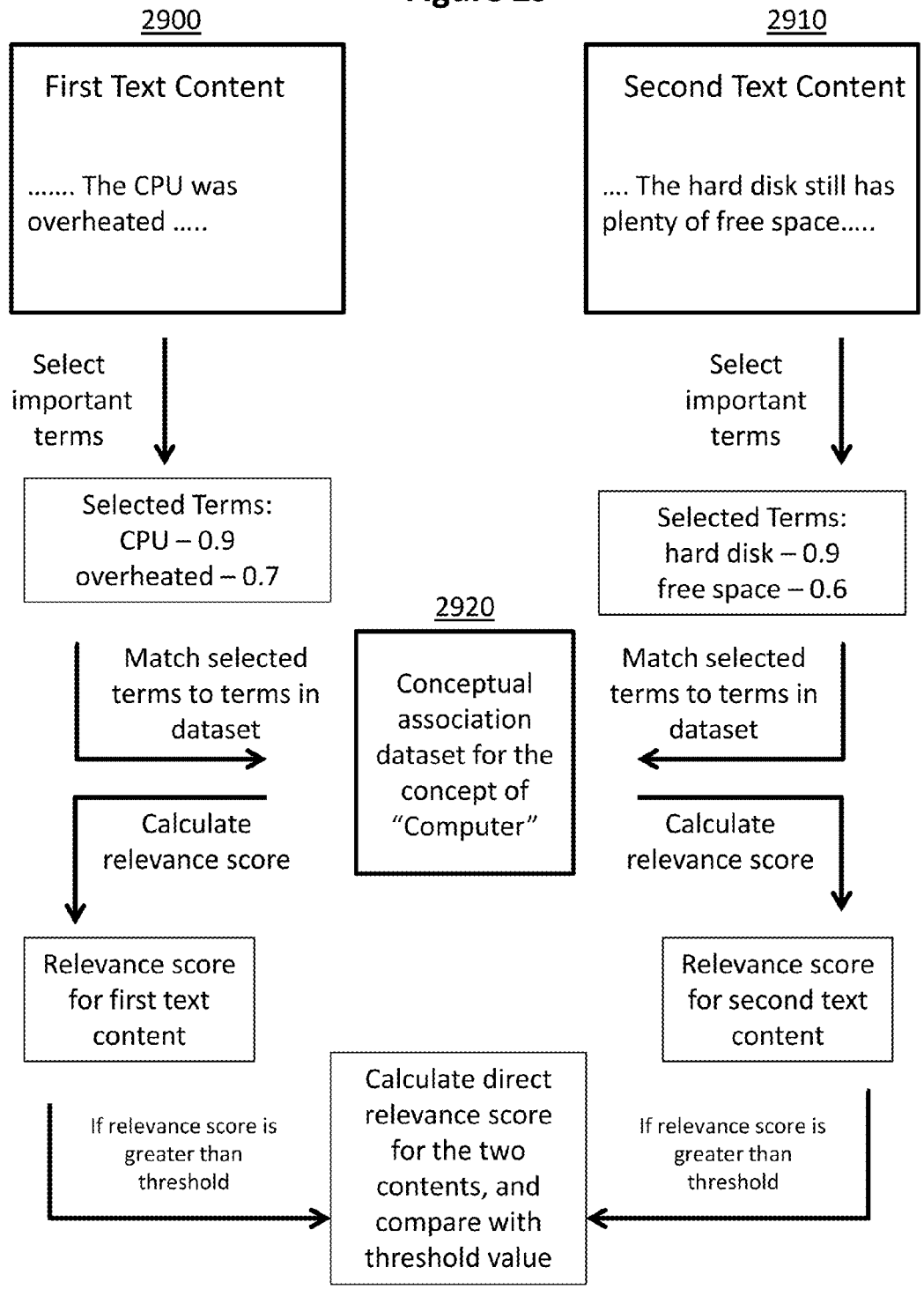

As described above, the conceptual association datasets are concept specific. Each different concept has its own association dataset. FIG. 29 is an exemplar illustration of the steps for determining the relevance between the first and second text content when only one concept is being matched with its corresponding conceptual association dataset. Suppose the concept is "Computer", and its association dataset is as shown in FIG. 24 with hypothetical terms and their values. As described earlier, the values corresponding to each term are optional, but can enhance the accuracy. Also suppose that the first text content contains text such as (1) "The CPU was overheated."

And the second text content contains text such as (2) "The hard disk still has plenty of free space."

And suppose that the important terms selected from the first text is "CPU" (with an importance score of 0.9), and "overheated" (with an importance score of 0.7); and the important terms selected from the second text is "hard disk" (with an importance score of 0.9), and "free space" (with an importance score of 0.6).

Conventional methods of keyword matching apparently will not consider that the two pieces of text are relevant since there are no matching keywords between sentences (1) and (2).

In the present invention, the terms from the first text content is matched with the dataset in FIG. 24. In this example, there is a match for the word "CPU", but no match for the word "overheated". The relevance score between the first text content and the conceptual association dataset can exemplarily either be 1 for one match only, (or 2 if the word "overheated" also had a match), or be 0.9 based on the term's importance score in the first text content, or be 0.9*0.99=0.891 if the term importance score is multiplied by the association strength of the term "CPU" in the dataset. If there were 2 or more matched terms, the above individual scores can be calculated and summed for each term. Users have the option to use one or more of these scores as a measure of relevance. Suppose a hypothetical threshold value is 0.2, then the first text content is considered to be relevant to the concept of "Computer" (620) since all its scores are above this threshold.

Then, the terms from the second text content is also matched with the dataset in FIG. 24. In this example there is a match for the word "hard disk", and no match for the word of "free space". The relevance score between the second text content and the conceptual association dataset can also exemplarily be 1 for one match only, (or 2 if the word "free space" also had a match), or be 0.9 based on the term's importance score in the second text content, or 0.9*0.8=0.72 if the term importance score is multiplied by the association strength of the term "hard disk" in the dataset. With a hypothetical threshold also being 0.2, then the second text content is also considered to be relevant to the concept of "Computer"

Then, the relevance score between the first and the second text content is calculated using the scores obtained above. One exemplar method for calculating this score is to calculate an average score of the score between the first content and the concept of "Computer", and the score between the second content and the concept of "Computer". For example, if the relevance score is 0.891 and 0.72 respectively for the first and second text content in relation to the concept of "computer", then averaging the two scores will produce a value of 0.8055. If this value is above another pre-defined threshold, for example, 0.3, then the two text contents can be considered highly relevant, and a signal can be output to indicate the relevance.

As is described above, conventional keyword-based matching method will fail to recognize the relevance between the two exemplar text contents, while the system and methods disclosed in the present invention can capture the hidden relevance, and produce a conclusion that is close to the one based in human judgments.

In some embodiments, in contrast to the example in FIG. 29 where only a single concept ("Computer") is being checked, multiple concepts can be checked to discover whether two or more pieces of text contents are relevant in relation to certain concepts. In implementation, multiple concepts can be checked one by one, or concurrently, or multiple datasets can first be combined in a certain way and then checked against text contents for more efficiency.

With the advantages of the present invention, one exemplar application of the above methods is in similar document search. A specific case of similar document search is in patent search. Whether it is for prior art search or for infringement search, what is of critical importance is not to miss a potential similar patent or application. However, as briefly mentioned above, due the varied uses of terms by different authors, both conventional keyword-based queries and keyword-matching-based document comparisons will fail to discover those patents that are conceptually similar but use different terms. The system and methods disclosed in the present invention can provide a powerful way to capture the potentially similar but seemingly dissimilar candidates, as illustrated in FIG. 29 with the example sentences (1) and (2) above.

Another example application of the present invention is in the job search and recruiting field. Typically, a job searcher knows what sort of position he or she is looking for, and wishes to find jobs based on job descriptions relevant to a resume. Without having to be limited by the results from a keyword based search, which can return either irrelevant results or miss truly relevant results, the job searcher can now use the present invention to automatically find relevant job descriptions. For example, if the job searcher has programming skills, and searches jobs using the query "software engineer", then the results may miss those job descriptions that do not use the term "software engineer", but instead use terms such as "programmer", "coder", etc. The present invention can relate the query for "software engineer" to the concept of computer programming, which will have associated terms that include "programmer", or "coder". Furthermore, the job searcher can also compare the relevancy of job descriptions to his or her resume, and the present invention can automatically return the most relevant results.

Another area where the present system and methods can achieve effective and economical results is in Internet-based or computer or mobile device-based advertising. In the conventional context-based advertising, advertisements are displayed based on the user generated text contents as a source of information about what the user is interested in or intends to do, and then using this information as the context such that relevant advertisements can be displayed based on user's current or past interest or intention. While this method is much more effective than non-context-based advertising for both consumers and advertisers, conventional methods are still mainly based on matching the keywords that occurs in the user generated text contents and keywords that the advertisers pre-define as being relevant. A disadvantage of such conventional methods is that many relevant contexts can be missed because of the lack of keyword match.

For example, if a query or a user comment contains such words as "San Francisco hotels", ads from hotels in the SF area may be displayed. However, if the query or the user comment contains such words as "stay in San Francisco", or "stay near Golden Gate Bridge", and if the hotel advertiser does not pre-define words such as "stay", "Golden Gate Bridge", etc., as relevant, their ads will not be displayed, even though they can be highly relevant to the context.

With the system and methods disclosed in the present invention, even if the hotel advertiser only pre-defines relevant words such as "hotel", by checking concepts such as "travel", or "San Francisco", etc, with their corresponding association datasets, which will likely contain terms such as "flight", "hotel", "car rental", "stay", "sightseeing", etc., the relevance between the user query or user comment and the hotel advertisement can be discovered, and the related ads can be displayed to achieve desired results.

In some embodiments, the terms in a concept association dataset are the same as the terms selected from one of the text contents. In that case, the process of concept-matching becomes equivalent to a keyword-based matching. However, the unique methods in the present invention for determining the term importance score in the first and second text contents as described with FIGS. 26a, 26b, 27, 28 and 29, still distinguish the present invention from conventional keyword matching even when the conceptual association dataset contains the same terms as a conventional keyword list, and can still produce more accurate results than conventional keyword matching.

The following are recitations of contents from U.S. Provisional Patent Application 61/680,715 (for displaying categories or search results without requiring a search query), with references to the recited drawings re-numbered to follow the sequence of the present disclosure. While not all contents are copied over, no new matter is added.

In the following description, documents and/or emails that contain text content are used as examples of the electronic objects being searched for in the presently disclosed system and methods. It should be clear that the same methods can be applied to various other types of objects that can be searched, such as videos, pictures, music, news, ebooks, etc.

Figure 32:
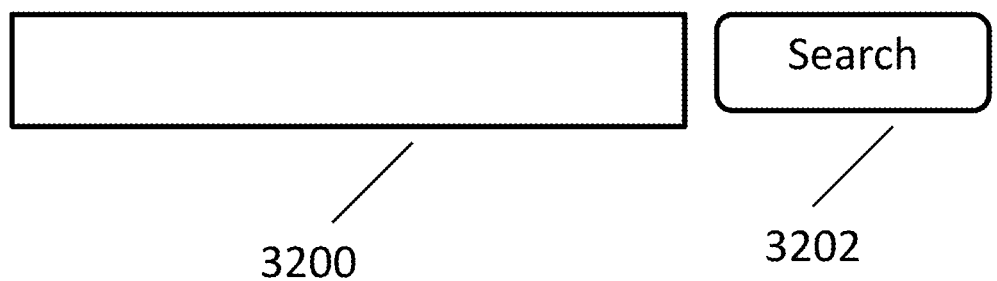
FIGS. 32 to 40 are recitations from U.S. Provisional Patent Application 61/680,715.

FIG. 32 shows an example of a conventional search system. The search interface includes search box 3200 for a user to input a query, and button 3202, usually labeled "Search" that, when acted on, will display the results of searching that are considered to be relevant to the query. A problem with such conventional search systems is that they require the user to input a query, when often the user does not really know what query to use to find the desired object(s). When the users do not know what keyword to use, by habit they will not press the Search button with a blank search box. Furthermore, on certain mobile or handheld devices with limited display area and less convenient input methods, such as small touchscreen keyboards or phone keypads, entering text into the search box can be very cumbersome, and the search box often takes up valuable space on the display screen of such devices.

The present invention discloses a more convenient search method by providing users with the ability to browse through the pre-grouped results without the need for the user to enter a query, and without a need for a search box in the user interface.

The present invention provides a user interface object, such as a button, an icon, a link, a text, or a box, etc, or a hardware device component such as a physical button on a mobile computing device, that can be activated or deactivated by the user, such that when activated, the pre-grouped results of documents being searched are displayed for users to select.

Figure 33:
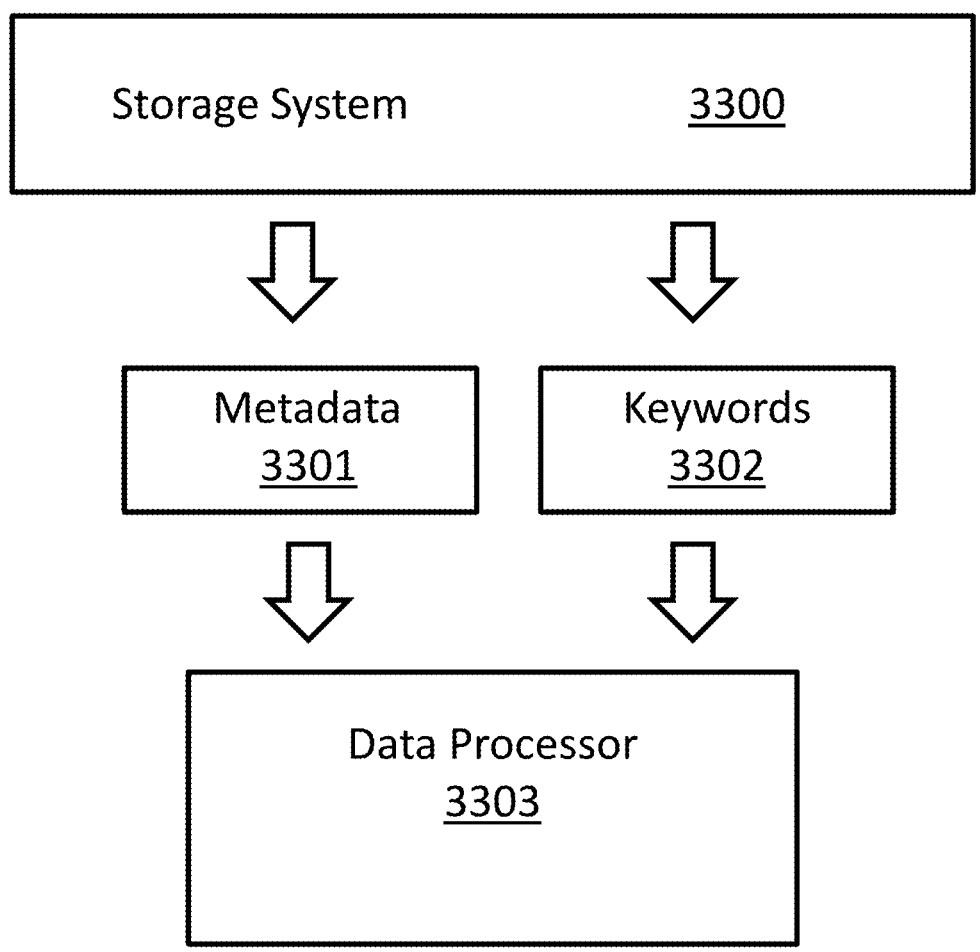

FIG. 33 shows an exemplar embodiment of the present invention, where documents or emails are stored in storage system 3300, and metadata 3301 or non-metadata 3302 of each document or email is collected, where metadata includes such data as time/date/author/sender, etc., that are collected by the storage system 3300 or the related computing system, and non-metadata can include information extracted from non-system created content data, such as subject/content type/topic/keyword/label/tag, etc. The storage system 3300 can be a local computing device such as a desktop client/server, a mobile or handheld device, a remote server, or a cloud-based system. Data processing system 3303 then organizes the documents or emails that have the same value for one or more metadata into groups or categories with different names.

Figure 34:
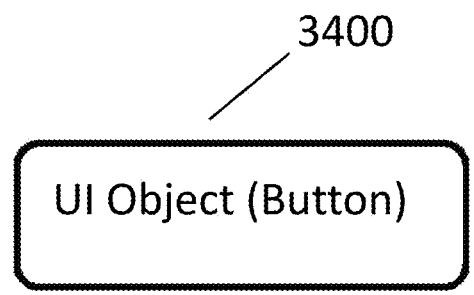

FIG. 34 shows an exemplar embodiment of the user interface of the present invention, where the user interface contains user interface object 3400 which can be a button or an icon, and without a search box. When the user acts on user interface object 3400, such as by clicking, touching, or other actions, the grouped or categorized results pre-processed by data processing system 3303 will be displayed, so the user will see some organized results without the need to enter a query. User interface object 3400 can be a clickable button, link, image, or any interface object that the user can interact with using a pointing mechanism such as a mouse pointer or a finger on a touchscreen.

In some embodiments, UI object 3400 can have any of the following names such as "Show", "NoSearch", "Discover" "Find", "Navigate", "Browse", "Search", "Browch", "What's there", "Look", or any character string, whether random or not.

Figure 35:
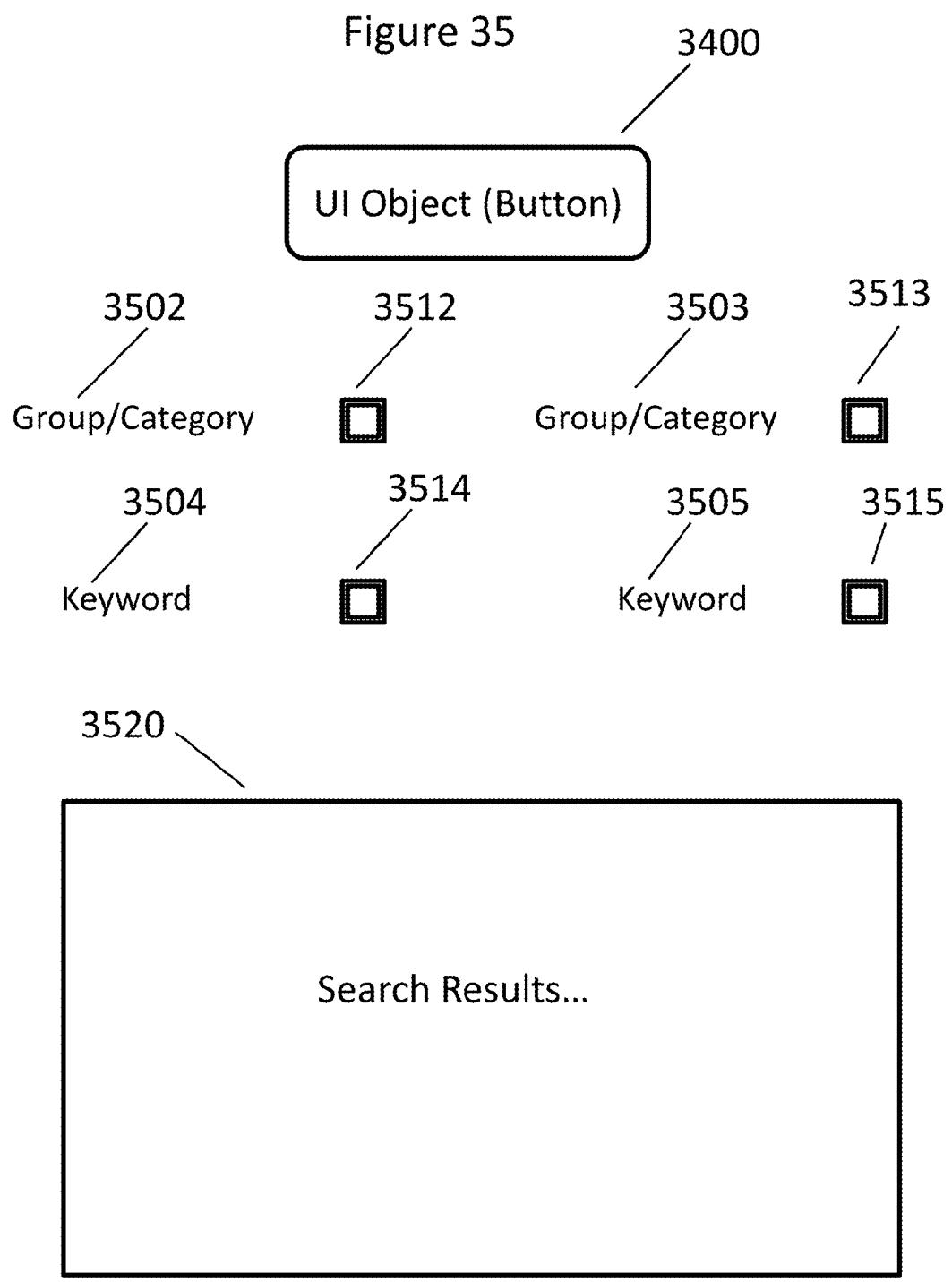

FIG. 35 shows an example of the results page displayed in the embodiment after the user has acted on the user interface object 3400. The present system displays the existing contents by one or more groups or categories (of a limited number) such that a user can select a group or category to look through. FIG. 35 shows a limited number of the one or more groups/categories that can be displayed. For the user to select one or more groups or categories for browsing, the system also provides selection objects such as 3512 and 3513, either as a checkbox, button, or indicator next to each group/category 3502 and 3503, so that the user can select/deselect one or more groups/categories to view by acting on such objects next to each item.

In some embodiments, non-metadata or data extracted from user contents such as keywords/topic/subject, etc, can also be used as grouping attributes, and the results can be displayed along with the groups/categories that are based on metadata, as illustrated by 3504 and 3505 in FIG. 35, and 3514 and 3515 are the corresponding control objects selectable by the user.

When the user acts on the selection objects 3512, 3513, 3514, or 3515, the results grouped under the corresponding group/category/keyword will be displayed in the results area 3520. The user may act on multiple selection objects to view the combined results.

In some embodiments, pre-determined default search results can be displayed in area 3520 initially, before the user has acted on the selection objects as described above.

Figure 36:
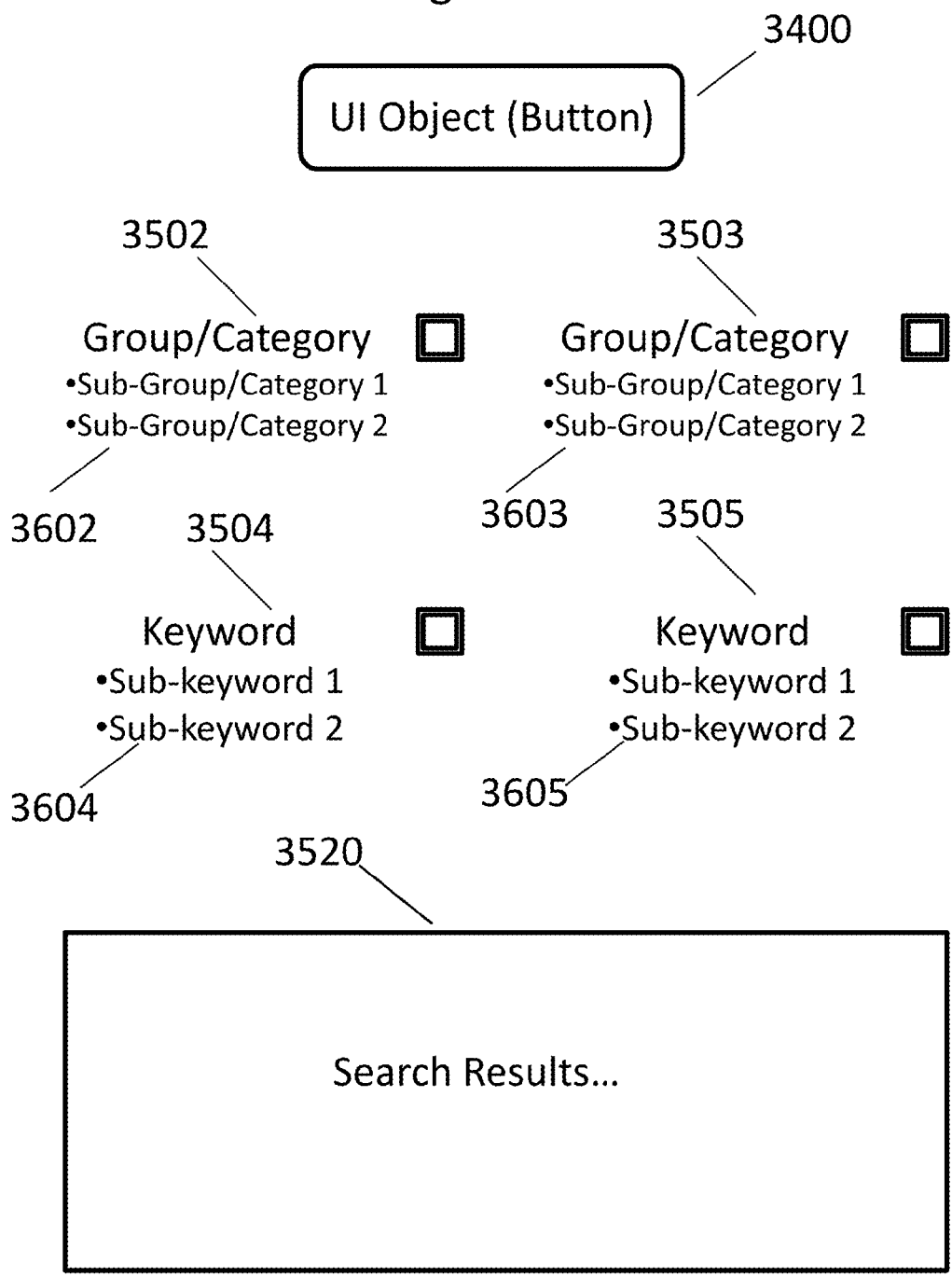
Figure 37:
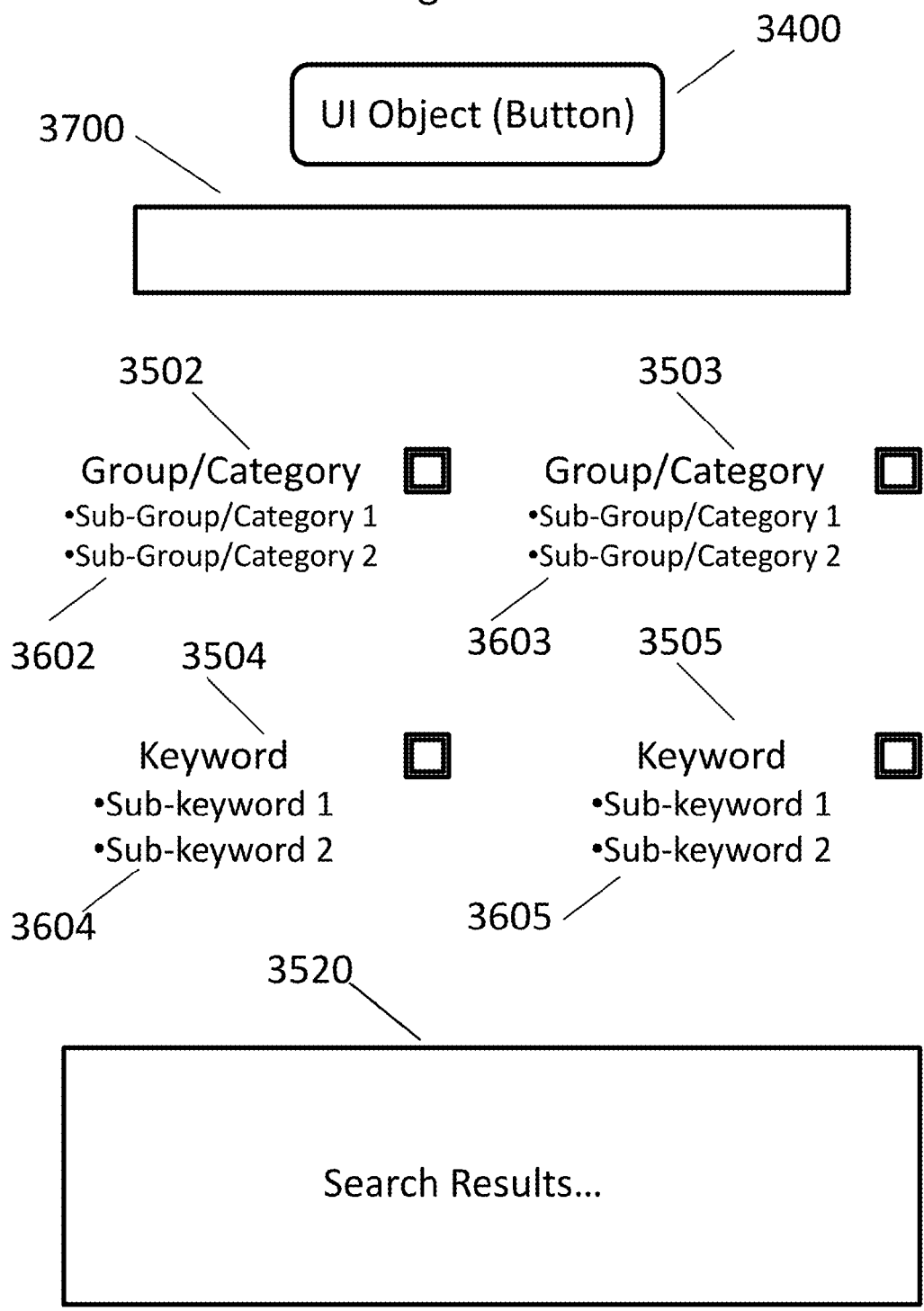

FIG. 36 shows another embodiment of the present invention, where the resulting groups displayed also has sub-groups/sub-categories/keywords 3602, 3603, 3604, and 3605 for the user to select. If the needed document or email is not in the first selected group, the user can continue to select a different group or a sub-group under the first selected group, and continue to browse through the different layers of the group tree in searching for the needed document or email. The results of the user selection can be displayed in area 3520.

FIG. 36 shows example of another embodiment of the present invention. After the user has acted on user interface object 3400, a search box 3700 is displayed in addition to the user interface object 3400, along with the group/category results. The present system displays the existing contents by one or more groups or categories (of a limited number) and sub-groups/categories and the related results as described above and illustrated in FIG. 35 and FIG. 36. However, in addition to these, the user now may enter queries into search box 3700 and perform a regular query-based search. The advantage of this method is that when the user does not have a good idea of what query to use in a conventional search system, by habit, the user would not act on the "Search" button. Now the user can start the search by acting on the UI object 3400 of the present invention first without the need to enter a query, and then when the initial grouped results are displayed, they can serve as hints to the user for developing a query, which the user can then enter into search box 3700 for more accurate search results.

Figure 38:

FIG. 38 shows another embodiment of the present invention, where the initial user interface displays a conventional search box 3800 along with the user interface object 3400 of the present invention. When search box 3800 is completely blank, acting on the UI object 3400 will bring up the grouped results as described above and illustrated in FIGS. 34, 35, 36 and 37.

Figure 39:
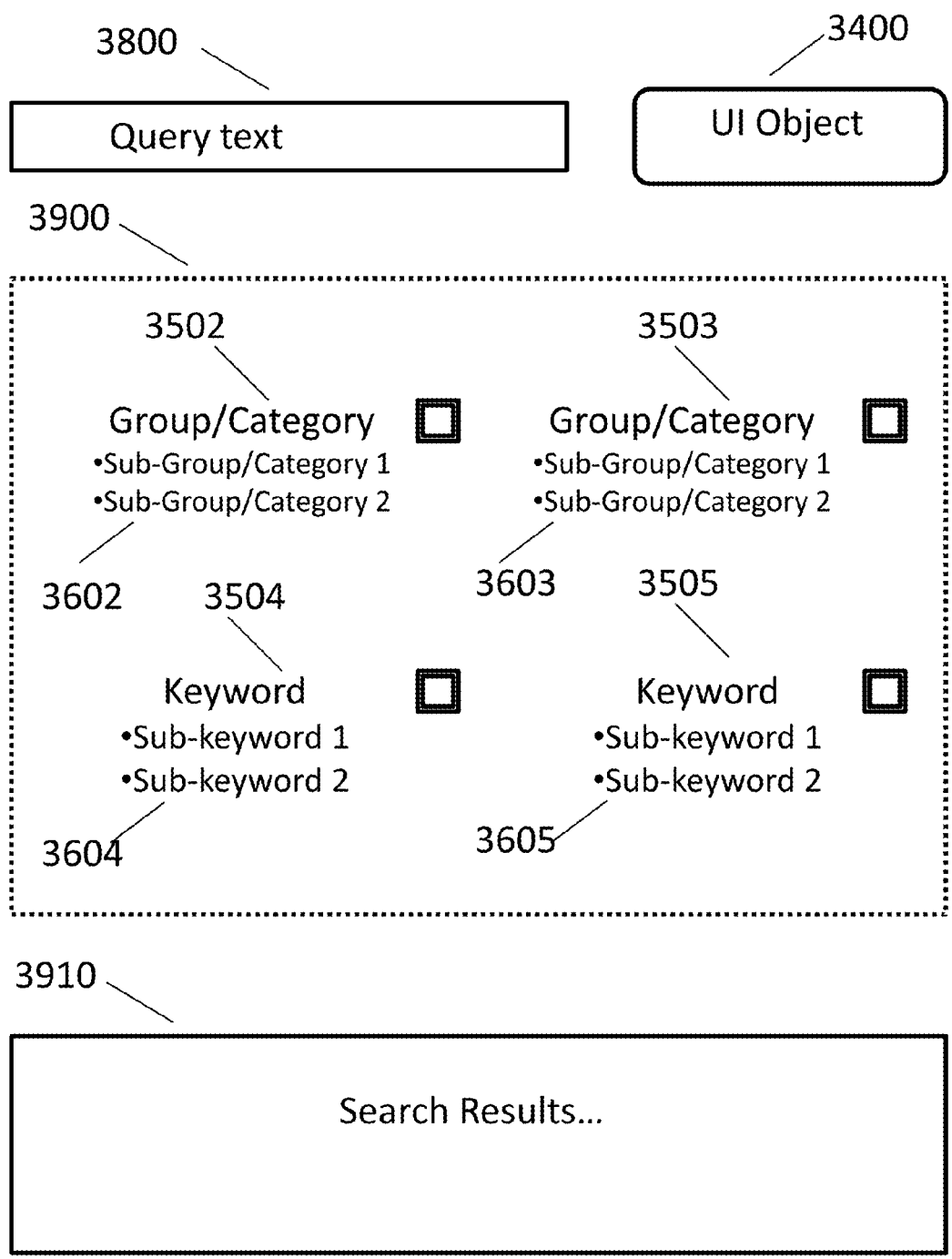

But when the user enters a query string into search box 3800, a regular query-based search can also be performed when the user acts on UI object 3400, and either the grouped results 3900 or the regular search results 3910, or both, can be displayed as illustrated in FIG. 39.

Figure 40:
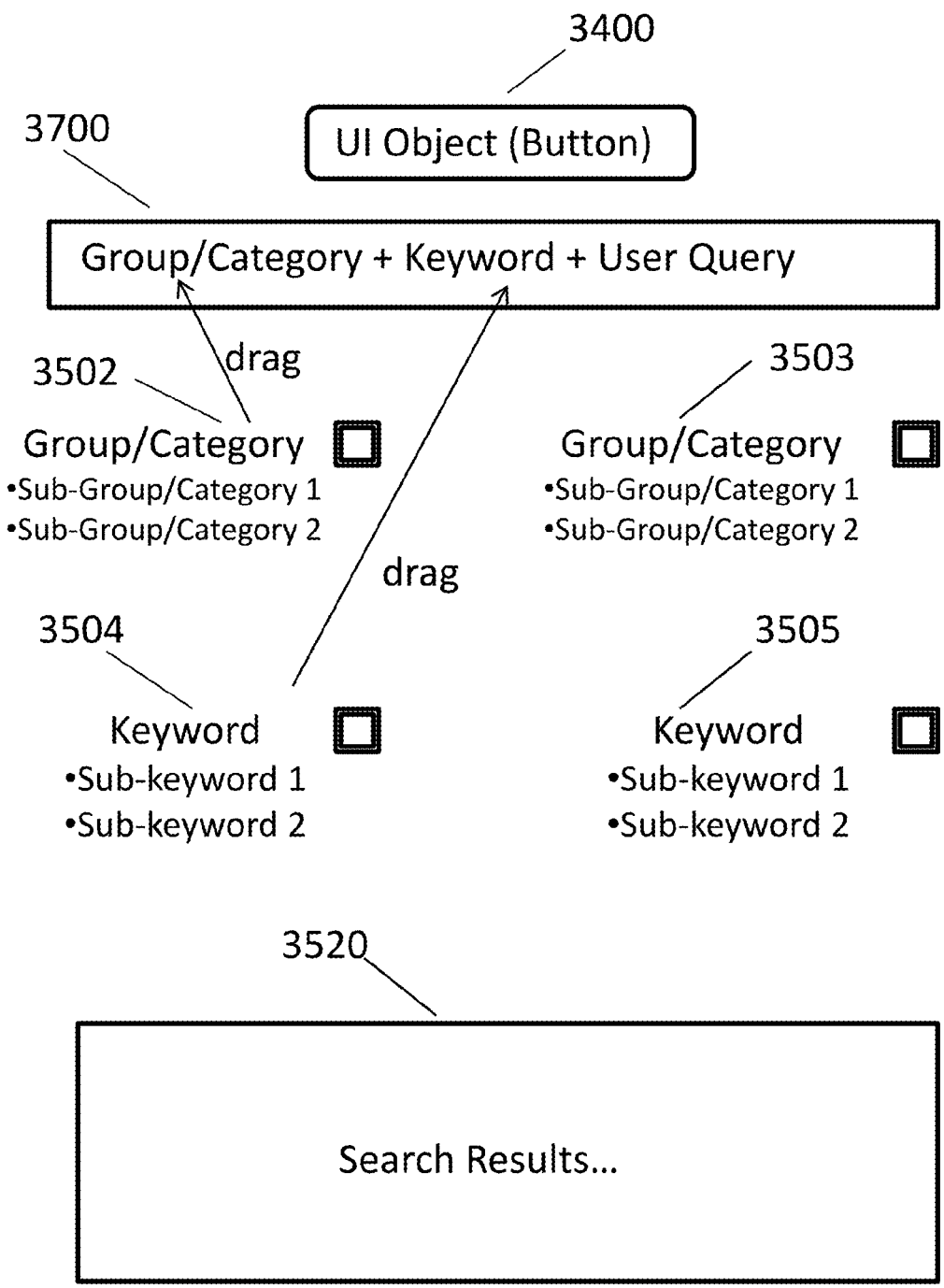

FIG. 40 is an embodiment of the present invention where the group/category/keyword names can be dragged to search box 3700 using a pointer/mouse or finger on touchscreen to combine with user-inputted queries, with the option of using Boolean operators. This allows for complex queries and advanced searching properties, while also reducing the burden of entering queries, especially on mobile or handheld devices where entering text is more difficult.

Some conventional search methods also present the search results in groups based on metadata, such as Google Desktop Search or Yahoo! Mail Search. It is important to note that with the conventional search methods the user must first enter a query string into the query box, and then click on the Search button to retrieve the initial results. Thus, even though the results may also be presented in the form of groups based on the shared metadata, a query-based search is first required before such groups can be presented. In contrast, the present system does not require the user to enter a search query. The user activates the object 3400 to initiate a search process by browsing through the pre-arranged groups without having to enter a query string first.

One advantage of the present system is that it makes the new search process much easier than the conventional search, especially when the user does not know what exact keywords to enter in the query box. For example, when there are thousands of emails in a user's email box, and most of them are from the same sender, it will require the user to enter exactly the correct query string or keyword, and then the user will likely have to go through a long list of candidates, which can often be a difficult thing to do. However, with the present invention, the user can browse through the pre-grouped results to locate what is needed without much difficulty.

The following are recitations of contents from U.S. Pat. No. 8,498,983 (for search with context information, with contents related to original FIGS. 6-10 therein, renumbered from 41-45 herein). While not all contents are copied over, no new matter is added.

Document Subject/Main Topics as Context of a Queried Term

Usually, a queried term can occur in documents of different subject matter or topics. For example, if the queried term is the word "engine", it may occur in documents with main topics about various cars, or about airplanes, or about search engines, etc. Such subject matter or topics constitute the context in which the queried term occurs. And such context can determine the relevance or irrelevance of the document to the query.

Furthermore, even if the queried term matches the main topics of a document, documents of the same subject matter or topics can have different focuses on certain aspects of the subject matter. For example, for documents having the main topic of "engine", some documents can be more about passenger car engines, while others are more about trucks. In such cases, the focus can be regarded as subtopics of the main topics, and such subtopics constitute the specific context for the queried term "engine" in the specific documents. The relevancy of the documents can often be a relative measure depending on the user intention. In certain cases when the user enters a queried term, the real intention may be a subtopic of the main subject matter represented by the queried term, and the user may not be aware of this, or may not be able to specify the exact terms representing the subtopic or context he is actually interested in or intends to search for. This is especially the case when the queried term may have different senses, for example, the word "bank" may mean a financial institute, or a river bank, etc.

Usually, in such cases the user needs to include additional terms in the query string as a way to specify the context, but often the user may not know what exact terms should be used for such context.

Also, generally speaking, for most of the users, writing is a more difficult process than reading. Writing is a process of creating something from nothing, which requires more mental efforts than reading or selecting from what's already available for selection. The presently disclosed system and methods provide an efficient solution for making an otherwise difficult process a lot easier for users.

Each term that occurs in one or more documents in the document collection can be a searchable term in the search index. For a searchable term, a list of topic terms can be compiled by collecting one or more topic terms from each document that either contains the searchable term, or is considered to be relevant to the searchable term. The topic terms can be used as context terms related to the searchable term. The list of topic terms is herein named the "context term list" of the searchable term. A context term can include one or more words, or phrases.

Figure 41:
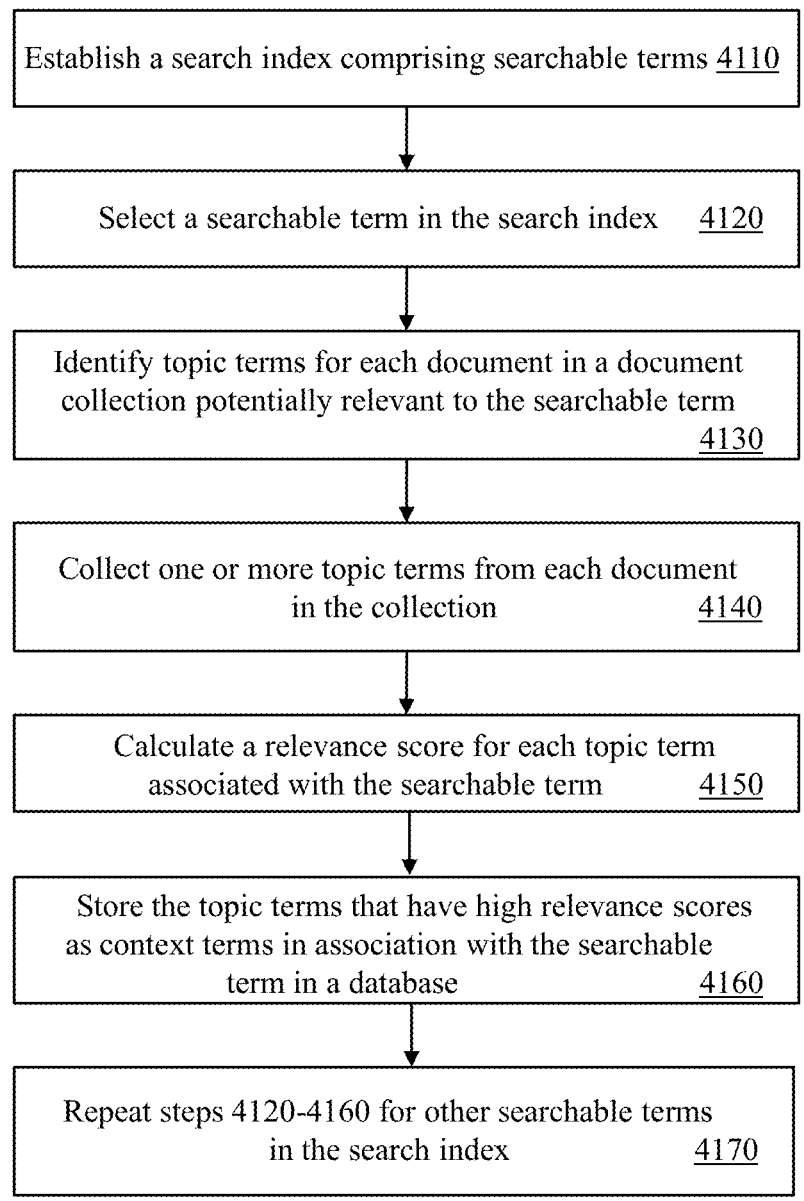
FIGS. 41 to 45 are recitations from U.S. Pat. No. 8,498,983.

FIG. 41 is a flowchart illustrating the steps for compiling semantically related context terms for a searchable term in a database. A search index comprising searchable terms is established (step 4110). A searchable term is selected in the search index (step 4120) for finding context terms semantically related to the searchable term. Next, a document collection is identified. The document collection can include documents that are potentially relevant to the searchable term as determined by the search algorithm. For example, the relevant documents can include documents in the search database that contain the searchable term. The types of documents in the collection can include various files on a computer or computer network, such as regular documents, notes, emails, web pages, newspaper or magazine articles, books, etc. Topic terms are identified in each document in the document collection (step 4130).

One or more topic terms are collected from each document in the collection (step 4140). A relevance score is calculated for each topic term in association with the searchable term (step 4150). For example, the relevance score can be calculated based on the number of occurrence of a topic term in the document collection. In another example, the relevance score can be based on the prominence score of the topic term in each document in the document collection. The topic terms that have high relevance scores are stored as context terms in association with the searchable term in a database (step 4160). As can be retrieved from the database, each searchable term can thus be associated with a list of context terms which can be ranked by their respective relevance scores or in alphabetical order. The steps 4120-660 are repeated for other searchable terms in the search index (step 4170).

Suitable methods for identifying topic terms can also include the method for discovering topic terms in a collection of document disclosed in U.S. patent application Ser. No. 12/782,545, filed on May 18, 2010, by the present inventor.

Figure 42:
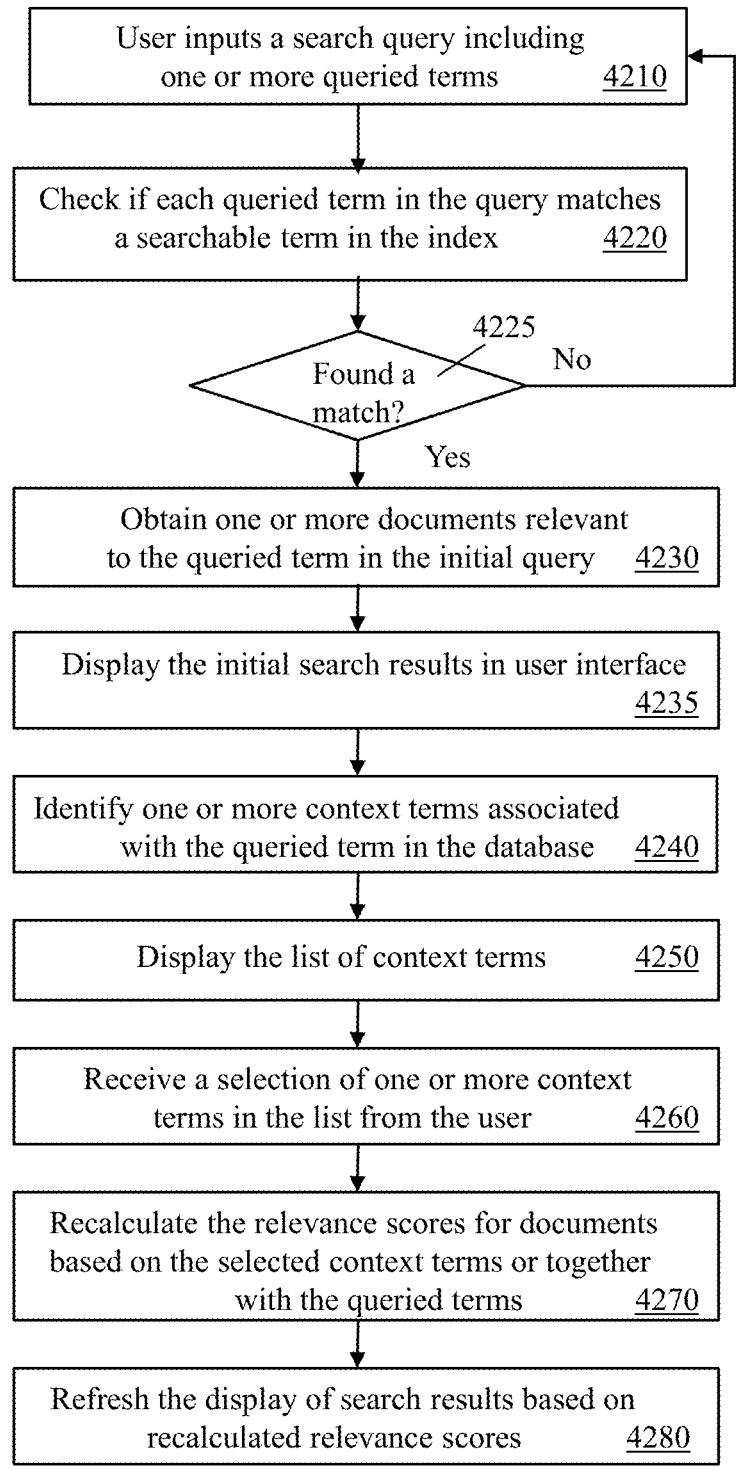
Figure 43:
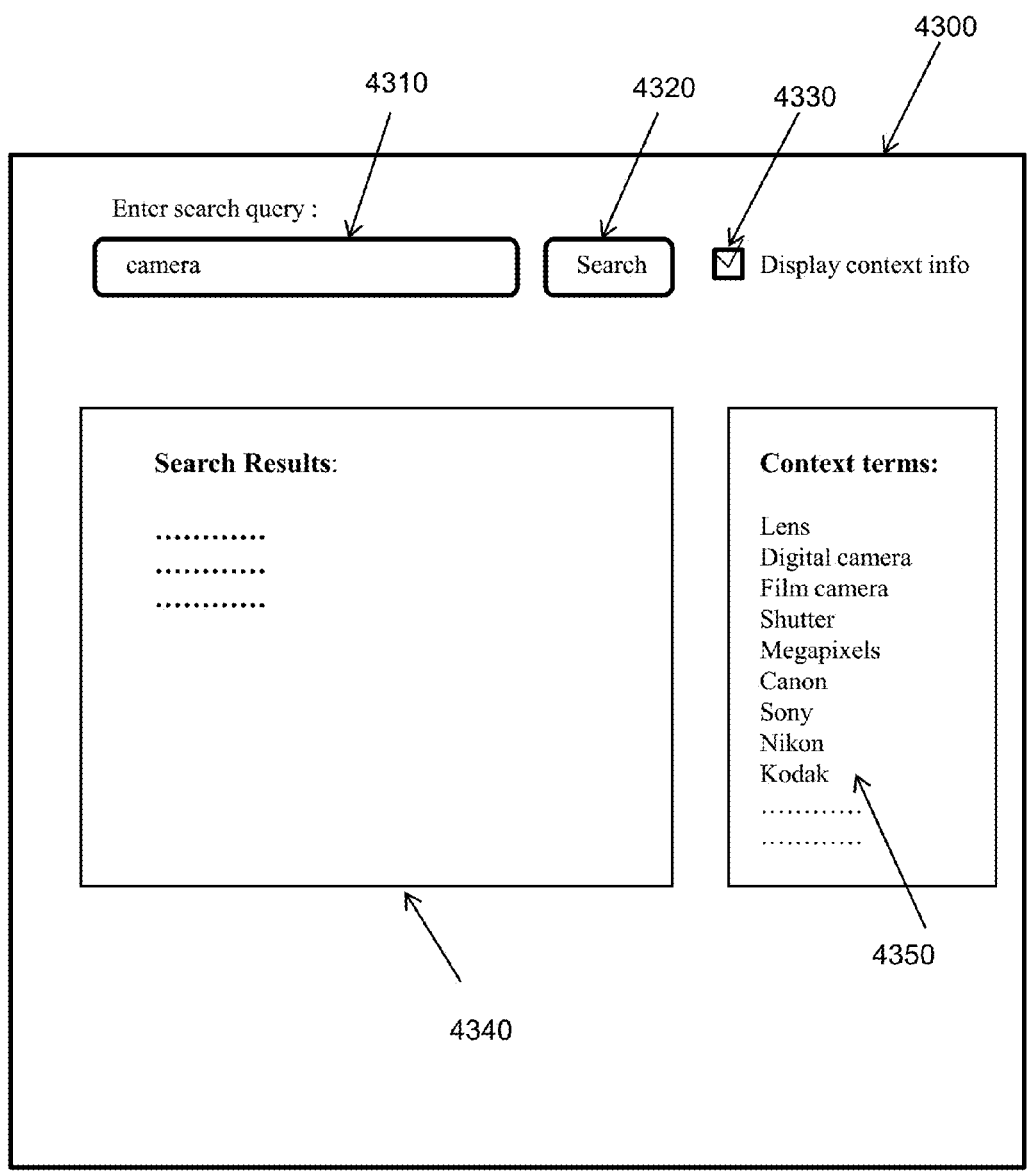

FIG. 42 is a detailed flow diagram showing the steps of providing a more accurate and faster search by providing context terms in response to a user query. FIG. 43 shows an exemplar user interface 4300 presenting context terms in real-time response to a user query. Referring to FIGS. 42 and 43, a user can enter a query term one character at a time in a query box 4310 (step 4210). The search can be conducted in a collection of documents on a personal computing device, on a company's network or file server, or in a library, or on the Internet, etc. The search can be automatically and dynamically initiated if the characters entered so far match a searchable term in the search index. Alternatively, the user can also click a button 4320 to initiate the search after a query term is entered. The presently disclosed system checks if the query character string so far entered in the query box 4310 matches with a searchable term in the search index (step 4220). If no match is found, the process repeats when the next character is entered in step 4210 (step 4225). If a queried term comprising the characters entered so far is found to match a searchable term in the search index (step 4225), one or more documents relevant to the queried term are identified and obtained as the initial search results (step 4230). The initial search results 4340 are displayed in the user interface 4300 (step 4235). The system searches the database to see if there is a context term list in the database associated with the queried term (step 4240). If one or more context terms are found to be associated with the queried term, the one or more context terms 4350 are retrieved from the database and displayed in the user interface (step 4250) as the context term list for that specific query. The user can click a button 4330 to request context terms 4350 to be displayed. The context terms 4350 can be displayed in a list ordered alphabetically or by the relevance values as described above (FIG. 41). If the number of terms exceeds the pre-determined area for display, a scroll bar can be provided to allow a user to scroll down to see more context terms.

The user can select one or more of the context terms 4350 (step 4260) in the user interface 4300 as additional parameters for the search, for example, by double clicking the one or more context terms. The selected context terms are used by the search system as input for the relevance calculations separately, or in combination with the original queried term(s) in the original query entered by the user (step 4270). Search results 4340 in the user interface 4300 are automatically and dynamically refreshed (step 4280) in response to user's selection of the context term(s) 4350.

In some embodiments, the document collection in which the topic terms are identified in the step 4130 (FIG. 41) can include some or all the documents in the search result 4340. Since the search result 4340 is based on and in response to a specific query, this approach allows the topic terms to be more effectively identified and more relevant to the queried term. In some embodiments, the document collection in which the topic terms are identified in the step 4130 (FIG. 41) can be the same as the search result 4340.

Figure 44:
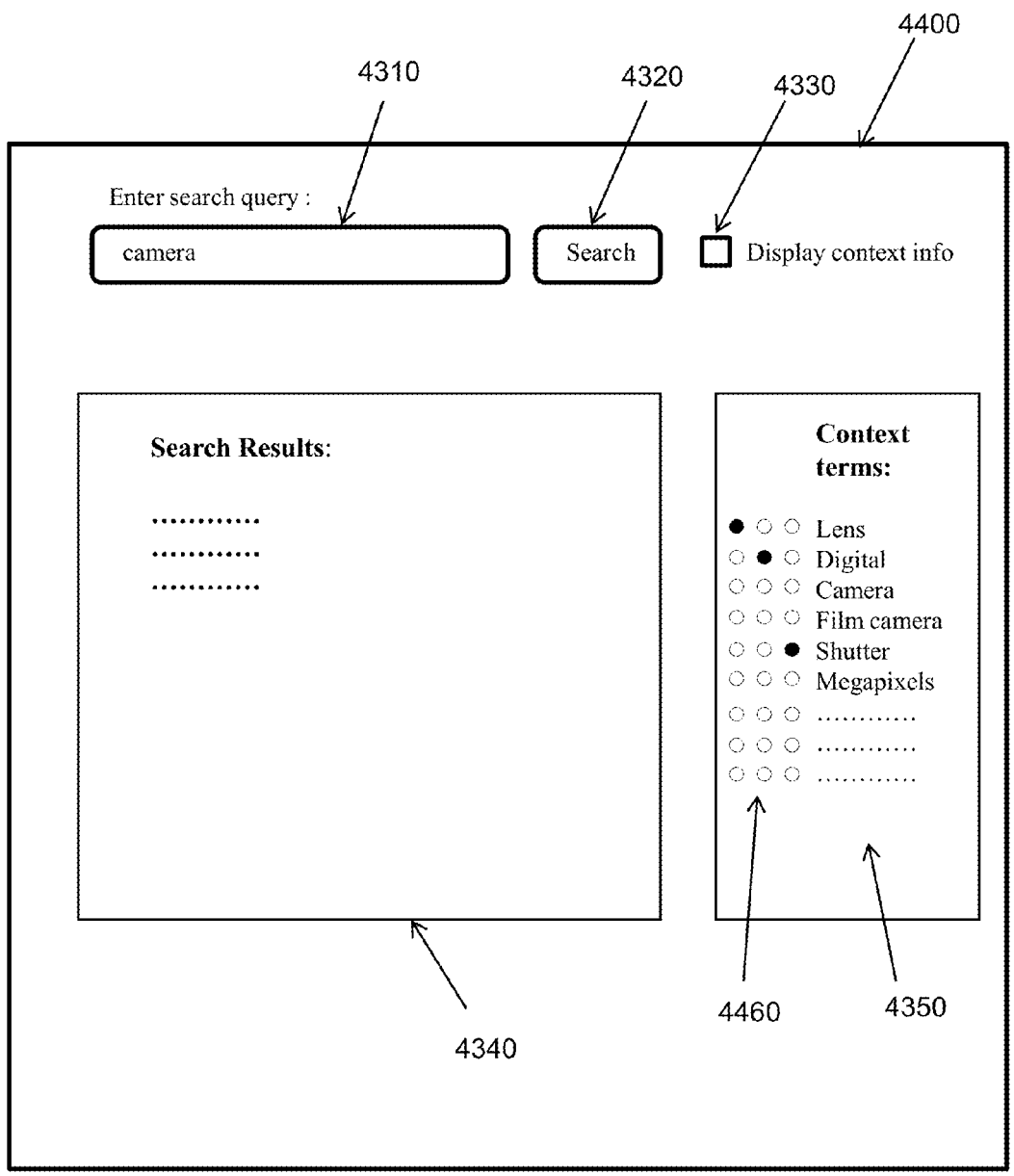

In some embodiments, referring to FIG. 44, additional user selectable objects 4460, such as check boxes or radio buttons, are displayed next to the context terms in a user interface 4400. A user can select the appropriate button to indicate whether a context term is important, less importance, or of no importance to a query. The search system recalculates the relevance scores for the documents based the original queried term and the degree of importance of the context terms indicated by the user. Depending on the user indication, a score can be assigned to the one or more context terms. For example, three choices for "very importance", "important", and "not important" can respectively have scores of 1, 0.5, and 0. The search system can use the scores as weight values in the calculation of the relevance of the documents that contain the context term. Search results 4340 can be dynamically updated in response to the user's indication of the degree of importance of the context terms and in response to the queried terms 4310.

Sometimes, the search results include too many potentially relevant documents even with the user selection of context terms shown in FIG. 44. In such cases, additional methods for quickly narrowing down the search scope are needed. The presently disclosed system and methods provide additional methods to assist the user to further narrow down the search results. In an exemplar case, the system uses document properties as additional context information when a user searches documents stored on a computer.

Various document file properties are available from the computer operating system, such as file type, file location, file size, author, creation/modification date/time, and other attributes or metadata of the documents, and can be used to facilitate the search. For example, document properties can be used to show that for a given queried term, such as "sales", there are 100 PDF type documents containing the word "sales", created in the last 6 months, stored in a folder named "Department A" in a company's document repository.

The search system collects such metadata associated with each document in the document collection, and compiles a list of property values from each document potentially relevant to a searchable term in the search index. The document property list can be pre-stored in the database or obtained as the query is input by the user. The system matches the queried terms, as each character is entered into the query box, with the searchable terms in the search index. If a queried term comprising the characters entered so far is found to match a searchable term in the search index, the document property list 4560 associated with that searchable term is obtained or retrieved from the database and is displayed in the user interface 4500 along with the search results 4340 for the queried term.

Figure 45:
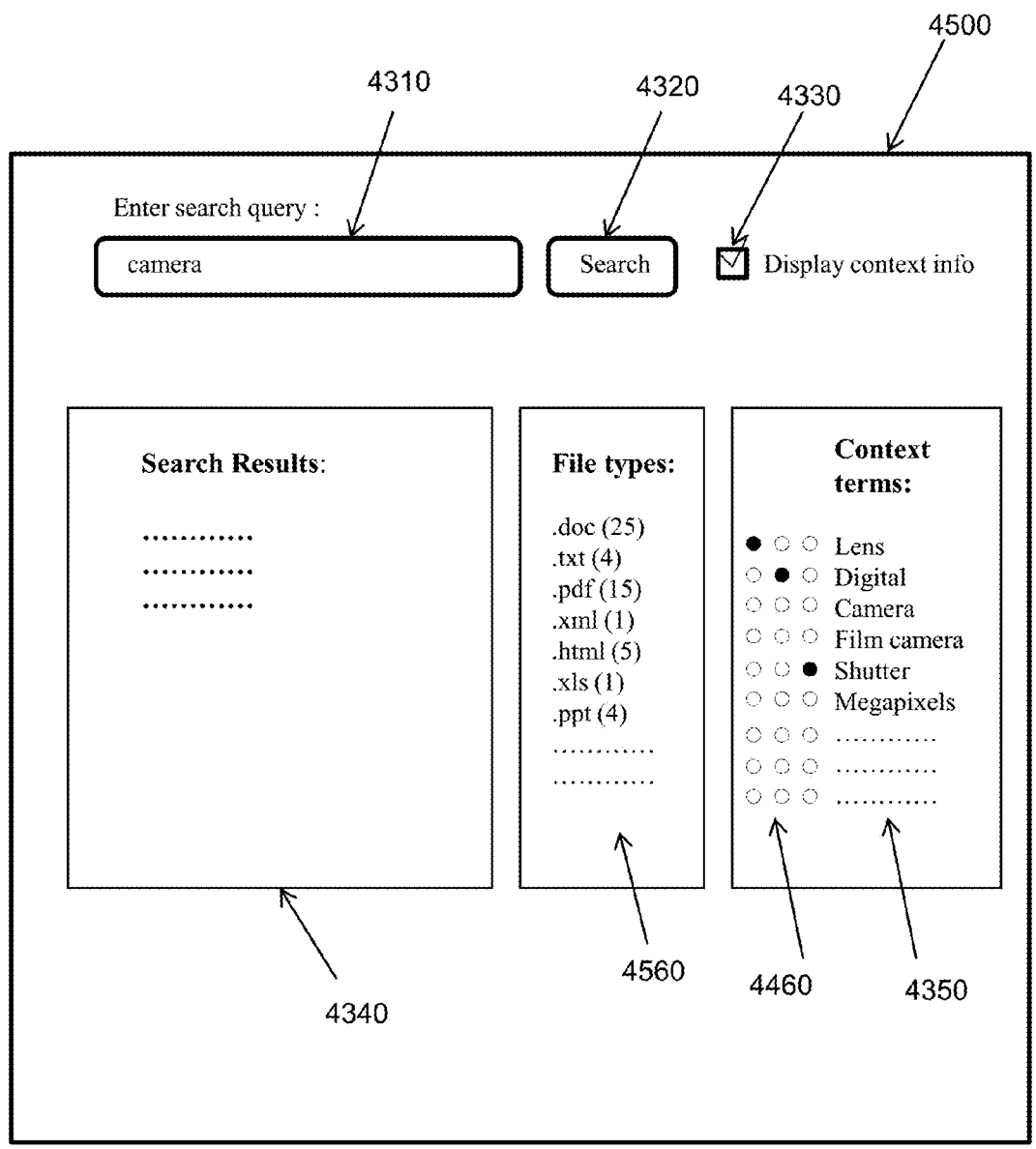

FIG. 45 illustrates a user interface 4500 displaying a document property 4560 "file type" as context information in a search. The file types and the number of each type of files can be updated in real-time in response to the queried terms as each character is being entered in the search box 4310. It should be noted that in the so-called "advanced search" in conventional search systems, document properties are provided as criteria for search operations, but they require manual selection of each property by the user. In contrast, the presently disclosed method can automatically present the applicable document properties and related values as search options to the user. The user does not have to manually specify which document properties and which values to use for the search. An advantage of the present invention is that it turns a writing process into a reading process, which is a lot easier and requires a lot less mental efforts on the user's side.

In the present invention, the multiple file properties as system-generated metadata such as file type, file location, etc, can be used alone, or in combination with other properties including the context term list described earlier. The user can select which type of the available context information to be displayed in the search system's user interface. When multiple properties are used in combination, the search system can use a method to dynamically update the context property lists as the user makes the choices, effectively narrowing down the search scope. For example, when the context term list is used in combination with the "file type", and when a particular file type is selected by the user, then the context term list may be immediately shortened to reflect those context terms that occur only in the selected file type or types, and vice versa. This can effectively guide the user to narrow down to where the needed information is located, and effectively reduce the potentially irrelevant documents to be retrieved, thus effectively reduce the time needed for the user to inspect the retrieved documents.

Furthermore, the number of documents or other searchable files related to each context item or search option can be dynamically displayed and updated as one or more such context items are selected. For example, referring to FIG. 45, when the user enters the search keyword of "camera", the system not only displays the semantic context terms related to "camera", but also other items of context information or search options such as file type, location in folders, creation/modification dates, file publishing date, and author, etc. A number or numeric value can be displayed next to each of such items, indicating the number of documents related to this particular context item. For example, if the search keyword is "camera", and there are a total of 55 documents in the search system that contain the word of "camera", and 25 of them have a file extension of ".doc", and 15 of them have a file extension of ".pdf", and etc., such numbers can be dynamically displayed next to the item name of "doc", "pdf" etc., as file type context item or search option. Also, when other context items are enabled, such as file locations in the form of folder names, and for example when 45 of the documents containing the keyword of "camera" reside in the folder named "My Documents", 20 of them reside in the folder named "Projects", etc., these numbers can also be displayed next to the context item name, and dynamically updated when other items are selected.

In environments other than the file system on a personal or company computer as exemplified above, other document properties specific to the environment can be used for providing dynamic context information. For example, file creation or publishing dates can be useful document properties for searches on the Internet.

The system and methods disclosed in the present invention can be applied to various environments where search for information is needed. The exemplar illustrations above with the personal computer environment are only one of the many applications.

One especially useful application of the present invention is with patent search. Patent search is often a very difficult task. One of the reasons is that the keywords used in various patent documents are not well defined, or their definitions do not necessarily conform to the commonsense definitions. The same keyword can be used to indicate various subject matter or different subtopics of a subject matter. For example, a search in the USPTO for the keyword "information management" can retrieve more than 700,000 patents and published applications (as of September, 2010). Some of them refer to the digital binary information storage, while others refer to various other senses of the word "information", such as acoustic information, or text information, etc. It is usually a very time-consuming task to locate what the user is searching for.

The presently disclosed system and methods can provide an effective way to quickly locate the pertinent candidates. With the display of context information alongside the search, the user can easily know what are more likely to be related and what are less likely, and can select the context terms that are relevant to the intended search, or can quickly eliminate those that are not relevant to the intended search, without spending more time in reading the full abstract or summary.

Furthermore, when the user enables the multiple context information display, other query-dependent properties specific to the patent documents can also be displayed for selection. For example, with the search query string being "information management", in addition to the context term list as described above, other fields such as inventor or assignee name, place, date, etc., can also be automatically and dynamically displayed with the filtered contents that are applicable to the query only, and the list of items for selection can further be shortened when the user selects a value from one of the properties.

The following are recitations of contents from U.S. patent application Ser. No. 12/782,545 (RZ300C) which is now U.S. Pat. No. 8,843,476, with references to the recited drawings re-numbered to follow the sequence of the present disclosure. While not all contents are copied over, no new matter is added.

The present disclosure provides systems and methods to first quantitatively determine the information prominence of a term, such as a word or a phrase, as an information-carrying unit in a document collection; and then to use such prominence data for efficient information search and organization of the document data.

The present disclosure is based on a theoretical framework developed by the present inventor about aspects of human knowledge and linguistic information.

Human knowledge, or aspects of human knowledge, can be represented in various ways. While internal knowledge representations are functions of human brains, external or artificial representations such as Frame Representation and Semantic Networks are simulation models for certain aspects of such internal knowledge.

The present invention is based on a novel model developed by the present inventor for knowledge and linguistic information representation. The model, called Object Properties Association Model (OPAM), states that part of human knowledge is based on concepts about objects and their associated properties, or based on relationships between different objects. Certain objects are perceived as the properties of other objects. Certain objects are associated with other objects in ways that uniquely define the concepts of such other objects.

The OPAM also states that such object-properties relationships are contained in our everyday language. Corresponding to the grammatical structure, there is an information structure in the language we use. Take a simple declarative sentence for example. A simple declarative sentence consists of two parts, the subject and the predicate. In linguistics, a common understanding is that the subject is what the sentence is about, and the predicate tells something about the subject. In the following simple sentences:
1A "John is a student."
1B "John is intelligent."

"John" is the subject of the sentences, while "is a student" and "is intelligent" are respectively the predicates of 1A and 1B.

In the OPAM model, the predicate is interpreted as providing a piece of measurable information about the subject of the sentence. The OPAM model also states that human languages convey information in the basic form of stating that an object has certain properties, or an object is associated with certain other objects as being its properties. The general information structure for a simple declarative sentence is "Object O has or is associated with Property P", or O+P, corresponding to the grammatical structure of "Subject+Predicate", where the Subject is the name of an object, and the Predicate is a declaration that the object has (or is associated with) one or more properties. In the present disclosure, the use of "simple sentence" and "simple declarative sentence" is interchangeable.

It should be noted that the term "object" used in the present disclosure is different from the grammatical term of "object" that refers to the object of a transitive verb, such as a noun or a pronoun, which may be in the accusative case in certain languages. In the present disclosure, this sense of "object" is not used. The sense of "object" used in the present disclosure is a thing or a concept with a name.

The simple sentence 1A is a statement about two objects of "John" and "student". In a conventional understanding, the speaker is telling something about John (that he is a student). In a mathematical or logical interpretation, the object "John" is declared to be a member of the object class of students. In the OPAM model developed by the present inventor, the object "John" is said to have or to be associated with a property of "being a student". The speaker is providing a piece of information about the object of "John". The simple sentence 1B associates another property with the object of "John" (that he is intelligent), thus providing another piece of information about the object of "John".

The same information structure in the simple sentences can also hold in complex sentences, as well as the grammatically distinguished compound sentences. A complex sentence is a sentence that contains other (embedded) sentences or clauses as its components. For example, in the complex sentence "I know that you are intelligent", the predicate "know that you are intelligent" contains another sentence of "you are intelligent", which has its own subject ("you" in this case) and predicate ("are intelligent"). Complex sentences, and simple sentences contained in them, can be recursively reduced to the atomic Subject+Predicate structure, corresponding to the basic information structure of Object+Property.

In conventional grammar, a compound sentence is a sentence that contains two or more independent clauses, or non-embedded clauses, such as "John is a student, and Mary is a teacher." in which the two clauses do not contain each other. For convenience, in the present disclosure, the term "complex sentence" refers to both the complex sentence and the compound sentence.

The subject or the predicate of a sentence can be in the form of a single word, a string of words or a phrase, or an embedded clause.

In linguistics, a phrase that consists of multiple words is often called a complex phrase, with an internal structure of "Modifiers+Head". For example, in the phrase "digital cameras", "digital" is the modifier, while "cameras" is the head. The order of the head vs. the modifiers in the phrase depends on the specific languages. In English, the head of a noun phrase may either be before or after the modifier. For example, in the phrase "the observed facts" and "the facts observed", the head noun of "facts" can be before or after the modifier. Under the OPAM model of the present invention, the informational structure of a complex phrase can also be represented by Object+Property, corresponding to the grammatical structure of the Head+Modifier. For example, in the phrase "digital camera", "digital" is interpreted as a property of the object of "camera".

A document can include one or more paragraphs. Each paragraph can include one or more simple and/or complex sentences. Details about other aspects of the Object-Properties Association Model and methods for quantitatively determining the information in a specific text unit for a specific object is disclosed in commonly assigned U.S. patent application Ser. No. 12/573,134, titled "System and Methods for Quantitative Assessment of Information in Natural Language Contents", filed on Oct. 4, 2009, and U.S. Provisional Patent Application 61/143,140, titled "System and Methods for Quantitative Assessment of Information in Natural Language Contents" filed on Jan. 7, 2009, both by the present inventor.

In the present disclosure, the focus is on identifying the general information focus of a document collection comprising one or more documents. In the OPAM model, symbolic names of objects and properties, such as a word, a multiword phrase, or any sequence of words or phrases, referred to hereafter as a term or terms, are information-carrying units in a document or a document collection. The model further states that such terms may represent the focus of the information in the documents to varying degrees depending on their roles in the grammatical and informational structure of the linguistic units that contain them, such as a sentence, a paragraph, or a document, and thus can be treated as potential topics or subjects of interest of such linguistic units. In the following description, a term may also be called either as a 'topic term" or an "information focus term".

The OPAM model further states that while property names (or property terms) may provide varying amounts of information about the object, the object names are of a higher degree of information prominence in the sentence than property names. Thus, the subject of a sentence in a document usually receives more information focus than other constituents of the sentence; and the head of a complex phrase usually receives more information focus than a modifier in the phrase. In OPAM model, this is the principle of degree of informational prominence based on the grammatical role of a term.

The model further states that for a given document collection, a term's informational prominence is further determined by the prominence of the term inside the document collection, herein called "the internal term prominence" (ITP), together with the prominence of the term outside the document collection, herein called "the external term prominence" (ETP).

In quantitatively assessing the strength of the information focus on a term, the present disclosure first uses a weighting coefficient method to distinguish the degree of information focus on terms that play different roles in the linguistic structure.

And then, the present disclosure provides methods for the calculations of the values of both the internal term prominence (ITP), and the external term prominence (ETP), and methods for calculating the collection-specific term prominence (CSTP) as a measure of the term's likelihood in being an information focus or a prominent topic term in the document collection.

The present disclosure also provides methods for the application of such information focus data as a solution to organizing the unstructured data and for efficient information search by providing multi-layered browsable topic lists that can serve as clues to what types of contents are present in the collection, and enable automatic document categorization as a further solution for organizing unstructured data for efficient access.

Figure 46:
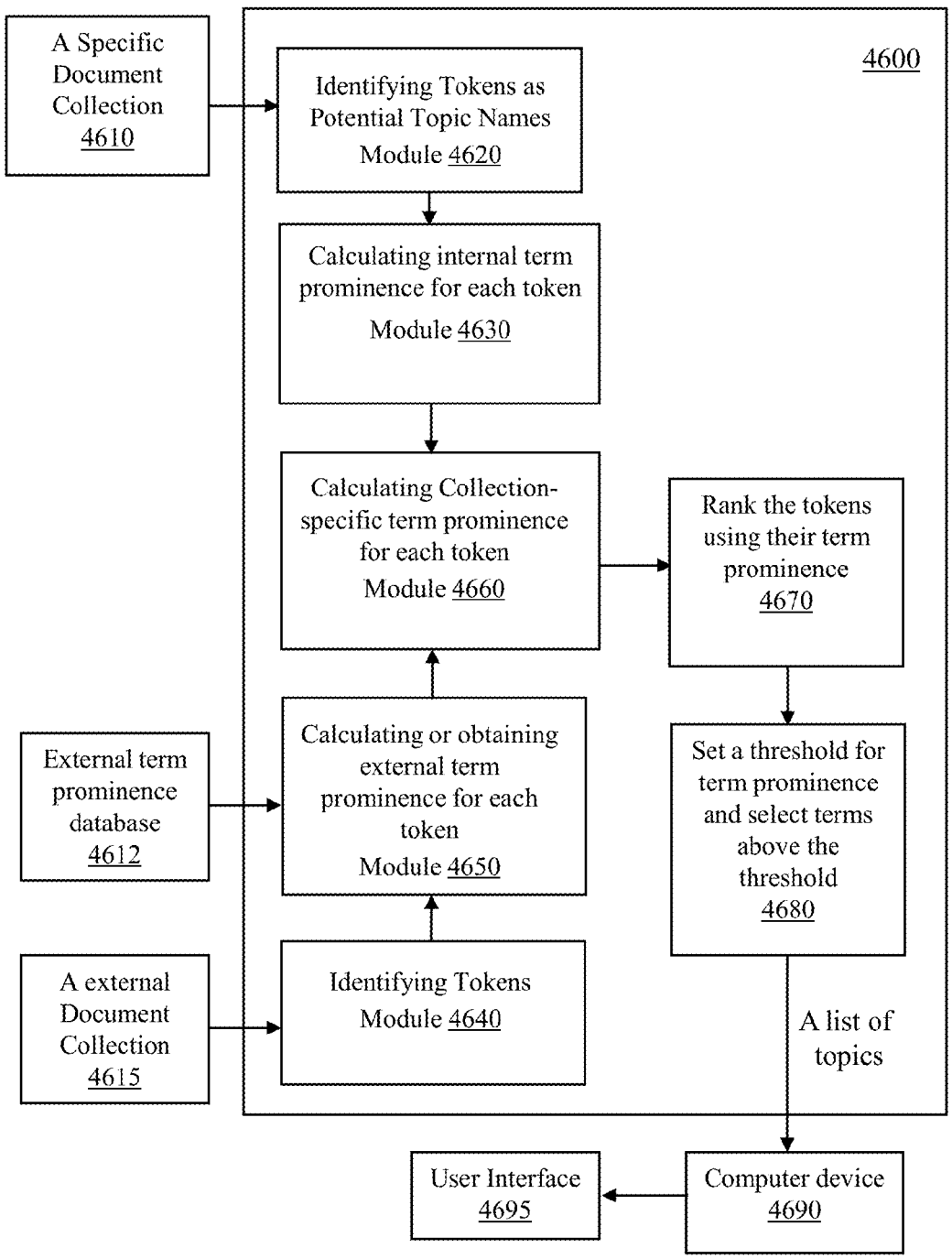

Referring to FIG. 46, a system 4600 includes a plurality of functional modules 4620 to 4680. First, a specific document collection 4610 is stored in the storage media in a computer system, and accessed by the system 4600. Each term in each of the documents in the collection is extracted as a potential topic term by module 4620. The Internal Term Prominence value for each term, also called a token, is calculated by module 4630. On the other hand, a second document collection 4615 comprising documents selected from outside of the specific document collection is optionally stored in the storage media in a computer system, and accessed by the system 4600. In some embodiments, the second document collection can be from random sources. Each term in each of the documents in the second collection is extracted by module 4640 as a token. The External Term Prominence value for each token from the second document collection is calculated by module 4650. In some embodiments, the External Term Prominence values for a plurality of tokens from the second document collection can be pre-calculated by the module 4650, and stored in a database 4612. In such cases, the module 4650 can bypass the second document collection 4615 and module 4640, and retrieve the External Term Prominence value for each token from the database 4612.

Then, the Collection-Specific Term Prominence (CSTP) value for each token is calculated by module 4660, using the values from the modules 4630 and 4650. The collection-specific term prominence (CSTP) is a measure of the strength of a term's information prominence in the document collection. Then, all the tokens are sorted in a sequential order by their CSTP values in module 4670. A threshold value is set in a module 4680 to select those tokens that have their CSTP values above the threshold. The selected tokens are output as a list of topic terms for documents contained in the specific document collection by the system 4600. The output can be sent to a computing device 4690 such as a computer server or a personal computer, which can enable the list of topic terms to be displayed on a user interface 4695. More details about the display and usage of the list of topic terms are disclosed below in relation to FIGS. 53-56.

Figure 47:
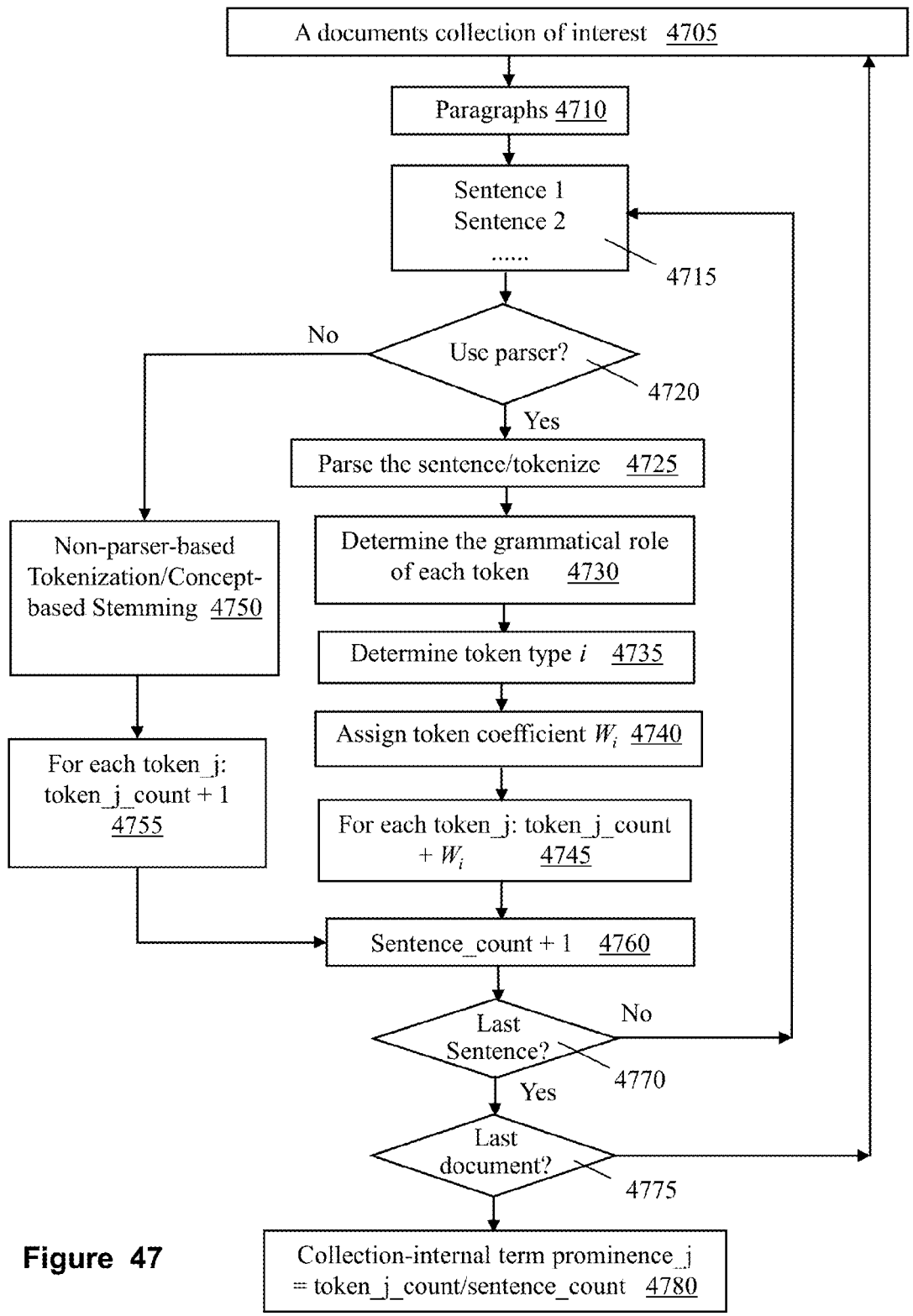

FIG. 47 illustrates the detailed steps for calculating the value of the internal term prominence for each term in a document collection. A specific document collection of interest, or the documents to be analyzed, is received (step 4705). The document collection can contain one or more documents. For each document in the specific collection, the document is broken into smaller units of paragraphs (step 4710) and sentences (step 4715). Next, a decision is made whether a syntactic parser is to be used or not (step 4720). The use of a syntactic parser is preferred, but not required. A syntactic parser is in most cases a rule-based procedure embodied in the form of a computer program. It receives a string of characters, such as a sentence or an equivalent, and outputs a structural description of the grammatical relations between various components of the sentence. Syntactic parsers of various types can be freely or commercially available, or can be constructed based on rules one wishes to employ. A syntactic parser can be used to divide a complex sentence into simple sentences, and divide a simple sentence into a subject and a predicate, and divide a complex phrase into modifiers and a head. As it is known, a syntactic parser may not always produce a structural description of a sentence that conforms to the understanding by human language users. Usually, a higher-precision parser produces better results, but often costs more computing resources. Depending on whether a syntactic parser is used or not, for each sentence, different words and/or phrases in the sentence are extracted as tokens or potential topic terms using different methods (steps 4725, 4750).

Depending on the specific language being processed, a process called stemming may be employed. This usually applies to many Western languages, such as English and other members of the Indo-European language family, and can also apply to certain Eastern languages. When it applies, as an optional step, the presently disclosed methods provide a novel approach of concept-based stemming in the tokenization of the sentences. The concept-based stemming merges only those words that are morphological variations of the names of the same concept or object name, for example, the plural form of a noun with the singular form of the same noun in English. In English, certain morphological variations of verbs, such as those for tense and aspects (e.g. "go", "went", and "gone") have their own shades of meanings and thus are not recommended for stemming. Variations for subject-verb agreement, such as "go" vs. "goes", are recommended for merging since they are referring to the same concept of an action. One aspect of the presently disclosed methods is that different rules of morphological consolidation can be used for specific languages. This concept-based stemming method is different from common practices in the conventional document retrieval or document classification.

In some aspects, the so-called "stop words" can be included in the presently disclosed methods. Some words that are treated as "stop words" in conventional techniques are considered here to be also meaning-carrying units in the language, which may be part of the names of potential objects or properties of certain objects. For example, "the" and "a" in English are conventionally excluded from text analysis as non-meaning-carrying words. However, phrases such as "a house" and "the house" can be very different in meaning under different contexts. For example, in a legal document about the ownership of a house, a sentence "He owns a house" can have a very different consequence from the sentence "He owns the house". Since the present system and methods involve the meanings of natural languages, such conventional "stop word" can be included.

If a parser is used, each sentence is parsed by the parser to identify grammatical components of the sentence such as the subject, the predicate and detailed structures within the subject and the predicate, or other parts of the sentence (step 4730). For a multiword complex phrase, the parsing operation can identify the head and the modifier of the phrase.

Each token in the sentence is assigned a token type according to its grammatical role in the sentence as determined by the syntactic parser (step 4735). An exemplar Token Type definition can include the following:

If the token matches the subject, the token is marked as a Type 1 token.

If the subject is or contains a multi-word phrase and the token is the head of the multiword phrase, the token is marked as a Type 2 token.

If the subject is or contains a multi-word phrase and the token is a modifier in the multiword phrase, the token is marked as a Type 3 token.

If the token matches the predicate of the sentence, the token is marked as a Type 4 token.

If the predicate is or contains a sub-phrase and the token is the head of the sub-phrase, the token is marked as a Type 5 token.

If the predicate is or contains a sub-phrase and the token is a modifier in the sub-phrase, the token is marked as a Type 6 token.

If the token is in any other text in the sentence, the token is marked as a Type 7 token.

As stated above in the OPAM model, different types of tokens may represent different degrees of the information focus as a result of their being in different positions in the grammatical and informational structure of the sentence.

Each type of token i is then assigned a weighting coefficient value (step 4740). The weighting coefficient, $W_i$, can have an exemplar value between 0 and 1, the magnitude of which reflects the different degrees of likelihood that such a token may be an information focus in the sentence. Using the example of the Token Type definition described above, $W_1$ (for a Type 1 token) may be assigned a value of 1 because a term as the subject of a sentence is more likely to represent the information focus of the sentence than other types of tokens in the sentence. Thus, if the j-th token is a Type 1 token, then in the exemplar embodiment the parameter "token_j_count" is incremented by 1 (step 4745) for each sentence the token occurs in, or in some embodiments, for each occurrence of the j-th token. Similarly, values of other weighting coefficients can be exemplarily set as $W_2=0.9$; $W_3=0.8$; $W_4=0.7$; $W_5=0.6$; $W_6=0.5$; $W_7=0.4$ for the corresponding types of tokens in accordance with the decreased likelihood that a token may represent the information focus of the sentence. In general, instead of simply counting one for each occurrence of the jth token, or for each sentence the token occurs in as in the exemplar embodiment, the contributions to "token_j_count" are the token's respective weighting coefficients that are associated with the specific type of the token. This is mathematically equivalent to each token count being scaled by the respective weighting coefficient values according to the type of the token.

If a parser is not used (step 4750), as a follow up to a negative answer to the question in the step 4720, the sentence bypasses the parsing and the token type and weighting coefficient assignment process from step 4725 to step 4745.

First, for the tokenization of the sentence, other methods such as single-word tokens or multi-word n-gram methods can be used (step 4750). The concept-based stemming as described above can also be employed (step 4750).

Then, in the exemplar embodiment, for each token in the sentence, the parameter "token_j_count" is simply incremented by 1 if the j-th token occurs in the sentence at least once (step 4755). In some embodiments, token_j_count" is incremented by 1 for each occurrence of the j-th token if it occurs more than once in a sentence. Optionally, this case of not using a parser can be treated as a special case of using the parser where the parser does not label the token with any grammatical role, and a special token type, such as type 8, can be assigned to the token to indicate that no grammatical roles are determined, so that all occurrences of the token are treated the same, and the weighting coefficient of type 8 token can be assigned the value of 1.

After all tokens in the sentence are counted, the parameter "sentence_count" is next incremented by 1 (step 4760). The parameter "sentence_count" tracks the total number of sentences that passes the step 4720, each of which may include potential topic terms as the information focus associated with the document collection.

Steps 4710 to 4760 are repeated until all the sentences in a document (step 4770) and all the documents in the collection (step 4775) are processed. The collection-internal term prominence for the j-th token is the cumulative "token_j_count" divided by "sentence_count" that is the total number of the sentences in the document collection (step 4780).

Using the exemplified methods, the internal_term_ prominence_j has a value between zero and one.

It should be noted that Token Type definition can include different variations, and the weighting coefficient $W_i$ can be assigned with different values.

In some embodiments, a single type of tokens, such as type 1, or a mix of a selected number of token types can be used without also using other types of tokens for the purpose of calculating the term prominence. One exemplar case for such a choice is when only the most likely topic terms need to be identified, such as type 1 or type 2 tokens.

Similarly, the number of sentences selected from the document collection can be a portion of the total sentences in the collection in step 4705, and the "sentence_count" can be adjusted accordingly.

As has been described earlier in relation to OPAM, one of the principles in the OPAM model of the present disclosure is that the prominence of a term as a measure of information focus in a document collection can be determined by two related aspects of the term:

1) the prominence of the term inside the document collection, called "the internal term prominence", which is described above; and 2) the prominence of the term outside the document collection, called "the external term prominence", which is described below.

Figure 48:
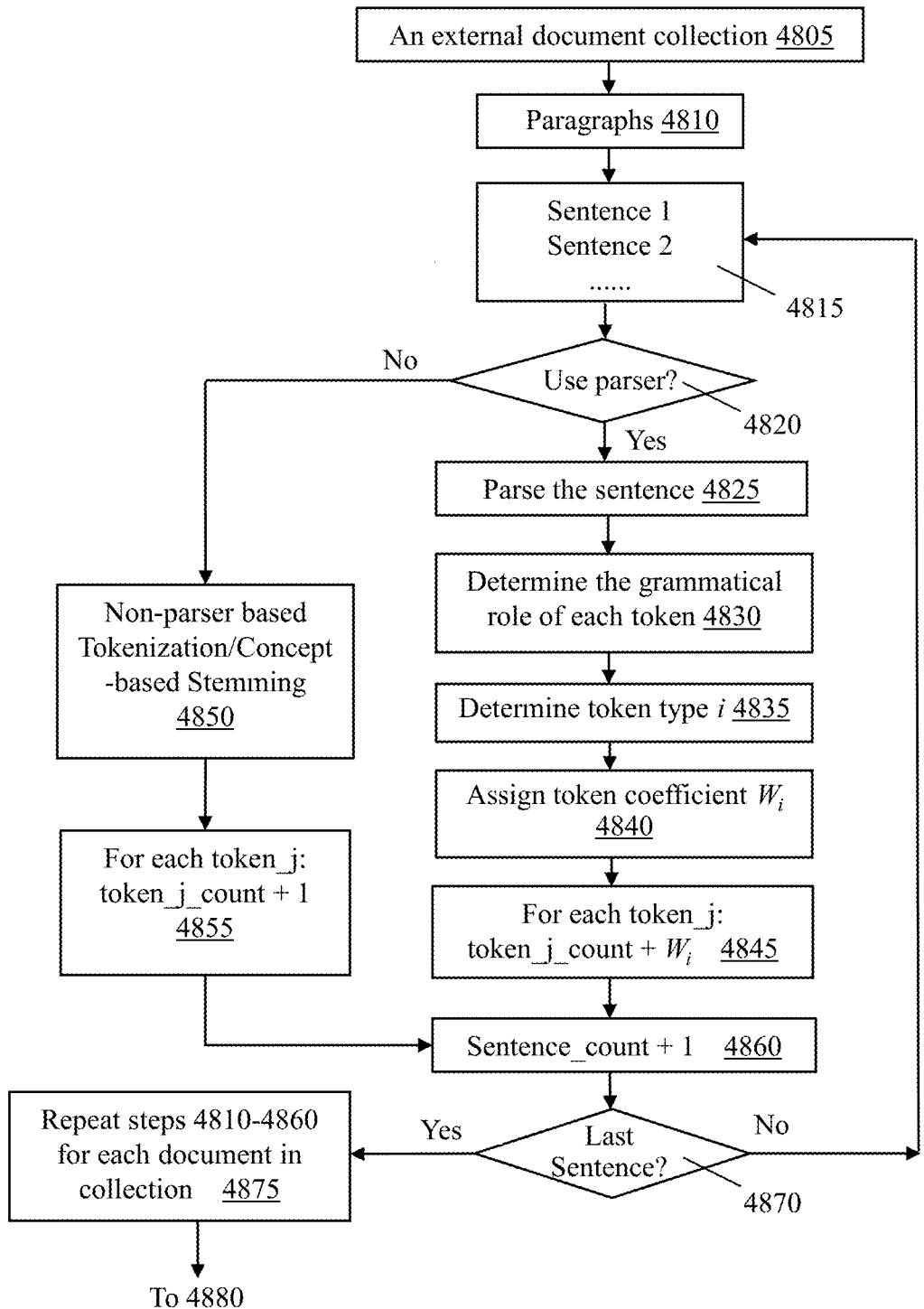
Figure 48:
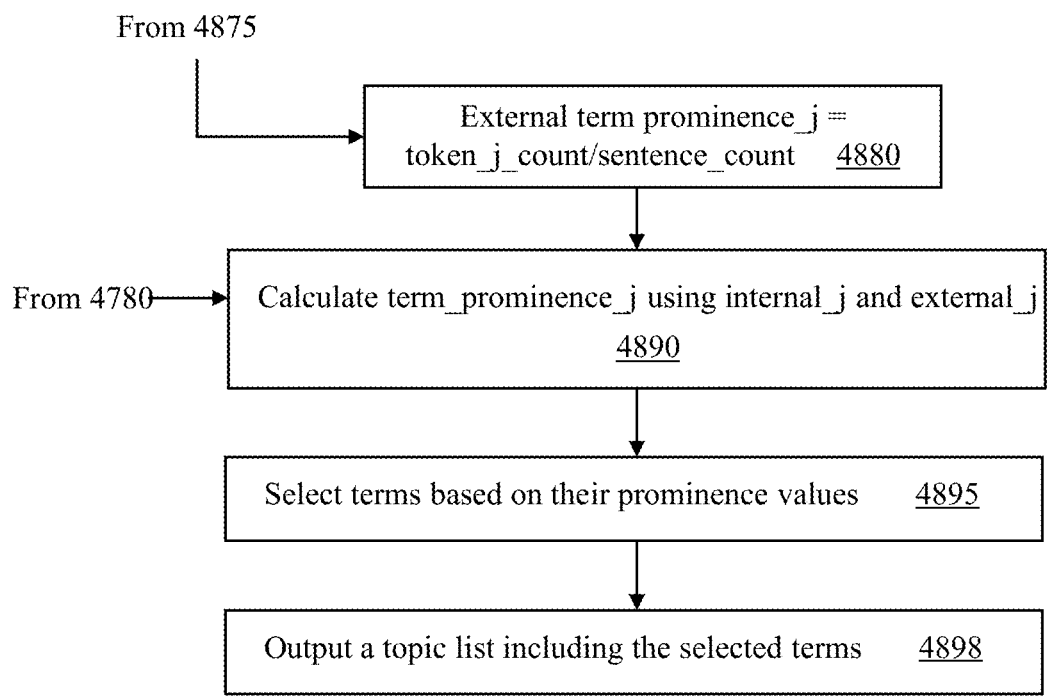

In some embodiments, referring to FIG. 48, a second group of documents are used to obtain the external term prominence for each corresponding token in the specific document collection. These documents can be randomly collected, or collected from sources that are believed to be different from the specific (the first) document collection (step 4805). The data amount (the numbers of documents, paragraphs, and sentences) in the second group can be different from or the same as the data amount in the first group of documents. The documents are separated into paragraphs (step 4810) and sentences (step 4815).

The sentences each is then optionally parsed to identify its grammatical components such as the subject and predicate and other phrases. If a parser is used for the internal term prominence (step 4725, FIG. 47), then a parser should also be used for the external term prominence to avoid inconsistency (step 4825).

Similar to the steps in FIG. 47, if a parser is used, the grammatical role of each token is determined (step 4830). Each token is assigned a Token Type (step 4835) and a weighting coefficient Wi (step 4840) according to its grammatical role. The parameter of token_j_count is incremented by the weighting coefficient Wi if the token is of type i (step 4845).

If no parser is used, other methods of tokenization, including the single-word tokens or n-gram method can be used (step 4850). Optionally, concept-based stemming process as described above can be used if it is also used for the internal term prominence. In the exemplar embodiment, "token_j_count" is incremented by one (step 4855) for each sentence the token occurs in.

The "sentence_count" is incremented by one for each sentence in the document group (step 4860).

Steps 4815 to 4860 are repeated until the last sentence in the document is processed (step 4870). The steps 4810 to 4860 are repeated for all the documents in the second group (step 4875). The external term prominence value for the jth token is calculated (step 4880) by the cumulative token count for the jth token "token_j_count" in the second group of documents divided by the cumulative sentence count "sentence_count" in the second group of documents. Using the exemplified methods, the external_term_prominence_j has a value between 0 and 1.

In some embodiments, as with the first group of documents, a single type of tokens, such as type 1, or a mix of a selected number of token types can be used without also using other types of tokens for the purpose of calculating the term prominence values. Similarly, the number of sentences selected in the second group can be a portion of the total sentences from the second group of documents in step 4815, and the "sentence_count" can be adjusted accordingly.

With both the internal and external term prominence data obtained from the above, the collection-specific term prominence (CSTP) for the jth token as a potential topic name is calculated (step 4890) using the internal_term_prominence_j (ITP) obtained in step 4780 (FIG. 47) and the external_term_prominence_j (ETP) obtained at the step 4880.

In some embodiments, the collection-specific term prominence value (CSTP) for a jth token is computed (step 4890) by the following equation:

$$CSTP_j = ITP_j - ETP_j. \qquad (Eqn.\ 1)$$

Using this method, the CSTP value for a token or a term can be in a range between −1 and 1. It should be noted that although a CSTP value can be −1 for a token, when the data for the external term prominence is in a large enough quantity and truly from different sources, such as random sources, most of the negative CSTP values tend to be slightly below zero. Thus, in some embodiments, negative CSTP values can be assigned to zero so that CSTP always has a value range between 0 and 1.

In some other embodiments, the collection-specific term prominence value CSTP can be calculated (step 4890) using different formulae from the above, for example, using a formula:

$$CSTP_j = ITP_j * (ITP_j / (ITP_j + ETP_j)) \qquad (Eqn.\ 2)$$

A beneficial feature of the formula in Eqn. (2) is that CSTP does not have negative values.

The text unit for counting tokens and computing ITP, ETP and CSTP can be paragraphs or documents in addition to sentences. Paragraphs as text units can also be viewed as a special case of using documents as text units. For example, when paragraphs are used as the text unit for calculating the term prominence, one exemplar method is that if a jth token occurs in a paragraph one or multiple times whether in the same or in different token types, the parameter "token_j_count" is incremented only once for each paragraph it is in, either by the highest weighting coefficient value Wi_max if a parser is used, or by one if no parser is used, no matter how many times the token occurs in that paragraph, and no matter what other token types it is in the same paragraph. The internal term prominence value for the jth token is calculated by dividing the cumulative "token_j_count" by the cumulative "paragraph_count". The same process is repeated in the second group of documents for calculating the external term prominence value ETP. The final CSTP value for the jth token is obtained using Equation (1) or Equation (2).

The same methods apply when the text units are documents instead of paragraphs.

Whether the text units are sentences, paragraphs or documents, the final collection-specific term prominence value CSTP can be compared with a preset threshold value. Terms having CSTP values greater than the threshold can be selected as the prominent topic terms of the document collection (step 4895). It should be noted that terms can be selected using only their respective ITP values instead of CSTP values. In the former case, the calculations of ETP values can be skipped. The selected terms can be output as a topic list to the user interface or storage (step 4898).

As is described earlier in relation to the system 4600 in FIG. 46, the external term prominence data for a plurality of terms can be pre-calculated by the module 4650 using the presently disclosed methods, and stored in a database, such as the database in 4612. In some embodiments, this database can be a standalone product, and can be used for different specific document collections. The weighting coefficient for each type of tokens can be customized to suit the special user situations. Referring to FIG. 49, a data table includes a plurality of terms each associated with a plurality of fields for storing the term's external prominence values in various grammatical roles or token types. The data table can be stored, for example, in the database 4612 (FIG. 46) or as a output of module 4650 (FIG. 46). In the example, external prominence values for the term "computer" are listed for its respective roles as the subject (Type 1), the head of a multiword phrase in the subject (Type 2), the modifier in a multiword phrase in the subject (Type 3), the predicate (Type 4), the head of a multiword phrase in the predicate phrase (Type 5), the modifier of a multiword phrase in the predicate phrase (Type 6), and its other roles in a sentence (Type 7). The data table can also include a field (Type 8) that stores the external prominence value of a term without knowing its grammatical role, which can be used when no parser is used. For situations where lower precision can be tolerated, analysis without a parser can reduce cost. The data table can also include fields for the term prominence values when paragraphs or documents are used as the text units instead of sentences as described above. In the exemplar case shown in FIG. 49, the data for each token type can be respectively obtained for each type without using weighting coefficient for that type. This way, different weighting coefficient assignment methods can be used to fit different user needs when the data is used for the calculation of the CSTP for specific document collections of different nature.

It should be understood that the above-described methods are not limited to the specific examples used above. Configurations and processes can vary without deviating from the spirit of the invention. For example, a value range for the term prominence (or internal and external term prominence) can be selected other than the exemplified values described above. In calculating the ITP and ETP values, the counting method can be based on numbers other than the single occurrence of a token in a sentence, a paragraph, or a document. The total frequency of the token in a sentence, a paragraph, or a document can be used instead of the single occurrence counting, or can be used in combination with the single occurrence counting method. Other information such as the position of the token in the document or the position of the sentence in the paragraph or in the document can also be used in combination with the above mentioned methods. Different token types and associated weighting coefficient values as well as the methods for determining the types and coefficient values can be used. The data structure of token prominence values can differ from the examples given above without deviating from the spirit of the present invention. Other grammatical roles of tokens can also be used to characterize token types. Moreover, the term prominence value can be expressed in the form of a continuous scale of numerical values or in the form of discrete ranges. The values of term prominence and/or the values of weighting coefficients can be in a range between 0 and 1, and/or in other ranges.

Automatic Topic Generation and Search with a Browsable Topic List

Figure 50:
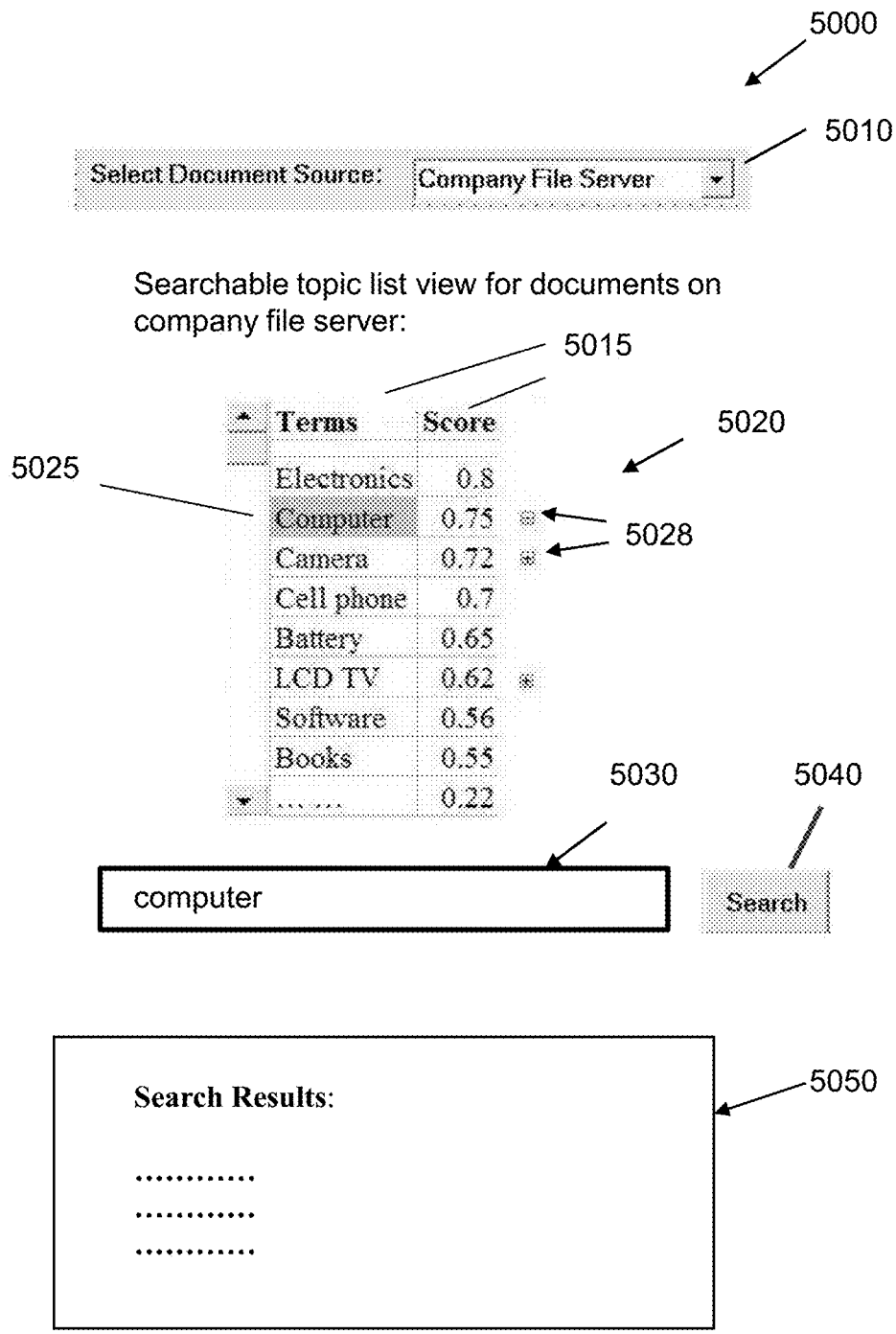

The topic list produced by the system and methods described above can have a wide range of applications. FIG. 50 shows a user interface 5000 that facilitates the search and retrieval of information in a document collection. The user interface 5000 includes a text field 5010 to allow a user to select a document collection, or its location, such as a company file server. For the specific document collection selected by the user, the computer system 4600 (FIG. 46) produces a topic list 5020 using the steps described above in conjunctions with FIGS. 46 to 49. The topic list 5020 is browsable by the user at the user interface 5000. The user can re-order the terms in the topic list by various criteria, such as the term prominence values or the alphabetic order of the terms by clicking on the column headings 5015. When the total number of topic terms that have above-the-threshold prominence values is large, the topic list can be re-ordered to bring those that may be the most relevant to the top of the list, so that if the user does not see a topic of interest, he or she can re-sort the list to bring up different topic terms to the top of the list. Such re-sorting criteria include the prominence value, the alphabetical order of the first term of the topic phrase, or that of the second or third term of the topic phrase if applicable, or other criteria such as the number of documents the term is in, etc.

Using the clues provided by the topics list, the user can select one or more terms 5025 such as "computer" in the topic list as a search query phrase. In this example, the selected term "computer" is displayed in a query box 5030. The user can click a search button 5040 to initiate a search for documents about "computer" in the document collection. The computer system can search the relevant documents in the document collection and displays the results in an area 5050.

The user interface shown in FIG. 50, and the related processes for automatic generation of topic list and searching with the guidance of the topic list have several advantages over conventional techniques. In a conventional search, a user needs to know what keyword or a query phrase to use when performing a search operation, whether the user is searching in a company document collection/server, or on the Internet, or on a personal computer, or in an email folder. This requires certain knowledge or guesswork about what may exist in the document collection. However, the user may not always know about the contents of the documents or what kinds of topics exist in the document collection. If the user enters a query phrase that is not a sufficient description of or not a good match with the contents the user is looking for, the search may fail. In the best case, such a search process may take several iterations, and can be time-consuming.

In contrast, the user interface shown in FIG. 50 and the related processes can automatically provide a topic list to give a user a sense about the main topics contained in the document collection. This is particularly useful with a document collection that has some concentration on certain topics. The user can use the topic list as a guide or hints when searching for contents that he/she is interested in. The user may no longer need to guess what keyword may be the best to use to search for the specific information in the document collection. The topic list can provide candidate keywords for the user. Presenting such a list of topic terms to the user at the time the user is trying to write a query can greatly facilitate the search process. The presently disclosed topic-assisted search methods can therefore significantly enhance the efficiency and accuracy of the information search. The presently disclosed topic-assisted search methods transform a cognitively more difficult process of writing a query to a cognitively easier process of browsing and selecting a topic as a pre-written query.

Figure 51:
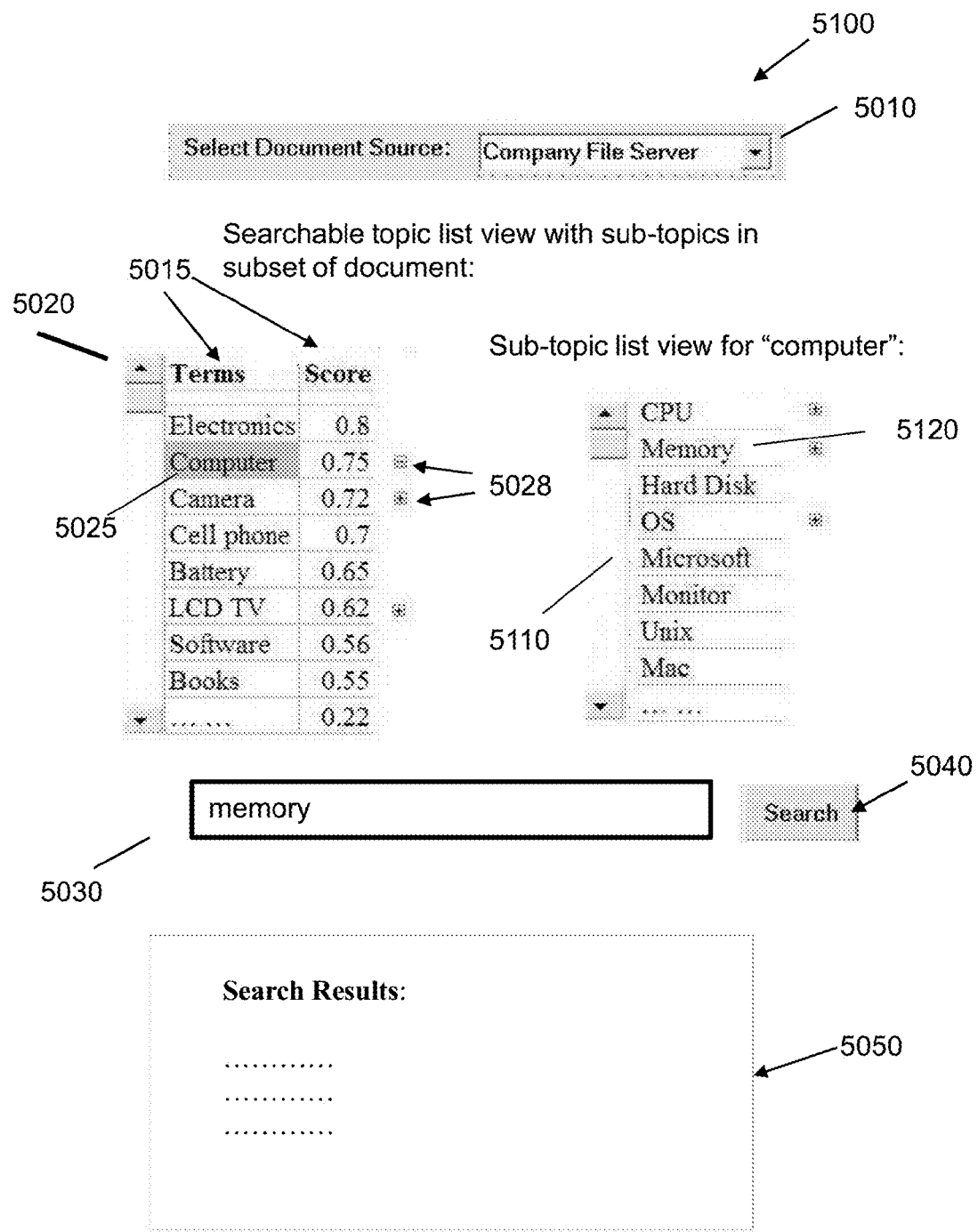

Automatic Topics Generation and Search with a Browsable Recursive Sub-Topic List The presently disclosed topic discovery methods and systems can be recursively applied to a subset of documents within a document collection. Referring to FIG. 51, after a user selects the document collection, the topic list 5020 in the user-selected document collection is automatically displayed in a user interface 5100. The user can select a term 5025 such as "computer" in the topic list 5020. After the term 5025 "computer" is selected, the user can click on a button (5028) next to the selected topic term, and a sub-topic list 5110 is displayed, which is the topic list generated from the subset of the document collection that includes those documents in the collection that contain the topic term of "computer", or includes those documents in the collection that are returned by a search method as relevant to the query of the topic term of "computer". In this particular example, the sub-topic list of the subset of documents includes terms such as "CPU", "memory", "hard disk", etc. The sub-topic list 5110 can be produced by the system 4600 using the methods illustrated in FIGS. 47 to 49 as described above. The user can further select a term 5120 such as "memory" in the sub-topic list 5110. The term 5120 automatically appears in the query box 5030. The user can initiate a search by clicking the search button 5040. The generation of sub-topics can be further repeated by several layers to provide the user with a more focused and more in-depth preview of the contents in the document collection.

Topics Assisted Search

Figure 52:
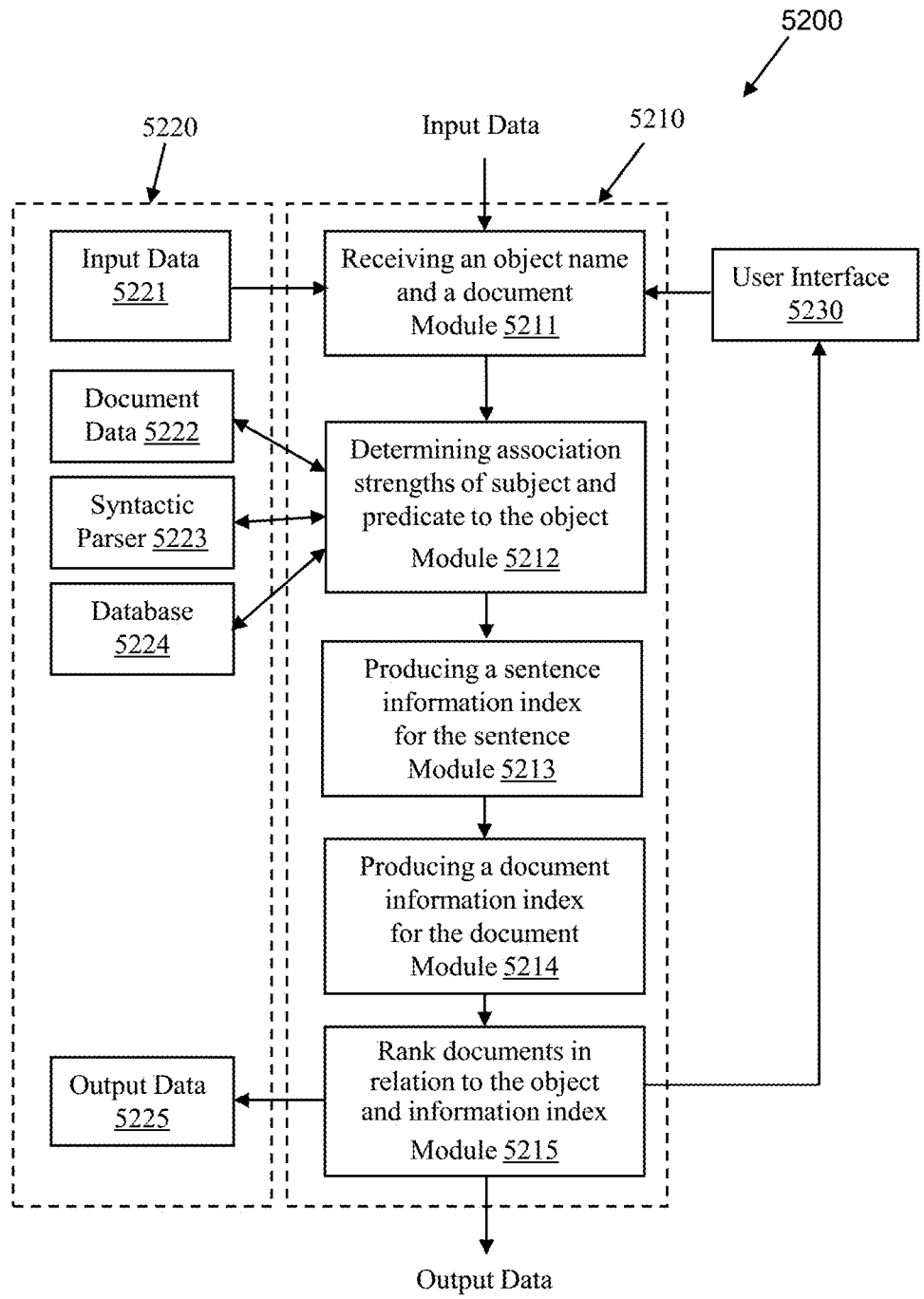

The searches initiated by clicking button 5040 in the user interfaces 5000, and 5100 in FIGS. 50 and 51 can be implemented by a system 5200, shown in FIG. 52, which is based on quantitative assessment of information in the document contents. The system 5200 includes a computer processing system 5210, a computer storage system 5220, and a user interface 5230. The computer processing system 5210 includes algorithmic applications that further include functional modules 5211-5215 for conducting quantitative assessment of information in the documents. The module 5211 in the computer processing system 5210 receives input data from an external source, input data 5221 in the computer storage system 5220, or the user interface 5230. The input source can include a query from a web browser, a search text string entered by a user at a user interface (e.g. 5230). The system 5200 is also based on the Object Properties Association Model (OPAM) developed by the present inventor. The input query string includes an object name. The object name can be in the form of a word, a list of words or a phrase, a character string, a sub-component of such string. The object can be a physical object or an abstract object. The document retrieved from 5222 can include any document that includes text in a language, such as a web page, a menu, a book, an email, a text message, an article, a dictionary, an instruction manual, etc. The module 5211 can first receive a path to one or more documents, and subsequently retrieves the one or more documents according to the path. The document(s) can be stored in document data 5222 in the computer storage system 5220.

The computer storage system 5220 can store, as described in more detail below, input data 5221, document data 5222 comprising one or more documents, optionally a syntactic parser 5223, a database 5224, and output data 5225.

The database 5224 in the computer storage system 5220 stores names of a plurality of objects, the names of the properties for each object, and association-strength values of each property for an object. The object names, the property names, and the association-strength values can be stored in a table form, or in other data structures. Based on the OPAM model, the association strength of a property to a given object is a measure for the amount of information that the property potentially carries for the object. The amount of information that is actually realized can depend on the context in which the property term occurs. The database 5224 can be called a Knowledge Base because it stores knowledge about associations among objects and properties.

When implementing the system 5200 for search or for other operations, the database 5224 can be downloaded from a data provider, or constructed from available data, or by manual input. In some embodiments, the database 5224 can be developed by a data provider for individual object names or topic terms as pre-trained knowledge modules, stored at a central server, and each such module is downloadable to users as a standalone product. The users can subscribe to a service which allows updates of such data from the central server to the user's computing device. The user can selectively download only those topic-related knowledge modules that are relevant to the user's specific needs. This method allows the user to build up an individualized knowledgebase, and makes the knowledge-based search a highly scalable operation.

The system 5200 is capable of quantitatively assessing information contained in a specific text unit for a pre-specified object name or a topic term as a query, and rank the documents based on such information as the documents' relevance scores to the query. Details about the system 5200 is disclosed in commonly assigned U.S. patent application Ser. No. 12/573,134, titled "System and Methods for Quantitative Assessment of Information in Natural Language Contents", filed on Oct. 4, 2009, and US Provisional Patent Application 61/143,140, titled "System and Methods for Quantitative Assessment of Information in Natural Language Contents" filed on Jan. 7, 2009, both by the present inventor.

Automatic Displaying of Topics in a File Folder or Directory

Figure 53:
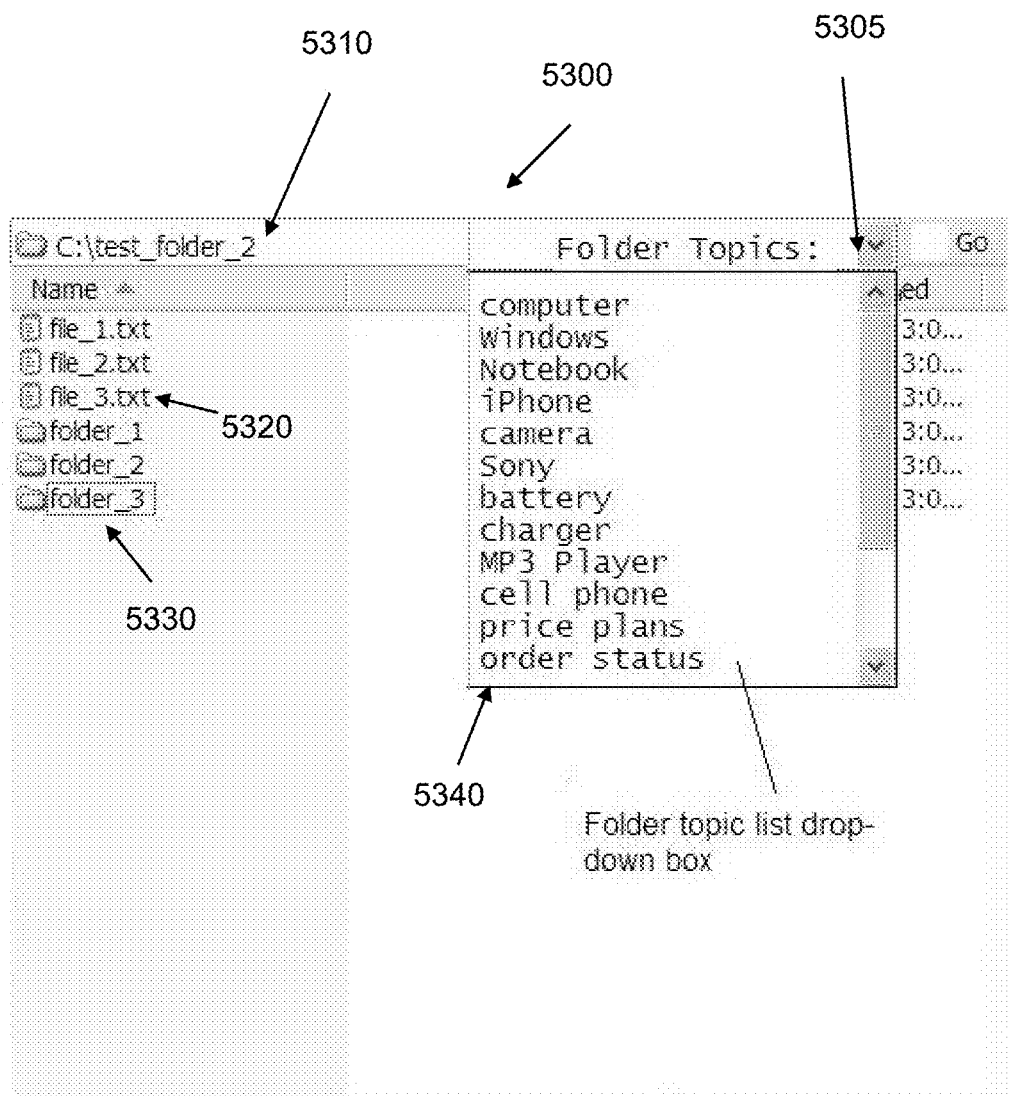

A file folder or directory in a computer file system containing one or more files or sub-folders can be treated as a specific document collection. The presently disclosed topic discovery methods and systems can be used to provide a user with a topic list for such a file folder or directory in a computer file system. Referring to FIG. 53, an exemplar user interface 5300 displays a file directory 5310, which can include files 5320 and sub-folders 5330. When the user clicks on a button such as the dropdown arrow (805) in the exemplar case, the topic list 5340 for the folder 5310 can be automatically displayed. The topics for the entire folder 5310 can be produced by the system 4600 (FIG. 46) using the methods illustrated in FIGS. 47 to 49 and described above. Other topic lists can also be produced and displayed for sub-folders such as 5330. In some embodiments, a search can be performed using the terms on the topic list as pre-written queries.

Automatic Displaying of Topic Terms in a Single Document

Figure 54:
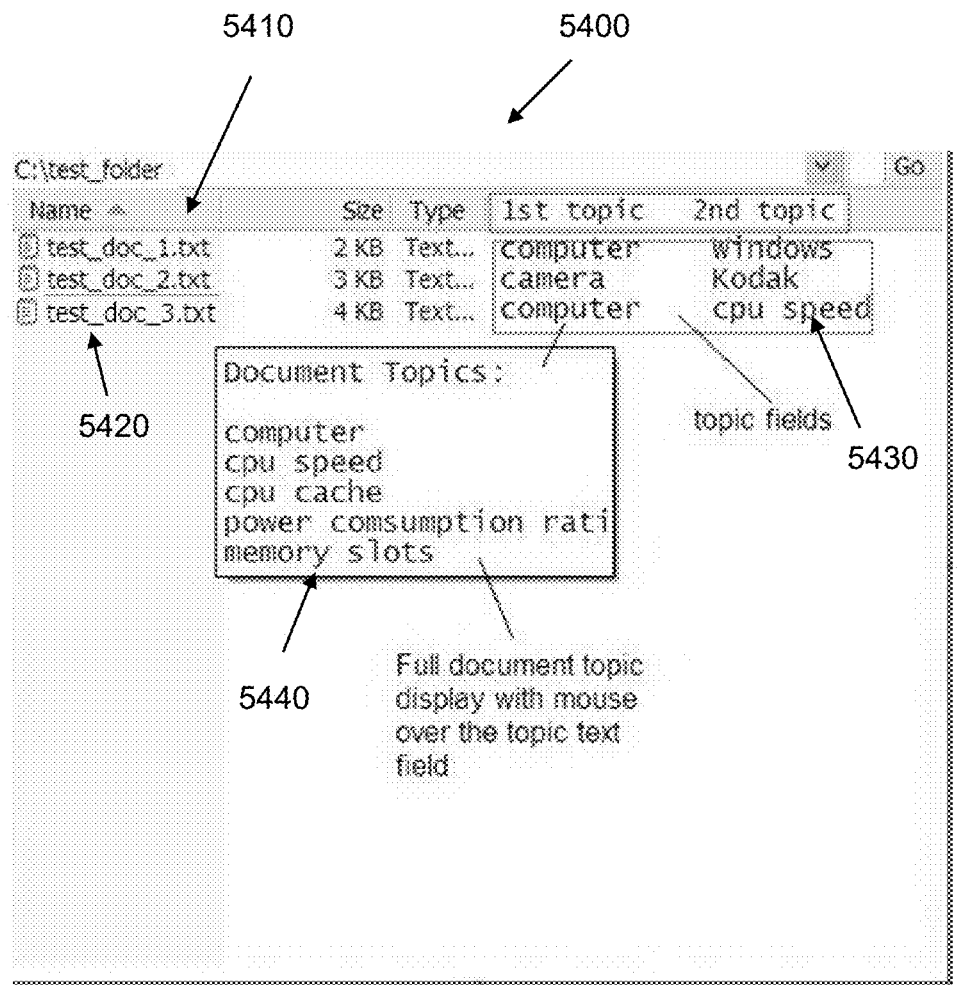

As has been described above, the specific document collection can sometimes contain only a single document. In this case, the collection-specific term prominence CSTP is the term prominence associated with the single document. The topic list for the document collection becomes the topic list of the single document. Referring to FIG. 54, an exemplar user interface 5400 displays a file directory 5410, which include files. For each file in the directory, a topic list can be produced and displayed, and in this exemplar case, each file's topic list is partially displayed as additional data fields in 5430. In this exemplar case, the lists are only partially displayed because of the limited space in the user interface. In one implementation, the full topic list or a major part of the topic list of each file can be displayed when the user puts the pointing device such as a mouse over the partially displayed topic fields. For example, when the mouse is over the topic fields of the file 5420, more topic terms are displayed in a window 5440. The topic list for each file can be produced by the system 4600 (FIG. 46) using the methods illustrated in FIGS. 47 to 49 and described above.

The topic list for a specific document allows a user to quickly have an idea about the main subject or topic of a specific document without opening the document, and without performing a search. This can greatly increase the efficiency and productivity in information search. The conventional methods of displaying file attributes such as in the Microsoft Windows folder detailed view may include metadata fields such as the author name, date, title, file size, etc. However, such metadata do not provide sufficient amount of information about the content of the document to the user. Some other data fields such as the "keywords" field will require time-consuming manual determination of the keywords candidate, and manual input into such fields. With the systems and methods in the present disclosure, topic terms that represent the file's content information are automatically identified and extracted, and can be displayed to the user along with other metadata about the file without any human effort on the user's side.

Automatic Displaying of Topic Terms for Emails and Email Folders or Directories

The presently disclosed system and methods are also applicable to other document collection systems such as email systems. Emails can be stored in folders just like the files in a folder of a computer file system as exemplified in FIG. 53. The topic list exemplified in FIG. 53 can also be applied to an email folder in the same way so that searching emails within a folder or within the entire mailbox with a browsable topic list can have the same benefit of transforming a query-writing or guessing process into a browsing process.

Furthermore, individual emails are just like individual files on a computer file system as exemplified in FIG. 54 above. The topic terms for individual email messages can be automatically produced by the system 4600 (FIG. 46) using the methods illustrated in FIGS. 47 to 49, and described above. The topic terms of an email message can be displayed in a similar way as individual files to give the user a clue about the content of the email without opening the email. FIG. 55 is an exemplar user interface for this application.

An exemplar user interface 5500, shown in FIG. 55, displays a list of email messages 5510 and related information such as senders 5520, subject 5530 of the email messages, and dates when the email messages are received. The user interface 5500 can also include an additional data field 5515 titled "Keywords". The topic terms 5550 in each of the email messages can be automatically produced by the system 4600 (FIG. 46) using the methods illustrated in FIGS. 47 to 49 and described above, and can be conveniently displayed in the "Keywords" field next to the Subject field of the email messages.

System and Methods for Automated Document Topic Discovery and Document Categorization Given a document collection, usually with unknown contents, a browsable topic list representing the main topics of the contents in the collection can be produced using the above described systems and methods. With such a topic list, the main topics of a document collection become known to the user. The documents with topics that match the user's query can be subsequently retrieved by selecting a topic in the topic list and performing a search using the topic terms as pre-written queries, thus turning a cognitively more difficult search process involving keyword guessing to a much easier process of browsing and selecting in a topic list.

However, there can be a large number of documents that share the same or similar topic in a large document collection. There is still a need to efficiently locate the most relevant information among a large number of documents even with the assistance of a topic list. The present disclosure provides methods for organizing such documents into well-structured categories of manageable sizes, so that specific information can be easily located and retrieved within the corresponding specific categories. As a result, a user may save a significant amount of time and efforts in locating the needed documents in a large collection of documents.

Conventionally, designing and constructing a category tree for a large document collection requires considerable amount of knowledge and labor from human experts. Efforts are needed to first obtain information about what kinds of documents and topics are there in the collection, and then to design a category system for grouping such documents into categories.

An important advantage of the presently disclosed system and methods is that organizing unstructured documents into a well-structured category tree will require minimal or even no human efforts. Documents that share the same topic may naturally form a hidden group or a category, sometimes also called a cluster. Thus, each topic term produced by the presently disclosed system and methods can potentially be the name of a category node, either by itself, or by combination with other topic terms. Usually, the more prominent a topic is in the collection, there are more likely documents that can be grouped under this topic.

Document collections within a specific organization such as a company, a bank, or a school, etc., usually concentrate on certain topics that are relevant to the specific organization. For example, a company in the business of car manufacturing will have a company-internal document collection with main topics about cars and various properties of cars. It is usually the case that the topic discovery methods in the present disclosure can accurately identify the main topics of the documents within such a collection.

Furthermore, even if the topics of the documents are scattered within the collection, a topic list of certain contents can still serve as a good starting point for designing a category structure. The presently disclosed system and methods are also based on the principle that it is cognitively easier to design a category tree from a list of candidate nodes than starting from nothing, in which case much human efforts may be needed to first obtain information about what kinds of documents and topics are there in the collection.

The categorization methods provided by the present disclosure can be implemented in an automatic mode or an interactive mode, which can be selected by users based on the availability of resources for human interaction, and on precision requirements of the results.

Figure 56:
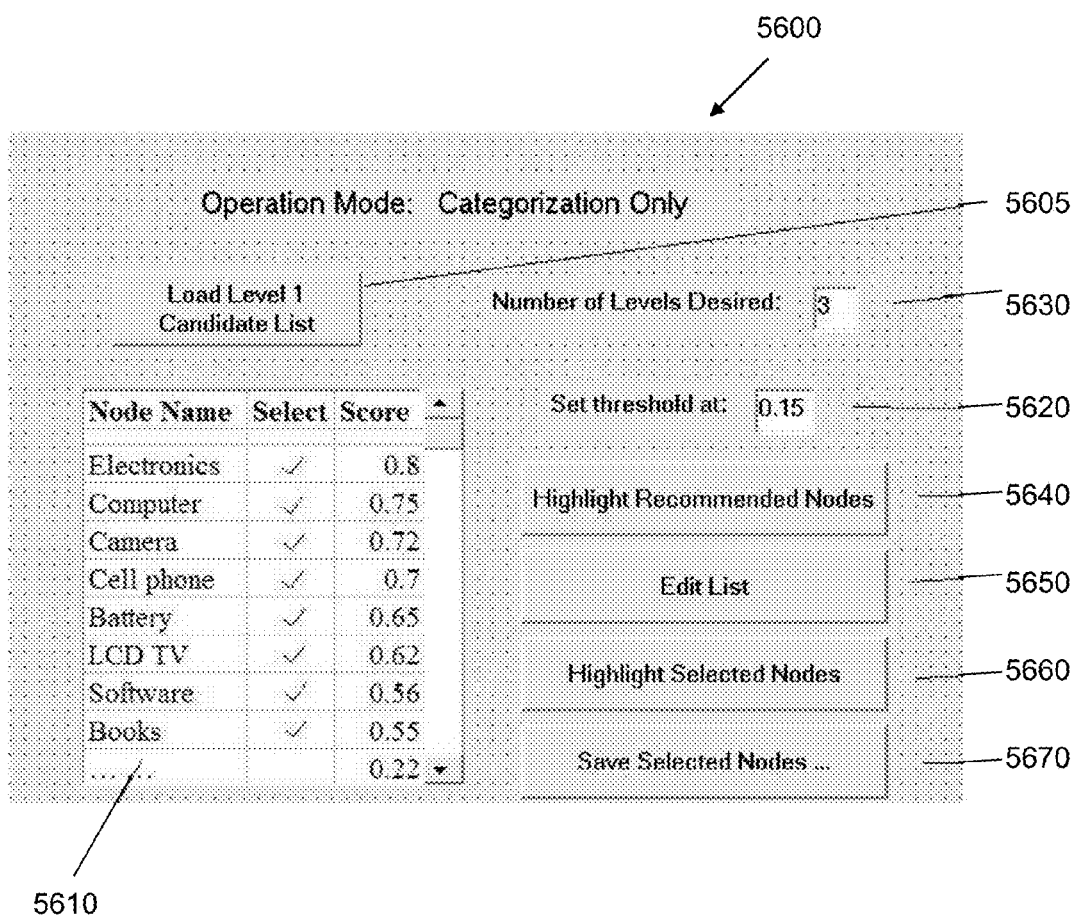

Referring to FIG. 56, a user interface 5600 allows a user to interactively configure a category structure using a topic list. The system (e.g. 4600, FIG. 46) first applies the above described topic-discovery methods (FIGS. 47, 48, and 49) to produce a topic list ranked by the topic prominence values. In the interactive mode, the user can click a button 5605 to load a candidate list. The system (e.g. 4600, FIG. 46) selects a portion of the most prominent topic terms and displays a candidate list 5610 in the user interface 5600 as candidates for top-level category nodes. The user can set a threshold value in 5620 (e.g. 0.15). The system (e.g. 4600, FIG. 46) selects a subset of the topic terms above the threshold as candidates for the top-level category nodes. The user can highlight the candidate nodes recommended by the system by clicking the button 5640. The user can change the threshold value to adjust the number of candidate nodes displayed. The user can specify the number of levels in 5630 desired to be in the category tree for the entire document collection from the user interface 5600.

Using the user interface 5600, the user can inspect the said initial category list 5610, and manually refine, or edit the list as appropriate by clicking on the button 5650. Once the category nodes are selected from the candidate topic list, the user can highlight the selected nodes by clicking on the button 5660. The user can create upper level nodes and re-arrange the current level nodes into such upper level nodes based on the user's preference and knowledge. Each category node can either be defined using a single topic name, or can be defined with a name that represents a plurality of topics names. For example, if the candidate list 5610 includes such topic names as "electronics", "computer", "camera", "cell phone", "battery", "LCD TV", "software", "books", etc., the user may use the single topic name of "electronics" as a category node/name to represent all other topic names; or the user can add other category nodes/names such as "computer products" to represent other topic names such as "computer", "software"; or the user can add additional category nodes such as "home appliance" to represent additional topics that are not shown in the exemplar user interface, such as "washing machine", "dryer", "heater", etc.

Once the top-level categories are defined, the user has the option to further define lower-level sub-categories, or stop at the current level.

If the user decides to define lower level subcategories, the user may continue to select topic names from the existing candidate list, and put them under one or more of the top-level category nodes as lower-level sub-category nodes. For example, the user may put "HDTV", "digital camera", etc., under the upper-level category node of "electronics" as the subcategory nodes. Or, the user can choose to generate new sub-topic list for each upper-level category node. To do this, the user can use the top-level category names as search queries, and retrieve documents using the search method of the user's choice to form a subset of documents that share the topics defined by the category name. Then the user can apply the topic-discovery methods described in FIGS. 46, 47, 48 and 49 above to generate the sub-topic list from the subset of the documents so retrieved. This process can be repeated until the desired depth of the category tree is reached.

The selected nodes or the structure of the category tree can be saved to a file by clicking on the button 5670.

One advantage of the presently disclosed methods over the conventional methods of constructing a category tree for a specific document collection is that from the topic list the user already know what type of document contents are in the collection; and the user may only need to re-arrange the topic names to form the tree, without reading and analyzing the contents in the entire document collection beforehand, thus saving the human labor cost that could be prohibitively high for many companies and organizations.

In the automatic mode, the category tree can be automatically constructed with the topic list without human intervention. This is particularly effective when resources for human interaction are not available, or when the levels of the category tree do not need to be deep, or when some lower precision in categorizing the documents can be tolerated.

The system first uses the most prominent topic names that are above the set threshold as the top-level category nodes. Then the system uses such topic names as search queries to retrieve subsets of documents that share the common topics, and then applies the topic-discovery methods as described above in the present disclosure to generate the lower-level sub-topic lists for each subset of documents, and selects the most prominent sub-topics as the nodes for sub-categories, respectively. This process can be repeated until the desired depth of category tree is reached, without human intervention.

It should be understood that the above described methods and systems are not limited to the specific examples used. Configurations and processes can vary without deviating from the spirit of the invention. For example, after topics or sub-topics are obtained, the searches of documents using a topic or sub-topic name can be implemented by methods other than the quantitative information assessment methods described above. The searches may be conducted without using property names and their respective association strengths related to a topic or a subtopic. Moreover, the modules in the system can be configured differently from what is shown in the Figures. Different modules can be combined into a single module. Some modules can also be separated into different modules.

What is claimed is:

1. A computer-implemented method, comprising:
receiving, by a computer, a text content as an electronic file object containing one or more terms; wherein a term comprises one or more words or phrases or sentences, wherein the electronic file object is associated with a name;
receiving, by a computer, a term extracted from the electronic file object;
displaying, by a computer and in a computer user interface, the term in association with the name of the electronic file object;
wherein the term is obtained by:
(a) identifying one or more terms in the text content,
(b) identifying a term among the one or more terms in the text content,
(c) comparing the term with the name of the electronic file object,
(d) selecting the term if the term is different from the name of the electronic file object,
(e) identifying a sentence containing the term;
(f) dividing the sentence into a first part comprising a grammatical subject of the sentence and a second part not comprising the grammatical subject of the sentence; and
(g) extracting the term if the term is in the first part of the sentence,
wherein the extraction process is performed by a processor residing either on the same computing device as the electronic file object, or on a different computing device from the text content.

2. The method of claim 1,
wherein the term is extracted further based on a semantic attribute or a frequency attribute of the term in the text content.

3. The method of claim 1, further comprising:
using the term to link the text content to a category, or to label the text content as belonging to a category.

4. The method of claim 1, further comprising:
providing, by a computer, an option for a user to use the term to modify or replace the name of the electronic file object.

5. The method of claim 1, wherein the term is extracted when the electronic file object is in an unopened state, and the term is displayed without opening the electronic file object for display.

6. A computer-implemented method, comprising:
receiving, by a computer, a text content as an electronic file object containing one or more terms; wherein a term comprises one or more words or phrases, wherein the electronic file object is associated with a name or icon;
displaying, by a computer and in association with the electronic file object, a text unit extracted from the electronic file object, wherein the text unit comprises at least a sentence, wherein the text unit is displayed as a summary of the content in the electronic file object, wherein the electronic file object is in an unopened state, and the text unit is displayed without opening the electronic file object for display; wherein the text unit is obtained by:
(a) determining an importance measure for the one or more terms in the text content,
(b) selecting a term with an importance measure above a threshold,
(c) identifying a sentence containing the term,
(d) dividing the sentence into a first part comprising a grammatical subject and a second part not comprising the grammatical subject,
(e) identifying whether the term is in the grammatical subject of the sentence,
(f) selecting the sentence as an element in the text unit if the term is in the grammatical subject of the sentence,
(g) if the sentence is selected, extracting the text unit;
wherein the extraction process is performed by a processor residing either on the same computing device as the electronic file object, or on a different computing device.

7. The method of claim 6, wherein the sentence is selected further based on the importance measure of the term.

8. The method of claim 6, further comprising:
providing a user interface function for a user to act on a user interface object including the name or an icon of the electronic file object;
displaying the text unit in response to a user action on the user interface object, wherein the user action comprises a pointing or touching action.

9. The method of claim 6, wherein the importance measure of term is determined based on a contextual attribute associated with the term, wherein the contextual attribute comprises a grammatical attribute, a semantic attribute, a frequency attribute, or a positional attribute.

10. The method of claim 6, wherein more than one electronic file objects are concurrently displayed in the user interface in a format comprising a list or a group view format, or a different viewing format.

11. A computer-implemented method for tagging or labeling electronic file objects containing text, comprising:
receiving, by the computer, a text content as an electronic file object containing one or more terms; wherein a term comprises one or more words or phrases or sentences, wherein the electronic file object is associated with a name;
receiving, by the computer, a term extracted from the electronic file object;
comparing the term with the name of the electronic file object,
selecting the term if the term is different from the name of the electronic file object,
if the term is selected, displaying, by the computer and in a computer user interface, the term together with the name of the electronic file object, wherein the term is displayed as a label or tag of the electronic file object, or as a link to a category;
wherein the term is obtained by:
(a) identifying at least a portion of the text content,
(b) identifying a term in the portion of the text content,
(c) identifying a sentence containing the term;
(d) dividing the sentence into a first part comprising a grammatical subject of the sentence and a second part not comprising the grammatical subject of the sentence; and
(e) extracting the term if the term is in the first part of the sentence,
wherein the extraction process is performed by a processor residing either on the same computing device as the electronic file object, or on a different computing device.

12. The method of claim 11, further comprising:
allowing a user to select or edit the term as a label for tagging or categorizing or renaming the electronic file object.

13. The method of claim 11,
wherein the electronic file object is in an unopened state, wherein the term is extracted from the text content without opening the electronic file object or without displaying the content of the electronic file object.

14. The method of claim 11, wherein the term includes a word or phrase from the metadata associated with the electronic file object, including a term associated with or indicated by specific markup tags, or wherein the term is displayed as part of a sentence or paragraph containing the term.

15. The method of claim 11, further comprising:
obtaining a first importance measure of the term inside the text content;
obtaining one or more documents other than the text content;
obtaining a second importance measure of the term in the one or more documents;
comparing the first importance measure of the term inside the text content with the second importance measure of the term in the one or more documents; and
determining the importance measure of the term based on the comparison.

16. The method of claim 11, further comprising:
identifying a sentence containing the term;
dividing the sentence into a first part and a second part, wherein the first part contains a grammatical subject of the sentence, and the second part contains a non-subject part of the sentence;
determining the importance measure based on whether the term is in the first part of the sentence or the second part of the sentence.

17. The method of claim 11, wherein the term importance score is determined based on a semantic attribute associated with the term.

18. The method of claim 11, further comprising:
identifying a positional attribute associated with the term, wherein the positional attributes includes the position of a term in the text content, or in a sentence or a paragraph, or the position of the sentence or paragraph in the text content; and determining the term importance measure based on the positional attribute of the term in the text content.

19. The method of claim 15, wherein the first importance measure is obtained based on a frequency of occurrences of the term in the text content, wherein the second importance measure is obtained based on a frequency of occurrences of the term in the one or more documents.

20. The method of claim 11, wherein the text content includes any content containing text, including a document, a Web page, a resume, a job description, a note, an email, a blog, a review or comment, residing on either a fixed or a mobile computing or communication device, or a collection of multiple documents, the method further comprising:

providing a user interface function for a user to act on a user interface object including the name or an icon of the electronic file object;

displaying the term in response to a user action on the user interface object, wherein the user action comprises a pointing or touching action.

* * * * *